(12) United States Patent
Ehrenreich et al.

(10) Patent No.: US 7,992,889 B2
(45) Date of Patent: Aug. 9, 2011

(54) CONVERTIBLE STROLLER-CYCLE

(75) Inventors: Michael Ehrenreich, South Orange, NJ (US); Joel Hoag, Brooklyn, NY (US); Brian Rhee, New York, NY (US)

(73) Assignee: Soma Cycle, Inc., South Orange, NJ (US)

( * ) Notice: Subject to any disclaimer, the term of this patent is extended or adjusted under 35 U.S.C. 154(b) by 276 days.

(21) Appl. No.: 12/188,498

(22) Filed: Aug. 8, 2008

(65) Prior Publication Data

US 2010/0032925 A1 Feb. 11, 2010

(51) Int. Cl.
*B62K 21/02* (2006.01)

(52) U.S. Cl. ........ 280/648; 280/202; 280/282; 280/295; 280/47.18; 280/481; 280/643; 280/240; 280/288.4; 280/415.1; 280/428

(58) Field of Classification Search ............... 280/47.18, 280/202, 204, 240, 263, 264, 267, 282, 288.4, 280/292, 295, 297, 400, 410, 415.1, 419, 280/424, 428, 481, 643; 16/34; 188/24.11, 188/24.16, 24.21, 2 D
See application file for complete search history.

(56) References Cited

U.S. PATENT DOCUMENTS

| | | | |
|---|---|---|---|
| 1,059,466 A * | 4/1913 | Hosmer | .............. 280/202 |
| 1,218,943 A | 3/1917 | Hudry | |
| 1,347,384 A | 7/1920 | Kinnard | |
| 1,408,729 A | 3/1922 | Green | |
| 1,560,288 A | 11/1925 | Murvay | |
| 2,305,719 A | 12/1942 | Lee | |
| 2,435,733 A | 2/1948 | Belyeu | |
| 2,468,933 A | 5/1949 | Jones | |
| 2,595,453 A * | 5/1952 | Gilmore | .............. 280/763.1 |
| 2,798,727 A | 7/1957 | Viggo et al. | |
| 3,314,494 A | 4/1967 | Weitzner | |
| 3,738,700 A | 6/1973 | Terry | |
| 3,954,283 A | 5/1976 | Boehm et al. | |
| 4,015,297 A | 4/1977 | Christian | |
| 4,566,150 A | 1/1986 | Boothe | |
| 4,770,431 A * | 9/1988 | Kulik | .............. 280/202 |
| 4,773,510 A | 9/1988 | Sato | |
| 4,811,620 A | 3/1989 | Old | |
| 4,825,484 A | 5/1989 | Riegel | |
| 4,958,842 A | 9/1990 | Chang | |

(Continued)

FOREIGN PATENT DOCUMENTS

EP 1690782 A1 8/2006

(Continued)

OTHER PUBLICATIONS

International Search Report re PCT/US2009/051352.

(Continued)

*Primary Examiner* — Hau V Phan
*Assistant Examiner* — Bryan A Evans
(74) *Attorney, Agent, or Firm* — Caesar, Rivise, Bernstein, Cohen & Pokotilow, Ltd.

(57) ABSTRACT

The present invention relates to a vehicle that is converted from a stroller for carrying a passenger and cycle operated by a rider to a combined unit. More specifically, the invention relates to a stroller and a bicycle combined, physically and operationally, such that the operator of the cycle portion of the stroller-cycle can control operation of the stroller portion while the stroller-cycle is in motion.

7 Claims, 49 Drawing Sheets

U.S. PATENT DOCUMENTS

| | | | |
|---|---|---|---|
| 5,056,805 A * | 10/1991 | Wang | 280/47.36 |
| 5,094,322 A | 3/1992 | Casillas | |
| 5,125,674 A | 6/1992 | Manuszak | |
| 5,168,601 A | 12/1992 | Liu | |
| 5,190,306 A | 3/1993 | Nauman et al. | |
| 5,431,255 A | 7/1995 | Tsuchie | |
| 5,558,357 A | 9/1996 | Wang | |
| 5,562,300 A | 10/1996 | Nelson | |
| 5,590,896 A | 1/1997 | Eichhorn | |
| 5,692,760 A | 12/1997 | Pickering | |
| 5,709,400 A | 1/1998 | Bonnier et al. | |
| 5,732,601 A | 3/1998 | Wu | |
| 5,820,146 A | 10/1998 | Van Ligten | |
| 5,829,314 A | 11/1998 | Scura | |
| 5,884,922 A | 3/1999 | Pickering | |
| 5,975,551 A | 11/1999 | Montague et al. | |
| 6,164,666 A | 12/2000 | Prea | |
| 6,231,056 B1 | 5/2001 | Wu | |
| 6,237,995 B1 | 5/2001 | Dierickx | |
| 6,332,242 B1 | 12/2001 | Chen | |
| 6,339,862 B1 | 1/2002 | Cheng | |
| 6,340,168 B1 | 1/2002 | Woleen | |
| 6,343,406 B1 | 2/2002 | Yeh | |
| 6,511,248 B2 | 1/2003 | Wu | |
| 6,921,102 B2 | 7/2005 | Hsia | |
| 7,249,779 B2 | 7/2007 | Ehrenreich et al. | |
| 2001/0035626 A1 | 11/2001 | Kettler | |
| 2003/0151225 A1 | 8/2003 | Lopez | |

FOREIGN PATENT DOCUMENTS

| | | |
|---|---|---|
| JP | 2000060902 A2 | 2/2000 |
| JP | 03099829 U9 | 12/2003 |
| JP | 2007331515 A | 12/2007 |
| WO | W003084807 A1 | 10/2003 |
| WO | W02006112688 A1 | 10/2006 |

OTHER PUBLICATIONS

International Search Report for related PCT Application No. PCT/US07/20216.

* cited by examiner

LOCKED STATE

RELEASED STATE

CASTER WHEEL ASSEMBLY IN UP / STORAGE OR ZIGO RIDING MODE

CASTER WHEEL ASSEMBLY IN DOWN / STROLLER MODE

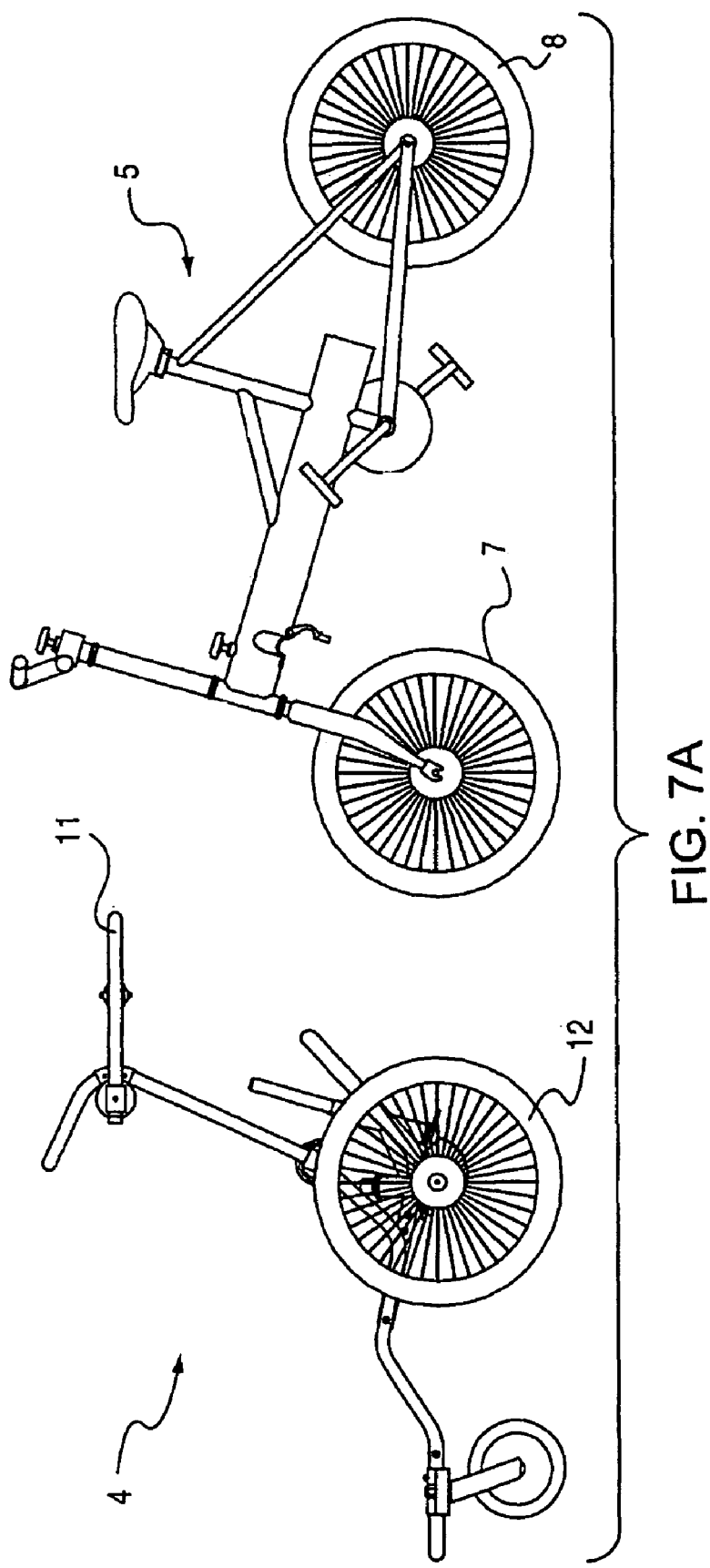

IN THE LOCKED STATE THE GEAR IS IN CONTACT WITH TEETH OF BOTH PUSHBAR HOUSING AND PUSHBAR MOUNT

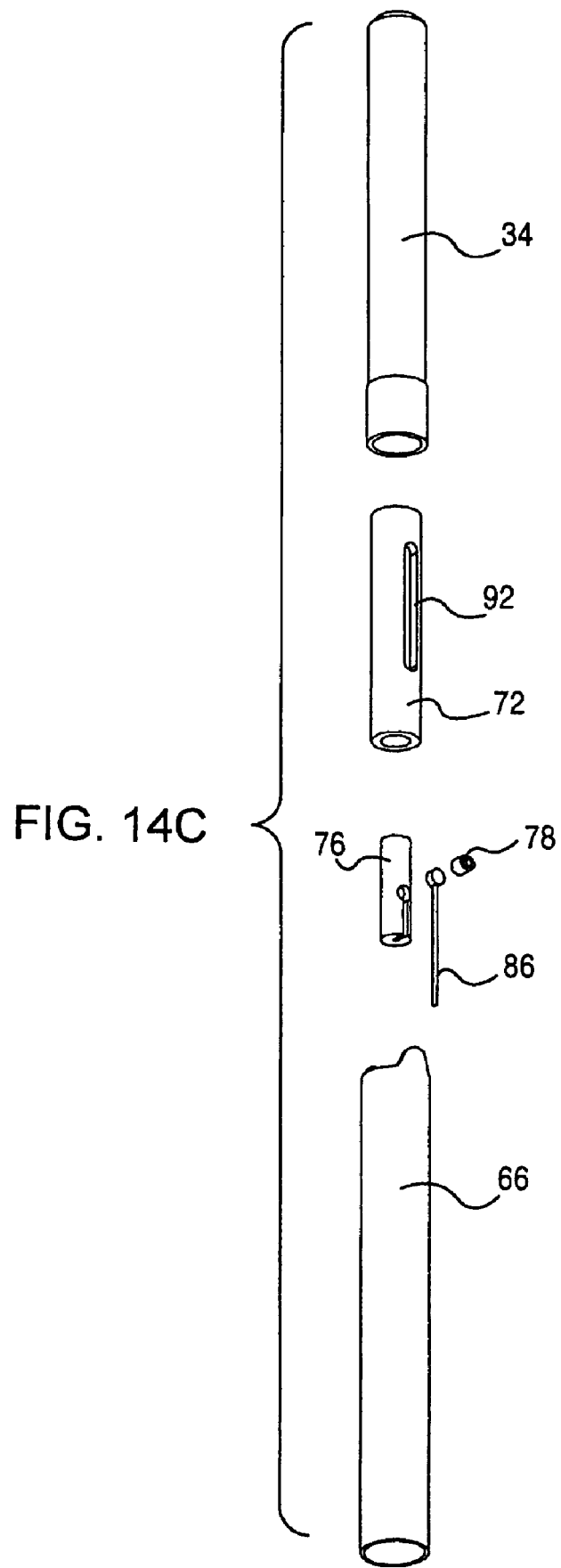

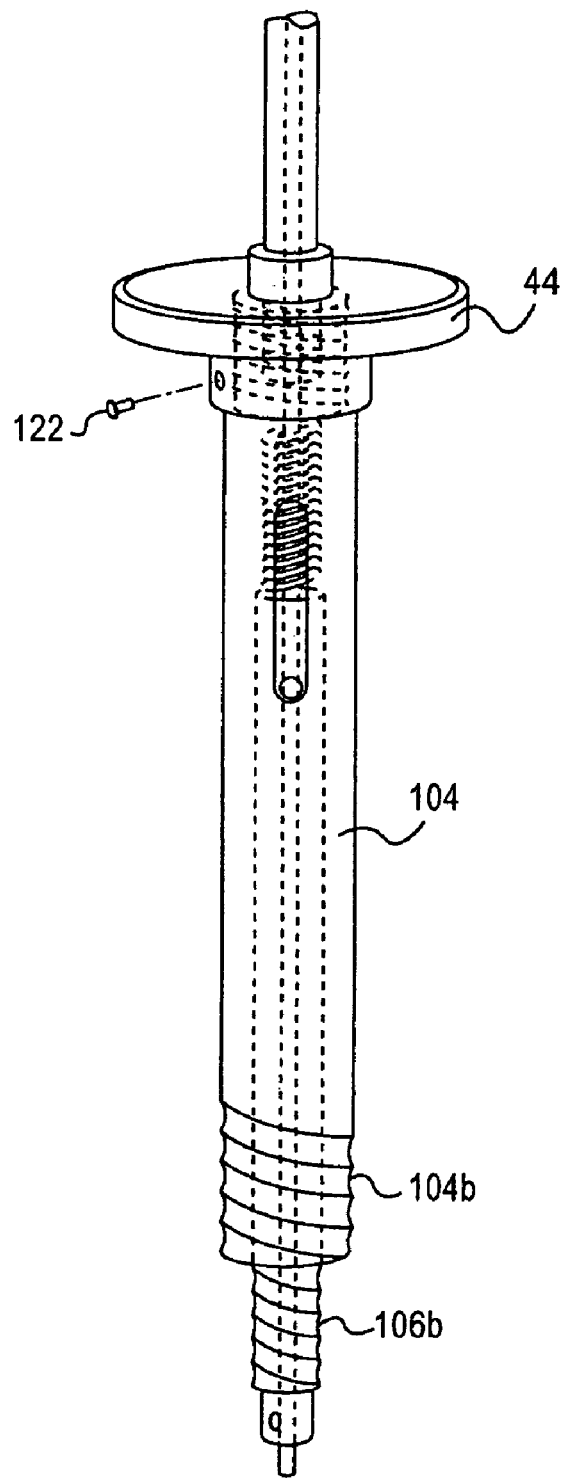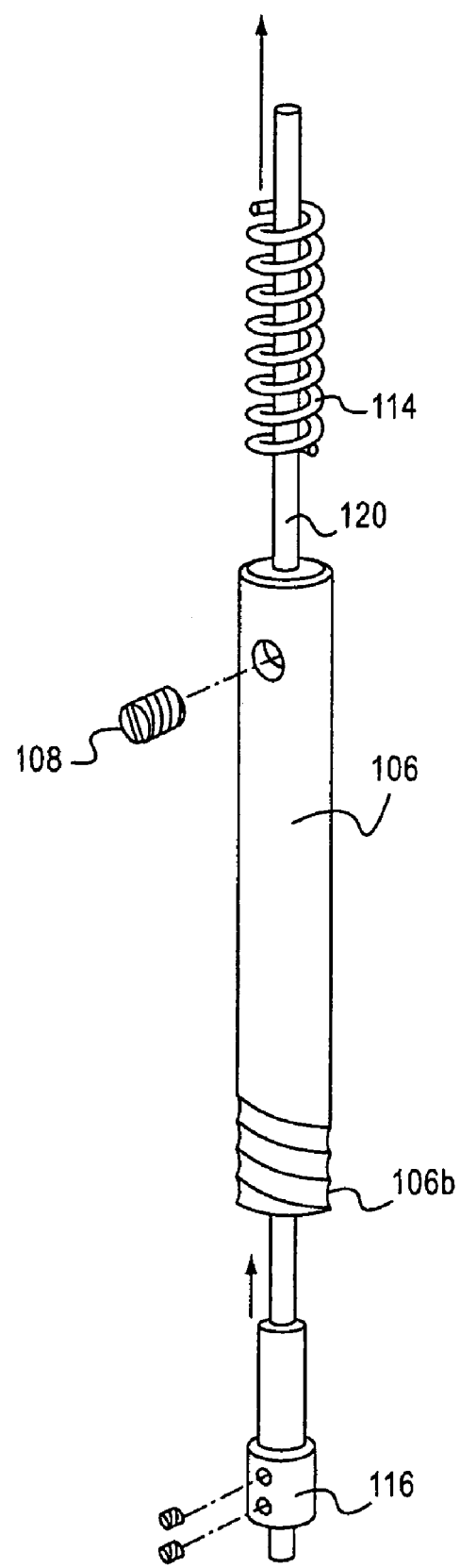
FIG. 19B
FIG. 19C

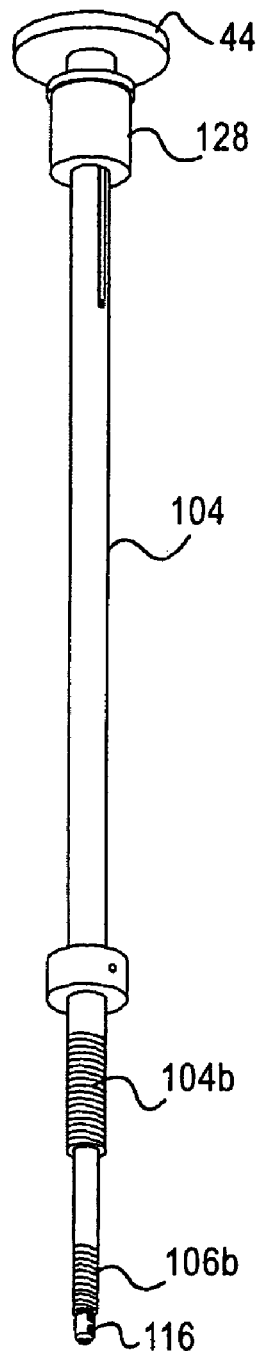
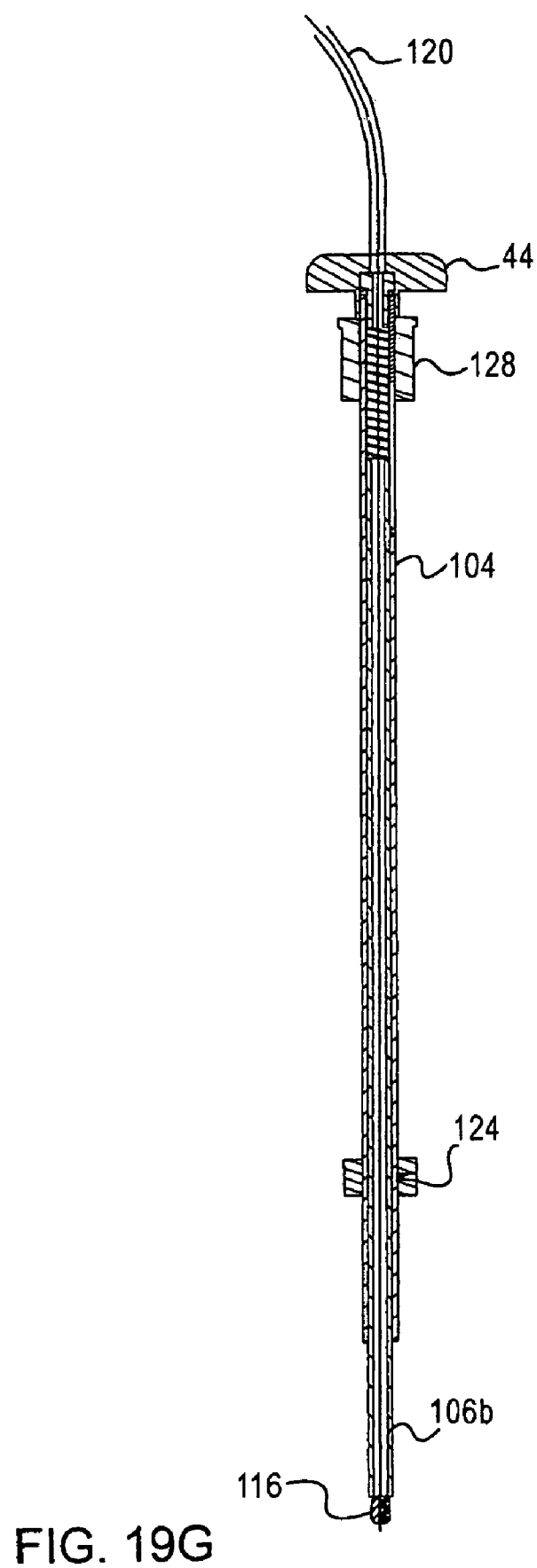
FIG. 19F
FIG. 19G

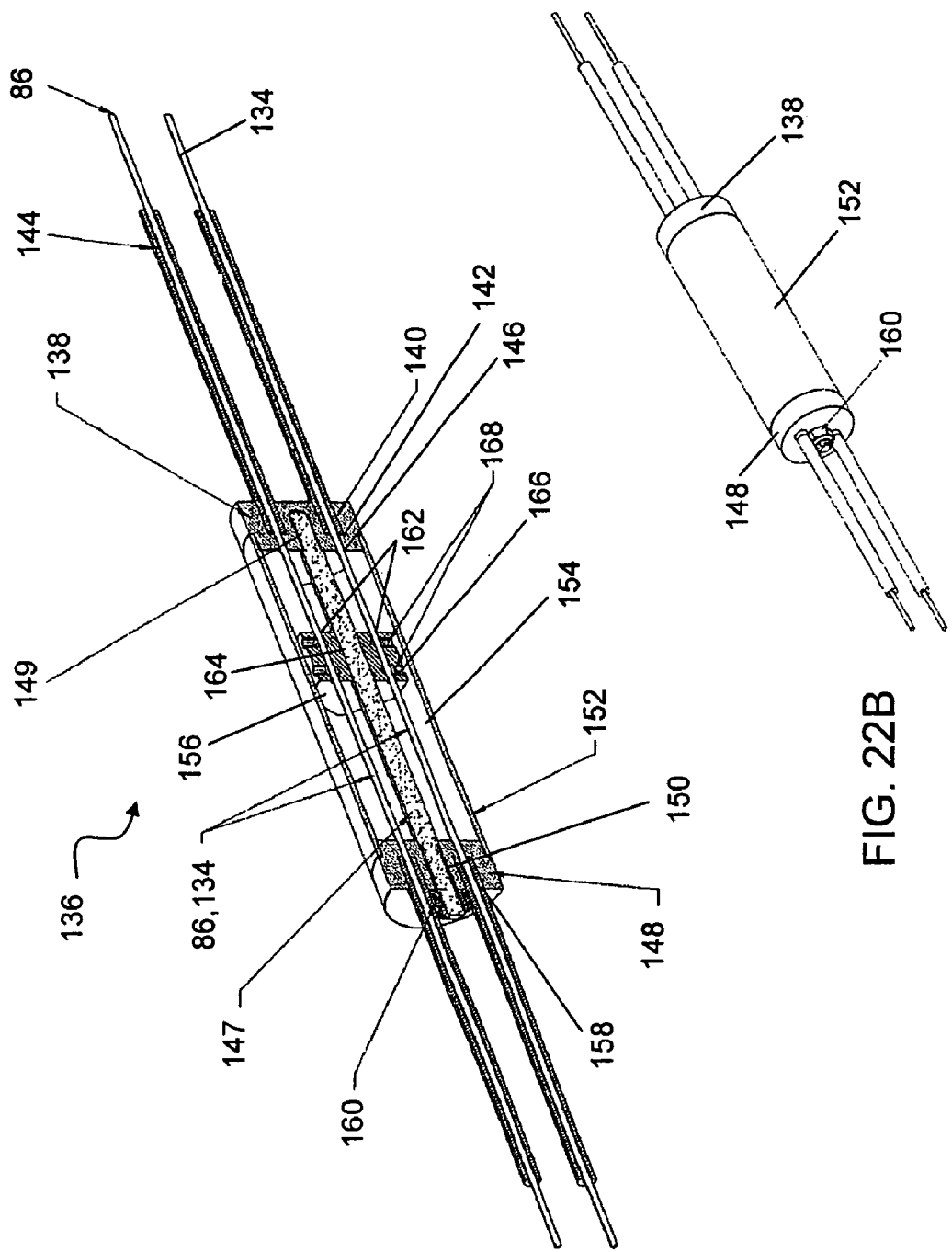

CONVERTIBLE STROLLER-CYCLE

This application is related to Applicant's co-pending U.S. patent application Ser. No. 11/898,791 titled "CONVERTIBLE STROLLER-CYCLE" filed Sep. 14, 2007, the entirety of which is hereby incorporated by reference herein.

BACKGROUND OF THE INVENTION

1. Field of the Invention

The present invention relates to a vehicle that is converted from a stroller for carrying a passenger and cycle operated by a rider to a combined unit. More specifically, the invention relates to a stroller and a bicycle combined, physically and operationally, such that the operator of the cycle portion of the stroller-cycle can control operation of the stroller portion while the stroller-cycle is in motion.

2. Description of the Related Art

Many child stroller designs and operator-powered bicycles and tricycles are well-known in the art. One such stroller design is disclosed in U.S. Pat. No. 5,590,896 to Eichhorn.

Eichhorn discloses a three-wheeled collapsible stroller having a front wheel assembly 320 that is selectively lockable into a straight-ahead position. The stroller includes independently removable rear wheels 260 and 270 and brake mechanisms to prevent rotation of the rear wheels 260 and 270. A fabric seat assembly 800, for carrying a child, is supported between a handle tube 20 and front tubes 40 and 45. A seat-back 801 of the seat assembly 800 can be oriented in an upright or reclined position. In the fully extended, unfolded configuration, optional spring-loaded latch handles 140 and 150 operate to lock the stroller into the unfolded configuration. When converted into the collapsed configuration, the handle tube 20 rotates downwardly, causing front tubes 40 and 45 to rotate downwardly, thereby bringing the front wheel assembly 320 towards the rear wheels 260 and 270.

A second stroller device is disclosed in U.S. Pat. No. 5,558,357 to Wang. Wang discloses a foldable three-wheeled trolley that can accommodate a seat for carrying a baby between a pair of push members 60. The trolley includes a straight main body 10, a slide member 20 slidable thereon, a fork 11 at a front end, and two transverse axle units 50 at a back end. The slide member 20 connects to back ends of a pair of support rods 60 via a U-shaped member 30 pivotably connected at both ends. When reconfiguring the trolley for transport or storage, the slide member 20 slides forward along the main body 10, rotating support rods 60 downward and the transverse axle units 50 forward and retracting rear wheels 54 alongside main body 10.

U.S. Pat. No. 5,562,300 to Nelson discloses a stroller having a tricycle configuration capable of carrying at least one child safety seat. The stroller has foldable right and left handlebars 40 and 42 attached at a back end of parallel right and left longitudinal frame members 30 and 32. A front wheel 12 removably attaches between frame members 30 and 32 at their respective front ends. The stroller also includes parallel first and second lateral members 18 and 20 having V-shaped end members 22 at opposing ends thereof to which main wheels 14 and 16 removably attach. The first and second lateral members 18 and 20, along with right and left lateral seat latch attachment rods 48 and 50, provide for mounting at least one child seat thereto.

U.S. Patent Application Publication No. US 2001/0035626 A1 to Kettler discloses a tricycle comprising a front frame 6, a rear frame 1, and an intermediate frame 12. The front frame 6 includes a handlebar 8, a front wheel 10, pedals 22 for driving the front wheel 10, and an inner telescopic tube 17 at a back end. The rear frame 1 includes a first seat 5, an outer telescopic tube 16, and a rear axle 2 with rear wheels 3 and 4 mounted at opposing ends thereof. The inner telescopic tube 17 of the front frame 6 is slidable into the outer telescopic tube 16 of the rear frame and can be locked at different positions therein. The intermediate frame 12 includes a second seat 13, lateral foot rests 15, a holding element 14, an outer telescopic tube 16 at a front end, and an inner telescopic tube 17 at a back end. In an alternate configuration, the inner telescopic tube 17 of the front frame 6 is slidable into the telescopic tube 16 of the intermediate frame 12 and lockable at several positions therein, while the outer telescopic tube 16 of the intermediate frame 12 is slidable over the inner telescopic tube 17 of the rear frame 1, and is also lockable at several positions therein. Therefore, Kettler discloses a tricycle that can be lengthened to accommodate a second rider by inserting the intermediate frame 12 between the front and rear frames 6 and 1. Additionally, the tricycle's length can be varied depending on the locking position(s) of the inner telescopic tube(s) 17 within the outer telescopic tube(s) 16.

U.S. Pat. No. 6,164,666 to Prea discloses a bicycle convertible into a tricycle and vice versa. In the tricycle configuration, an axle 9, having both a tricycle axle 36 and a bicycle axle 37, mounts to a back end of a single-beam arm 13. In the bicycle configuration, the bicycle axle 37 is detached from the tricycle axle 36 and mounted to the back end of the single-beam arm 13, wherein a wheel 8 mounted at an end of the bicycle axle 37 opposite the single-beam arm 13 longitudinally aligns with a steerable front wheel 3. The bicycle also includes a seat 1, handlebars 2, a frame 4, and pedals 5 and 6.

Next, U.S. Patent Application Publication No. US 2003/0151225 to Lopez discloses a tricycle having a single tube frame with a front portion 40 and a rear portion 44. Adjustable handlebars 37, a front fork 42, and a front wheel 26 attach to a front end of the frame while foldable brackets 48 and a foldable seat 72 mount at a back end thereof. A rotatable pedal crank mounts to a bracket 47 extending from the front fork 42 for driving the front wheel 26 via a continuous chain 32. The foldable brackets 48 pivotably attach to the rear portion 44 at one end and pivotably attach to a bracket 64 at an opposing end. A rear wheel 25 attaches to an outer end of each bracket 64. By releasing pin 62 from a mating plate 61, the brackets 48 fold forward, collapsing the foldable seat 72 while rear wheels 25 remain substantially parallel due to hinged brackets 64. The tricycle alternately includes an intermediate member disposed between the front portion 40 and rear portion 44 lengthening the tricycle and providing a tandem seating arrangement for two passengers.

Finally, U.S. Pat. No. 2,468,933 to Jones discloses a two-wheeled vehicle that is convertible from a two-wheeled scooter to a bicycle and vice versa. The vehicle is essentially a push scooter including a frame 13, rear and front wheels 1 and 2, a footrest 16 disposed between longitudinal extending frame tubes 14 and 15, and adjustable handlebars 5b for steering. Additionally, an arcuate-shaped support 25, including a seat 19, foot pedals 20 and 21, and a pulley 46, can easily be attached and removed from the frame 13, converting the vehicle from a two-wheeled scooter into a bicycle and vice versa. When the arcuate-shaped support 25 is attached to the frame, a belt 47 slips onto the pulley 46 and a second pulley 45 for transferring the motion of the pedals 20 and 21 to the rear wheel 1 to drive the vehicle.

Although the related art described above discloses strollers having the capability to fold in a compact manner for storage or transportation, vehicles extendable by adding additional frame members, and vehicles convertible from a two-wheeled orientation to a three-wheeled orientation, the related art fails to disclose converting a steerable and pushable stroller for carrying a passenger, such as a child, and a separate bicycle into a ridable operator-powered stroller-cycle by combining the vehicles both physically and operationally.

SUMMARY OF THE INVENTION

The present invention relates to a combination stroller-cycle vehicle. The stroller-cycle is a vehicle for pushing and riding. The vehicle includes a frame having a front portion and a rear portion. The front portion of the frame has a lower connection post containing braking and steering components and the rear portion of the frame has an upper connection post containing braking and steering components for the rear portion. The upper and lower connection posts can be rigidly engaged, for example, threadedly engaged within a steering portion of the frame. A lever assembly may be connected to the steering portion of the frame and include a crossbar that supports a front fork component of the rear portion of the frame.

The present invention also relates to a cable splicing assembly for guiding therethrough a pair of control cables in the vehicle. The cable splicing assembly includes a brake splicing housing canister having equal circumferential openings at both ends with a housing cap joined to the first end and an end cap joined to the second end of the housing canister to close the circumferential openings. A piston is configured to slide axially within a cavity formed within the housing canister between the opposite ends thereof in response to movement in the pair of control cables. A slide rod is threadedly joined to the housing cap and the end cap and secured by a nut tightened against the end cap and the piston is configured with an aperture to slide on the slide rod in an axial direction.

The present invention also relates to a pushbar mechanism for adjusting the relative position of a pushbar to a back frame of a pushing section in a convertible stroller-cycle. The pushbar mechanism includes a pushbar housing formed with teeth arranged radially on an inner surface, a pushbar mount formed with teeth arranged radially on an inner surface; and a pushbar gear formed with teeth that slidably engages the housing teeth and the mount teeth.

The present invention also relates to a folding mechanism for configuring a back frame of a pushing section in a convertible stroller-cycle. The folding mechanism includes a fold strut rigidly attached to a lower frame portion of the pushing section, a fold bracket rigidly attached to an upper portion of the fold strut, a hollow back frame pivotally connected to the bracket at a pivot point, a fold release rod disposed within the hollow back frame that rigidly attaches at an upper end to a fold release lever and at a lower end to a fold pin housing, a fold pin attached horizontally to the fold pin housing that extends laterally through slots on the back frame and is free to slide longitudinally within the slots, a fixed pin rigidly attached internally transverse of the back frame at a point above the fold pin housing, and a biasing member for urging the fold pin into engagement with a slot in the fold bracket to lock the back frame in a vertical position.

The present invention also relates to a steering lock mechanism for locking rear wheels of a pushing section in a convertible stroller-cycle. The steering lock mechanism includes a steering kingpin, a rotatable turning plate rigidly fixed to the steering kingpin that turns the wheels through a wheel steering pivot, a tie rod connected to the turning plate, a steering lock housing, and a steering lock pin housed within the steering lock housing and rigidly connected to a steering lock knob, wherein the steering lock pin inserts into a hole in the kingpin to prevent the kingpin from rotating and locking the rear wheels from turning.

The present invention also relates to a steering limit stop mechanism for establishing a predetermined range of turning motion for rear wheels of a pushing section in a convertible stroller-cycle. The steering limit stop mechanism includes a steering kingpin, a rotatable turning plate, a tie rod connected to the turning plate, and a stop pin threadedly mounted in the headset tube that protrudes into and permanently rides in a slot in the kingpin.

The present invention also relates to an accessory mounting assembly for attachment of an accessory to a pushing section in a convertible stroller-cycle. The accessory mounting assembly includes an accessory arm housing mount rigidly attached to the frame of the pushing section, an accessory arm attached to the accessory, an arm clip permanently affixed to the accessory arm, and a retaining pin that inserts vertically through holes in the arm clip and the frame of the pushing section to hold an end of the accessory arm in the accessory arm housing mount.

The present invention also relates to a trailor arm mounting bracket for mounting a trailor accessory to a riding section in a convertible stroller-cycle. The trailor arm mounting bracket includes a bracket, a trailor arm attached to the trailor accessory, wherein a ball joint is attached to the free end of the trailor arm, and a retaining pin that holds the ball joint between two horizontal plate portions of the bracket.

It is understood that other aspects of the invention will become readily apparent to those skilled in the art from the following detailed description, wherein it is shown and described only various aspects of the invention by way of illustration. As will be realized, the invention is capable of other and different configurations and its several details are capable of modification in various other respects, all without departing from the scope of the invention. Accordingly, the drawings and detailed description are to be regarded as illustrative in nature and not as restrictive.

BRIEF DESCRIPTION OF THE DRAWINGS

The features of the invention will be more readily understood with reference to the following description and the attached drawings, wherein:

FIGS. 7A to 7E illustrate the assembly steps for the stroller-cycle;

FIGS. 14A to 14C illustrate the braking an steering assembly of the pushing section;

FIGS. 19A to 19G illustrate the braking and steering assembly of the riding section;

FIGS. 22A and 22B illustrate an exploded view of the cable splicing assembly;

DETAILED DESCRIPTION OF THE INVENTION

Figure 1:
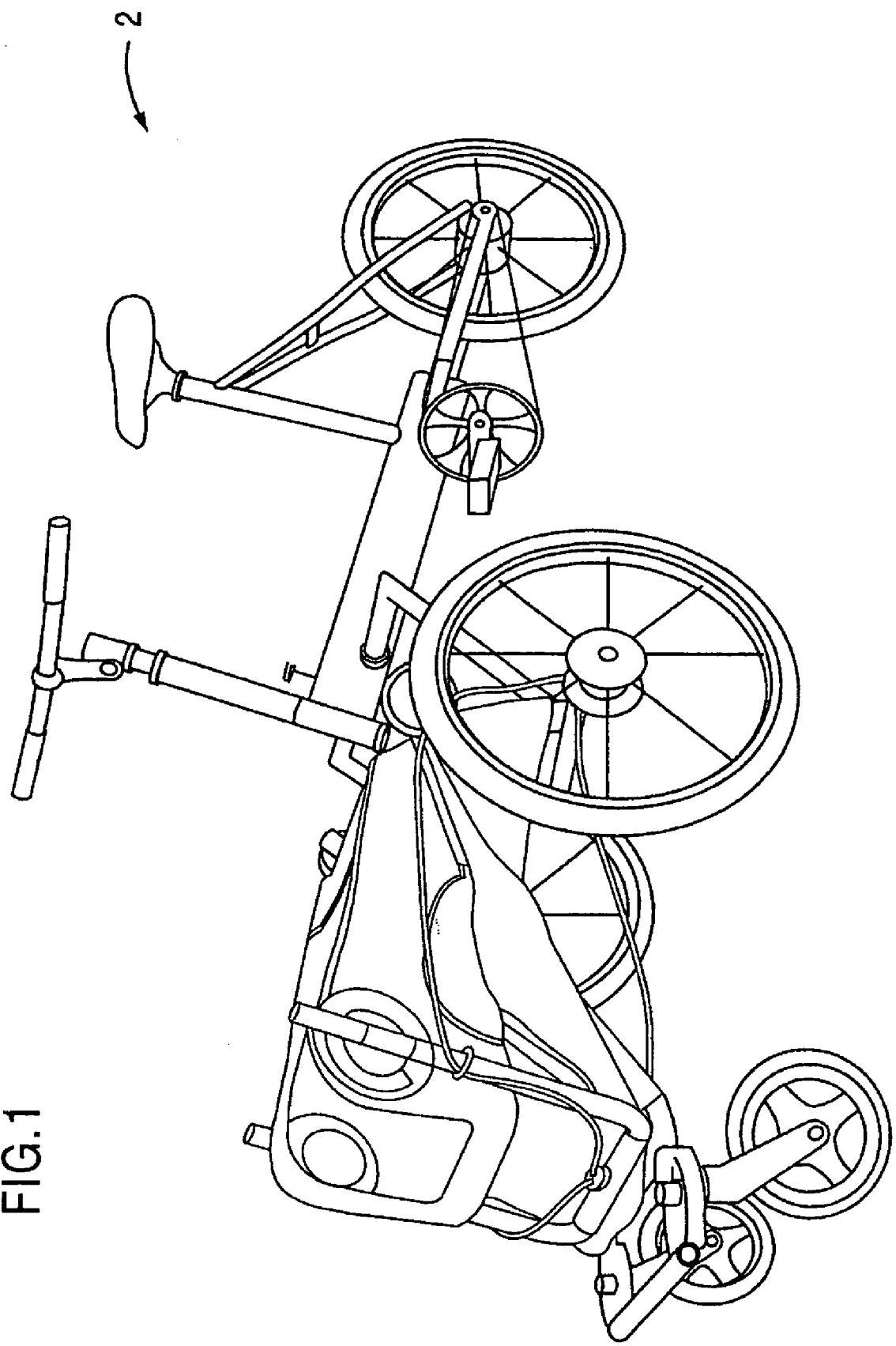
FIG. 1 illustrates a fully assembled stroller-cycle frame and stroller cover according to a preferred embodiment of the present invention.

In the different figures, the same reference numerals designate identical or similar features or components.

Figure 2:
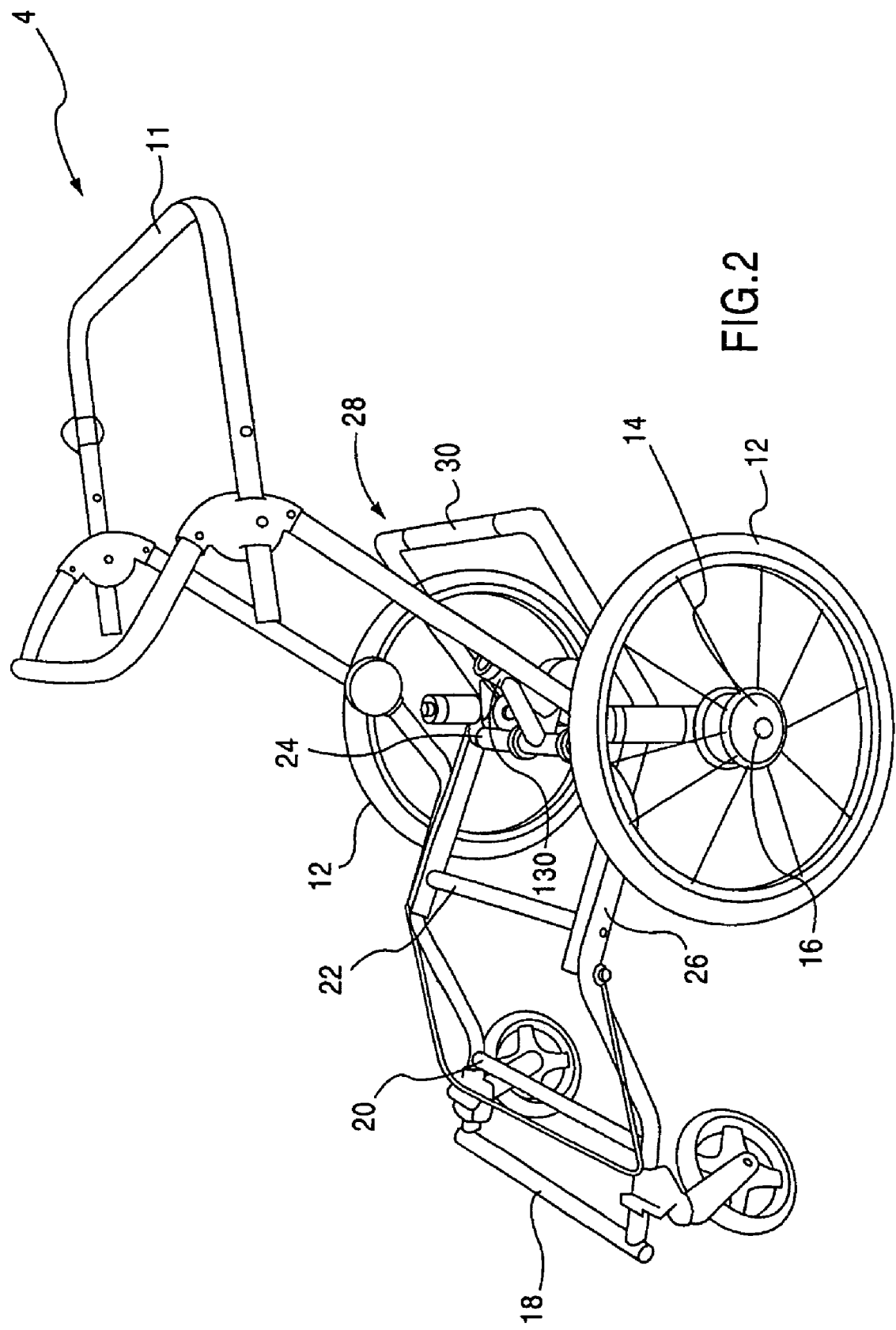
FIG. 2 illustrates an exemplary stroller for the stroller-cycle frame and casters of the pushing section.
Figures 3A, 3B:
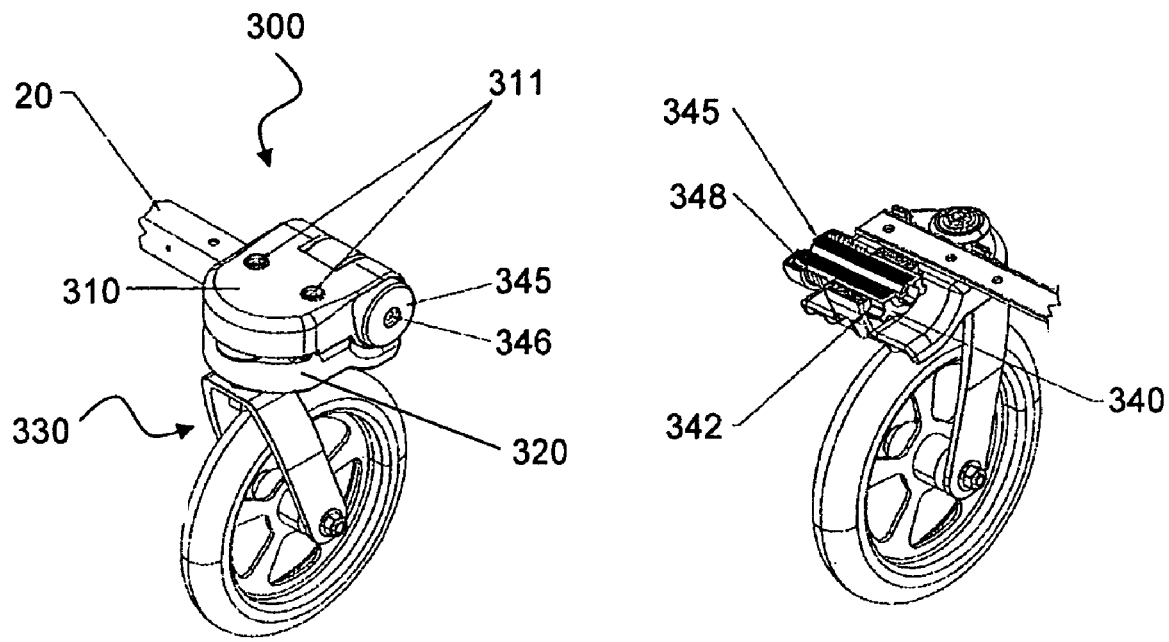
FIGS. 3A-3G illustrate an exemplary caster pivot mechanism and caster wheel assembly for the stroller-cycle frame.
Figure 3C:
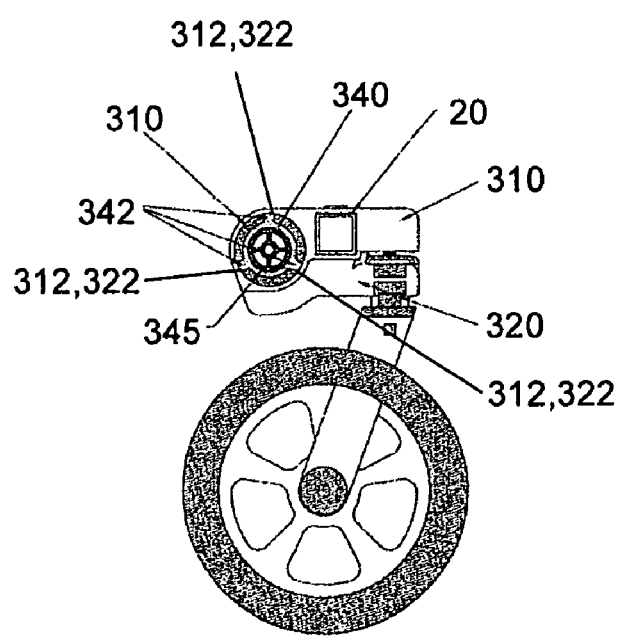
Figure 3D:
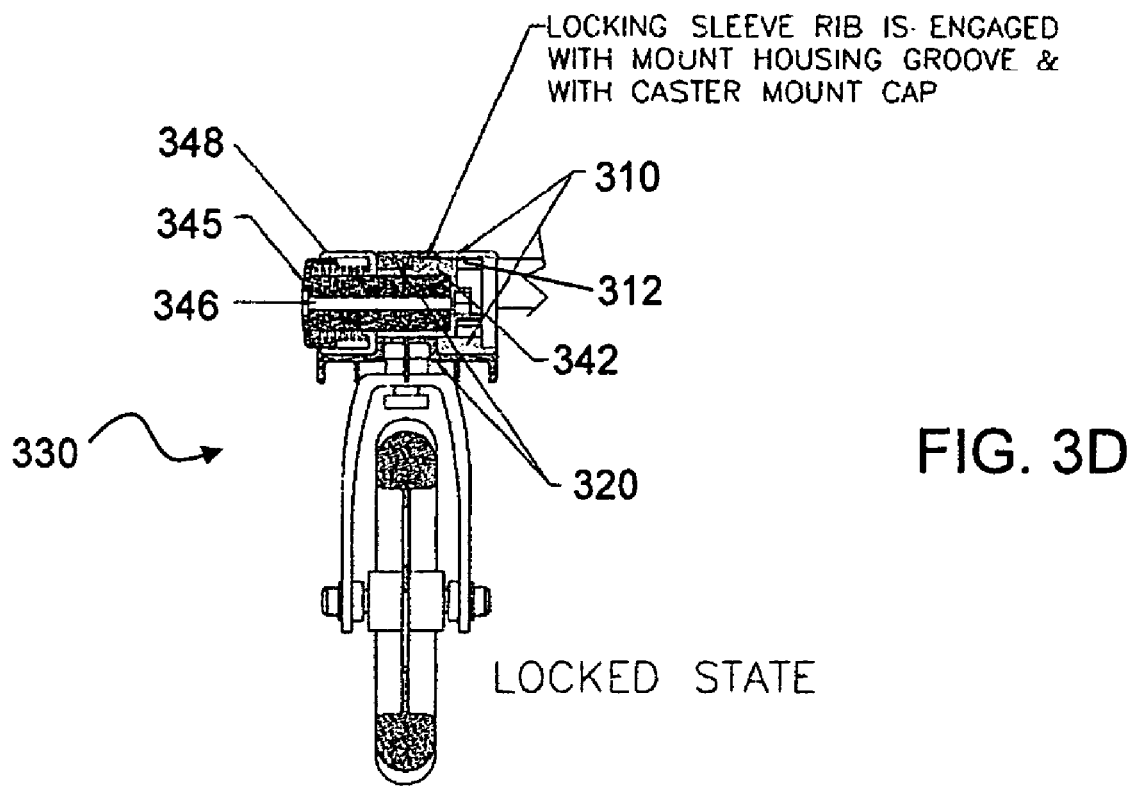

The present invention is related to a vehicle 2 for pushing and riding, for example, a vehicle such as a convertible stroller and cycle wherein the stroller can be pushed while the cycle is ridden. FIGS. 1-4 illustrate a vehicle 2 for pushing and riding having a frame including a pushing section and a riding section. FIG. 1 shows a fully assembled vehicle for pushing and riding including a covering and seat for the passenger seating area of the pushing section. FIG. 2 shows the stroller forming the pushing section 4. FIG. 4 shows the cycle 5 forming a riding section 6.

The stroller forming the pushing section 4 as shown in FIG. 2, has a pair of wheels 12, each with a brake 14, such as, for example, a built-in internal drum brake hub 25 (FIGS. 15B and 15C) and a quick release axle 16. In addition, the pushing section 4 has, in a direction from the front to the rear, a seating area including a front bumper 18, foot support bar 20, knee support beam 22 and cross beam 24 laterally arranged for the comfort of the passenger. The seating portion of the pushing section 4 is connected by pushing section side frames 26. The pushing section 4 also includes a U-shaped steering frame 28 substantially orthogonal to and extending from the cross beam 24. The steering frame 28 includes a hitch beam 30 for connecting the pushing section 4 to the riding section 6. A further connection between the pushing section 4 and the riding section 6 is provided by a hitch post or lower connection post 34 that will be described below.

Figure 2A:
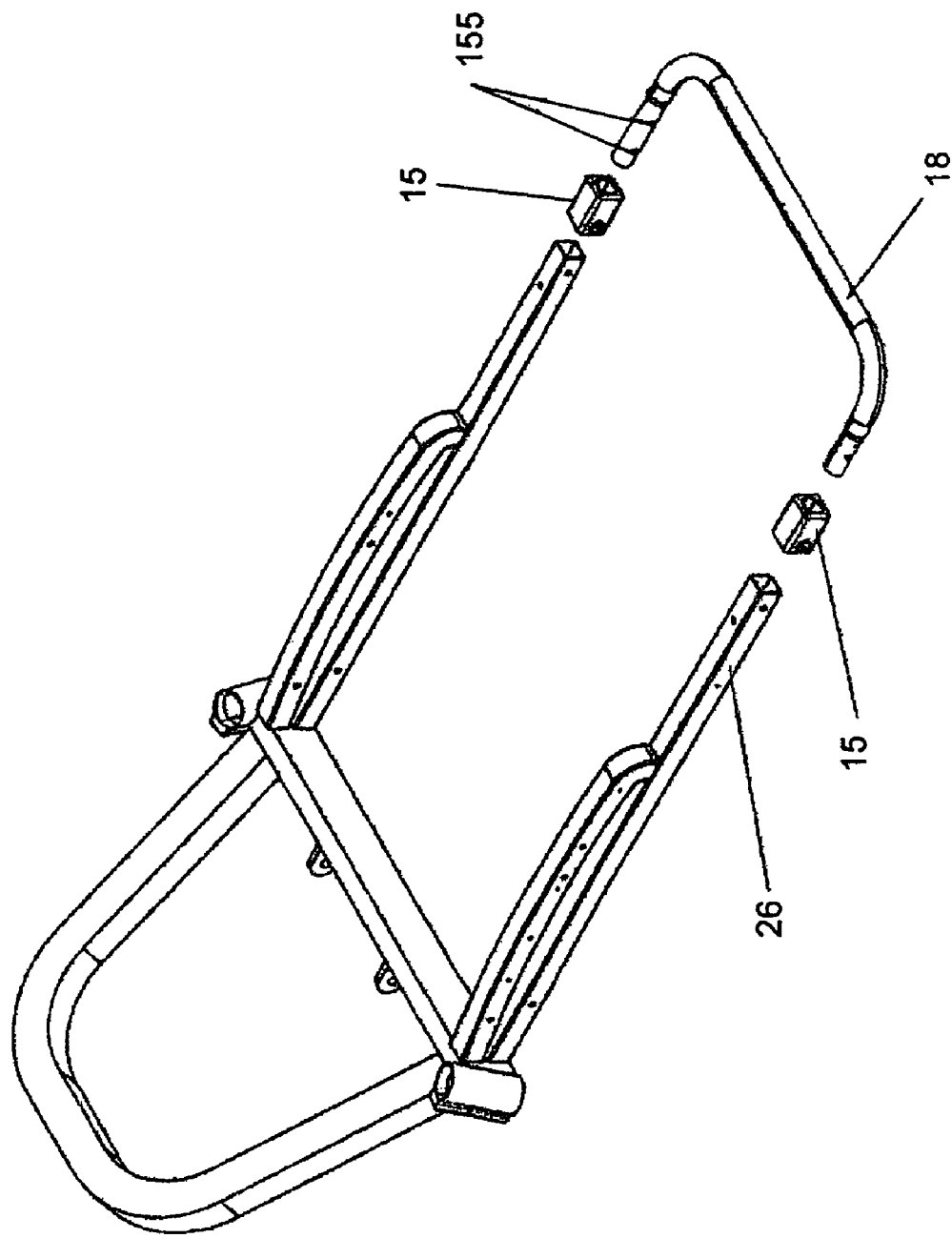
FIG. 2A illustrates a bumper assembly and end caps for the stroller-cycle frame.

FIG. 2A shows plastic bumper end caps 15 which may attach to the distal or front ends of pushing section side frames 26. The end caps 15 may also be made of aluminum or steel, for example, and may attach to the distal ends of the side frames 26 by any suitable means including bolts, rivets, welds, press-fitting or adhesives. The ends of bumper 18 may then slide into the bumper end caps 15 and be joined to pushing section 4 via bolts or quick release buttons. As shown in FIG. 2A, the bumper insert portions of bumper 18 may have multiple mounting positions. Multiple through-holes 155, slots or notches, for example, may be provided toward the insertion ends of the bumper 18. The bumper 18 may then be adjustably secured to the side frames 26 via the bumper end caps 15 and a bolt or rivet, for example. Inserting the bumper 18 closer or further by having multiple insertion positions allows a user to adjust and secure the bumper 18 for riding or storing the vehicle. For instance, securing the bumper 18 in a closer position to the pushing section frame creates a more compact structure for storage. The bumper may be partially or completely covered with a shock absorbent or pliant material, such as foam, to provide a soft surface and cushion in the case of impact. The shape and geometry of the individual components, as well as the overall assembly, of the frame of pushing section 4 are formed and assembled to sustain minimal deformation during a front end collision of the pushing section 4, up to and including a collision at 10 miles per hour. The structure of the frame thus permits continued operation of the pushing section 4 after a front end collision of 10 mph or less.

The front portion or pushing section 4 of the vehicle frame has a pair of casters 62 at a front end thereof for balancing the front portion when the front portion operates separately from the rear portion. The casters 62 are pivotable for operation and non-operation with a push-button caster pivot mechanism 300, as shown in FIGS. 3A-3G. FIG. 3A shows that the caster pivot mechanism 300 may include a caster mount cap 310 that rigidly attaches to the pushing section 4 frame using bolts or rivets 311, for example. Foot support bar 20 may extend beyond side supports 26 to allow attachment of the caster pivot mechanism external to the pushing section 4 frame. A caster mount housing 320 may be pivotally connected to the caster mount cap 310 and have the caster wheel assembly 330 affixed thereto. The caster mount housing 320 may pivot about a caster locking sleeve 340.

As shown in FIG. 3B, the caster locking sleeve 340 may comprise locking sleeve ribs 342 and be attached to a pushbutton 345 by a bolt 346. Any means of attachment may be used including a rivet, press-fit, or adhesives, for example. As shown in FIG. 3C, the caster locking sleeve 340 may comprise three ribs 342 equally spaced circumferentially around a central axis. The ribs 342 may extend axially a predetermined distance from a peripheral end of the locking sleeve 340 opposite the pushbutton 345. As shown in FIG. 3C, when in a locked position, the ribs 342 on the caster locking sleeve 340 engage grooves 312 in the caster mount cap 310 and grooves 322 in the caster mount housing 320. As shown in FIG. 3D, the caster pivot mechanism 300 may be maintained in a locked position by engagement of the ribs 342 in the caster mount housing 320 through use of a biasing mechanism, which may be a spring, coil, and the like, 348 that exerts outward pressure on the pushbutton 345.

Figure 3E:
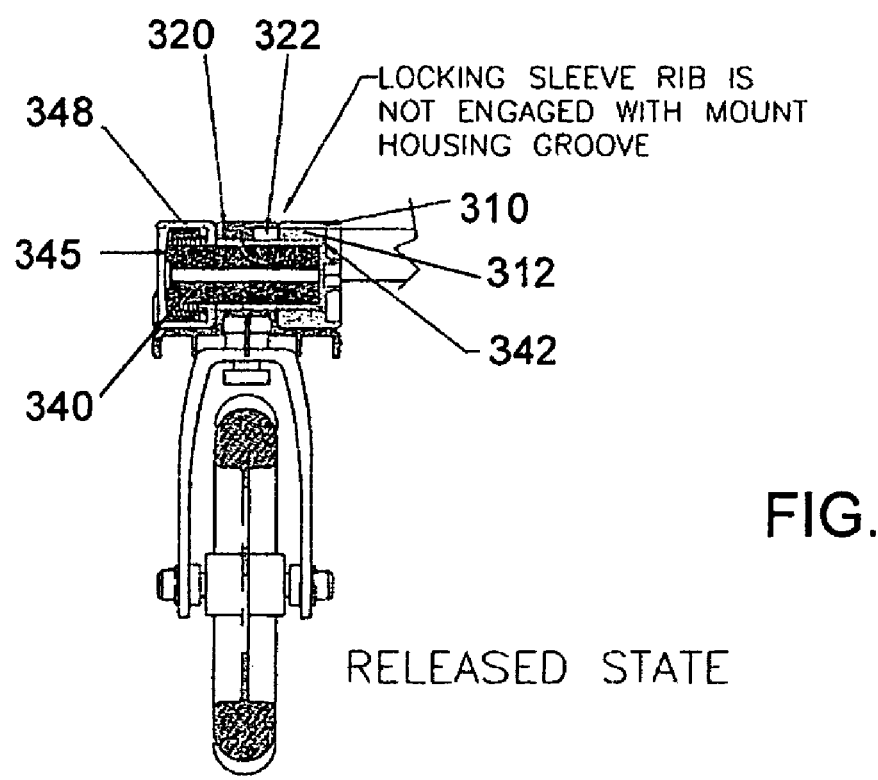
Figure 4:
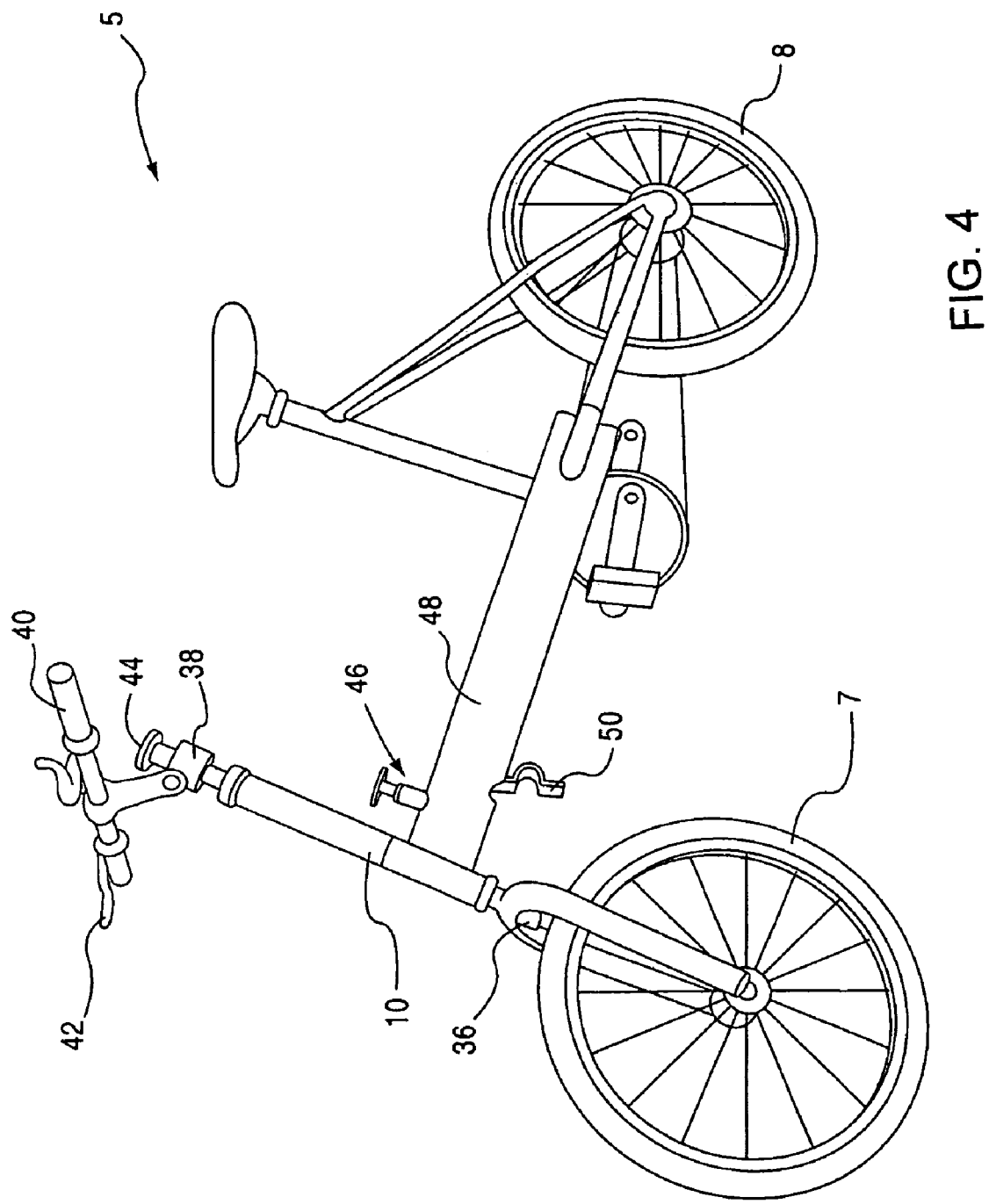
FIG. 4 illustrates an exemplary cycle for the stroller-cycle frame.

As shown in FIG. 3E, the pushbutton 345 may be pressed inward to release the ribs 342 from the grooves 322 in the caster mount housing 320. The ribs 342 slide out of the grooves 322 allowing the caster mount housing 320, with the caster wheel assembly 330 attached, to pivot freely around the axis of the locking sleeve 340. In this manner, the locking sleeve 340 serves as the pivot axle for the caster mount housing 320. The locking sleeve 340 does not rotate as it is held firmly by the ribs 342 that extend into the grooves 312 (shown in dotted lines) in the rigidly fixed mounting cap 310. The ribs 342 always remain engaged in the grooves 312 of the mounting cap 310.

Figure 3F:
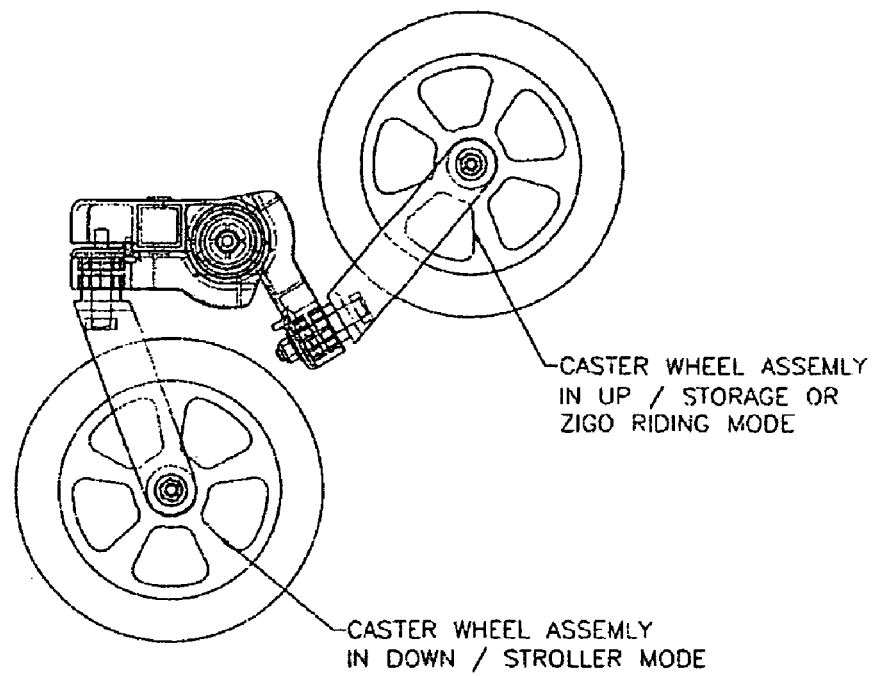

As shown in FIG. 3F, with the caster mount housing 320 free to rotate around the pivot point, a user can turn the caster mount housing and the attached caster wheel assembly to the "storage" position where it will lock in place. The biasing mechanism 348 continues to exert outward pressure on the pushbutton 345 and the locking sleeve 340, which forces the ribs 342 to re-engage grooves 322 in the caster mount housing 320 that align when the caster mount housing 320 is rotated to the "storage" position. The caster pivot mechanism 300 remains in the locked "storage" position until a user presses the pushbutton 345 to disengage the ribs 342 and allow rotation of the caster mount housing 320 in the reverse direction to the "operational" position.

Figure 3G:
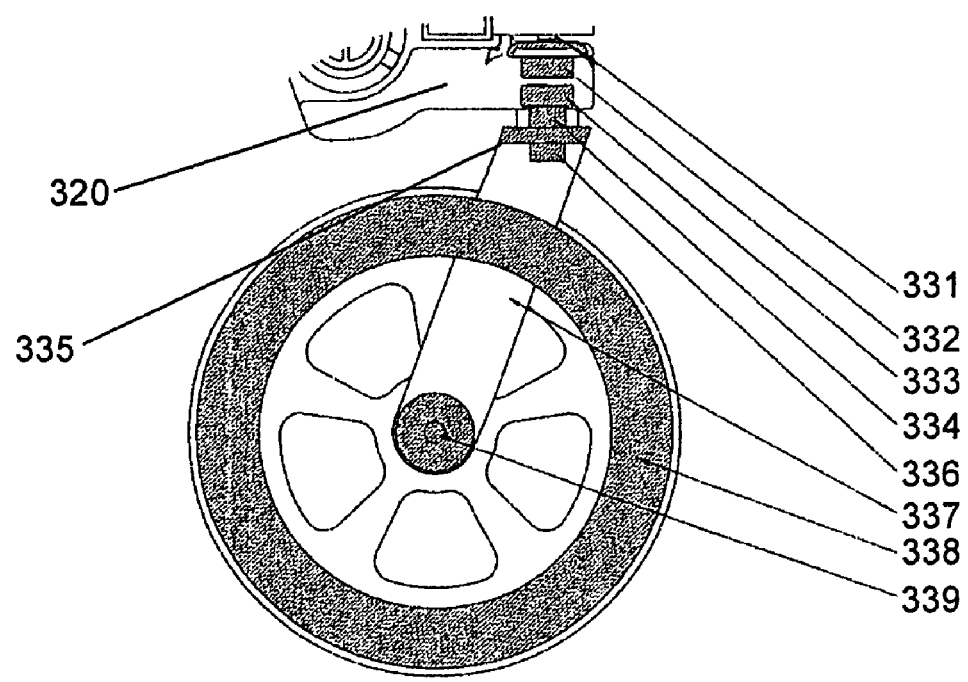

FIG. 3G illustrates the caster wheel assembly 330. The wheel assembly 330 may be attached to the caster mount housing 320 by a mounting post 331 that slides through an upper bearing 332, an aperture in the caster mount housing 320, a lower bearing 333, a spacer 334, and an aperture in a horizontal portion of the caster fork 335. The mounting post 331 may have a threaded end to secure the assembly with a mounting nut 336. The spacer 335 provides clearance of the caster fork 335 from the caster mount housing 320. Washers may be provided between one or more of the parts of the caster wheel assembly 330 to prevent damage and wear. The caster fork 335 has two fork arms 337 that extend vertically from the horizontal portion of the caster fork 335. The fork arms 337 are supported on each side of the caster wheel 338 by an axle 339 that extends horizontally through holes or slots provided near the free ends of the support arms 337 and the center hub of the caster wheel 338. Nuts or axle caps, for instance, secure the axle in place with the caster wheel 338 centered between the fork arms 337 of the caster fork 335. The support arms 337 may be formed to extend vertically at a predetermined angle when measured from the center axis of the mounting post 331. In this manner, the caster fork 335 and mounting post 331 are free to rotate by way of bearings 332, 333 so that the caster wheel 338 may easily follow any direction of motion when the pushing section 4 is a stroller and is being pushed.

For example, as shown in FIG. 3F, when the pushing section 4 is a stroller and operates separately from the rear portion or riding section 6, the casters 62 are pivotable downward and locked in the operational state to balance the stroller. When the pushing section 4 is combined with the rear portion or riding section 6, the casters 62 are pivotable upward and may be locked in a non-operational, or storage, state as also shown in FIG. 3F.

The cycle 5, which forms the riding section 6, as shown in FIG. 4, is illustrated as having a single front wheel 7 and rear wheel 8, for example. A cycle fork holds the front wheel 7 and allows the operator to steer. The fork is connected through a hollow fork-steerer tube 36 to the head tube 10 and stem 38 to the handlebars 40. The handlebars 40 have a brake lever 42 mounted thereto. The stem 38 is hollow so as to insert the front braking and steering assembly for the stroller-cycle 2.

In the front braking and steering assembly, a front connection knob 44 is inserted into the stem 38 and is rotatably tightened and loosened to control the connection and disconnection, respectively, of the front braking and steering assembly for the stroller-cycle 2. The cycle 5, forming the riding section 6, also includes a hitching assembly 46 on the downtube 48 of the cycle 5. The hitching assembly 46 includes an attaching mechanism or hitch clamp 50 and a hitch pin for allowing the hitch clamp to pivot in the open and closed positions on the downtube 48 of the riding section 6.

The cycle 5 can be formed of an aluminum frame, for example. The seatpost of the cycle can have a quick release mechanism for removing the seat. The rear wheel 8 of the cycle 5 can have mounted thereon a multi-speed internal geared hub for changing the gears of the cycle 5.

Figure 5:
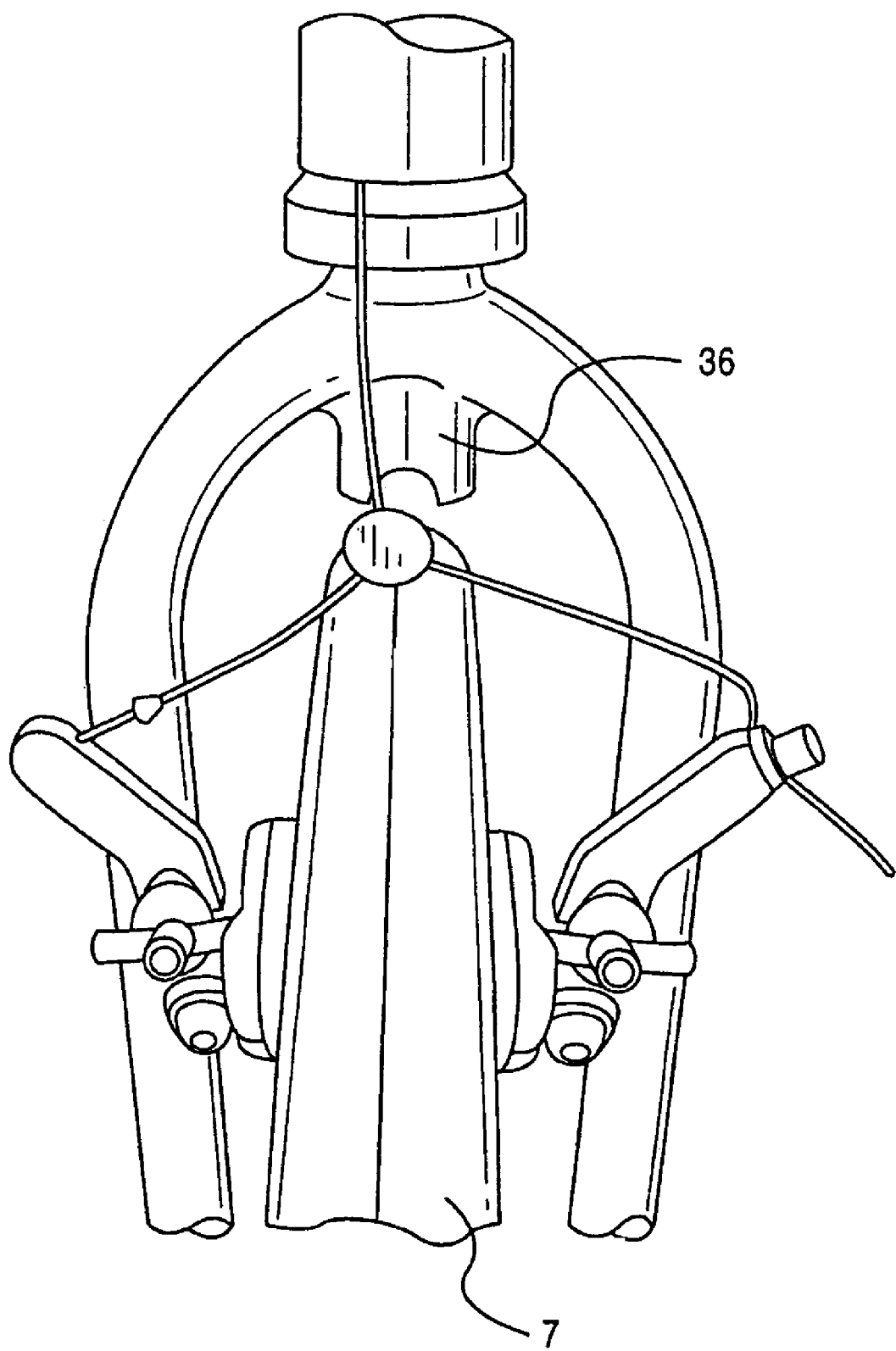
FIG. 5 illustrates a detailed view of the fork steerer tub.

In the present invention, a separate stroller and cycle can be easily and quickly converted to the stroller-cycle 2 of the present invention without tools so that a cycle operator can transport a stroller passenger. The conversion of a separate stroller and cycle to a convertible stroller-cycle 2 is accomplished by removing the front wheel 7 of the cycle 5 shown in FIG. 4 to form a riding section 6. Then, the related front wheel braking components shown FIG. 5 are disconnected. The pushing section 4 is then attached to the front of the cycle 5 in place of the cycle front wheel. The cycle and stroller braking controls are combined in the steering column or head tube 10 of the riding section 6 so that the operator can control the braking action of both the riding section 6 and the pushing section 4 of the stroller-cycle 2. In the present invention, the term cycle includes a bicycle, tricycle, tandem cycle or any other operator-powered cycle. The present invention considers that the term cycle also includes an electrical or fuel-powered cycle. The connection between the riding section 6 and pushing section 4 of the convertible stroller-cycle 2 will now be described.

Figure 6:
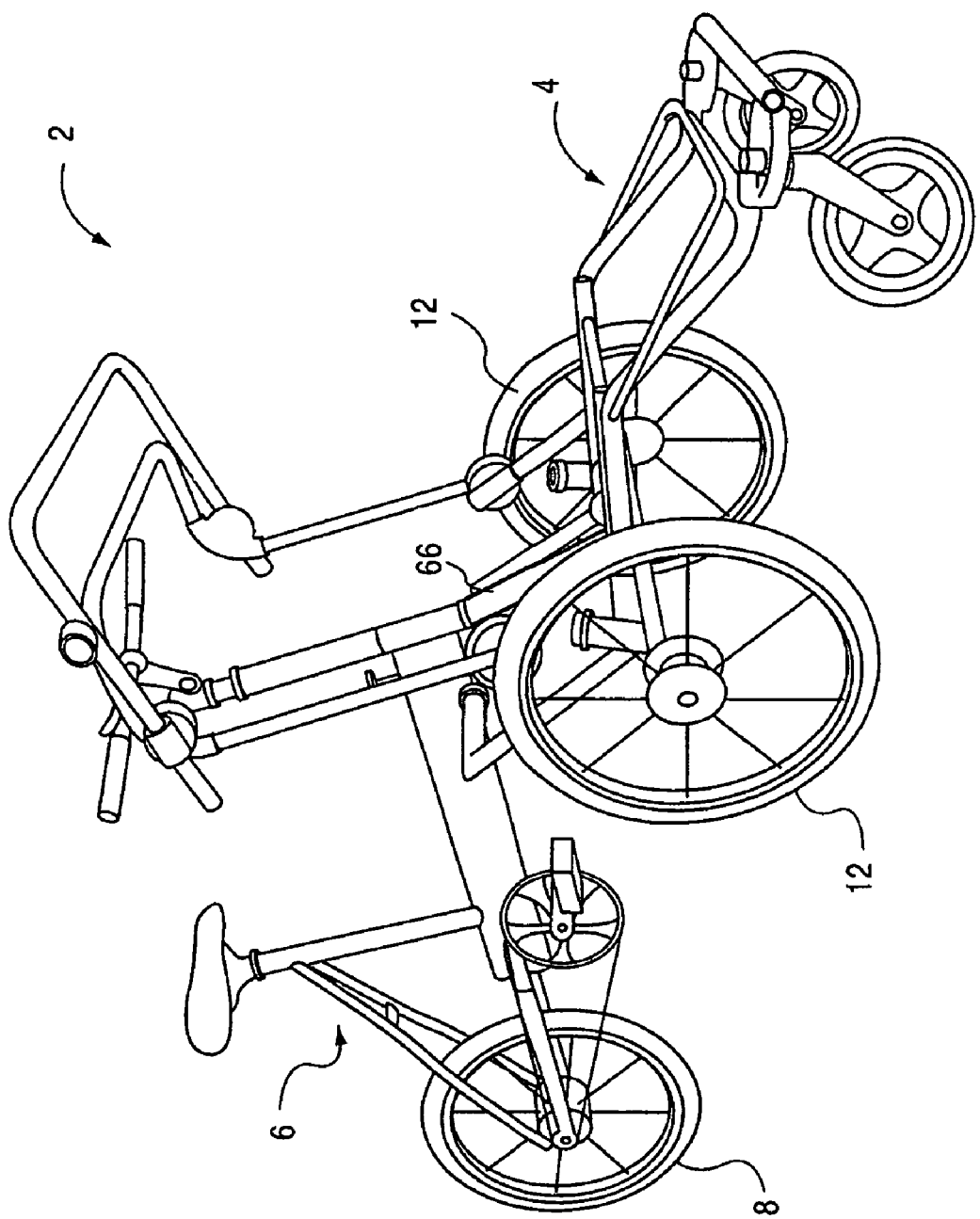
FIG. 6 illustrates the stroller-cycle frame.

FIG. 6 shows a perspective view of a completed frame for the vehicle for pushing and riding. The vehicle or stroller-cycle 2 has a front portion and a rear portion. The front portion includes the pushing section 4, having a passenger seating area, and the rear portion includes the riding section 6, having an operator seating area. The front portion of the frame has a lower connection post 34 containing the braking and steering components for the front portion. The rear portion of the frame has an upper connection post containing the braking and steering components for the rear portion. The upper and lower connection posts can be threadedly engaged, interference-fit or fastened by another method within the head tube 10 of the frame. The pair of front wheels 12 is operationally connected to the front portion of the vehicle frame and at least one rear wheel 8 is operationally connected to the rear portion of the vehicle frame. The rear wheel 8 can be a single wheel as shown in FIG. 6 or can be a plurality of in-line wheels such as in a tandem cycle.

Figure 7B:
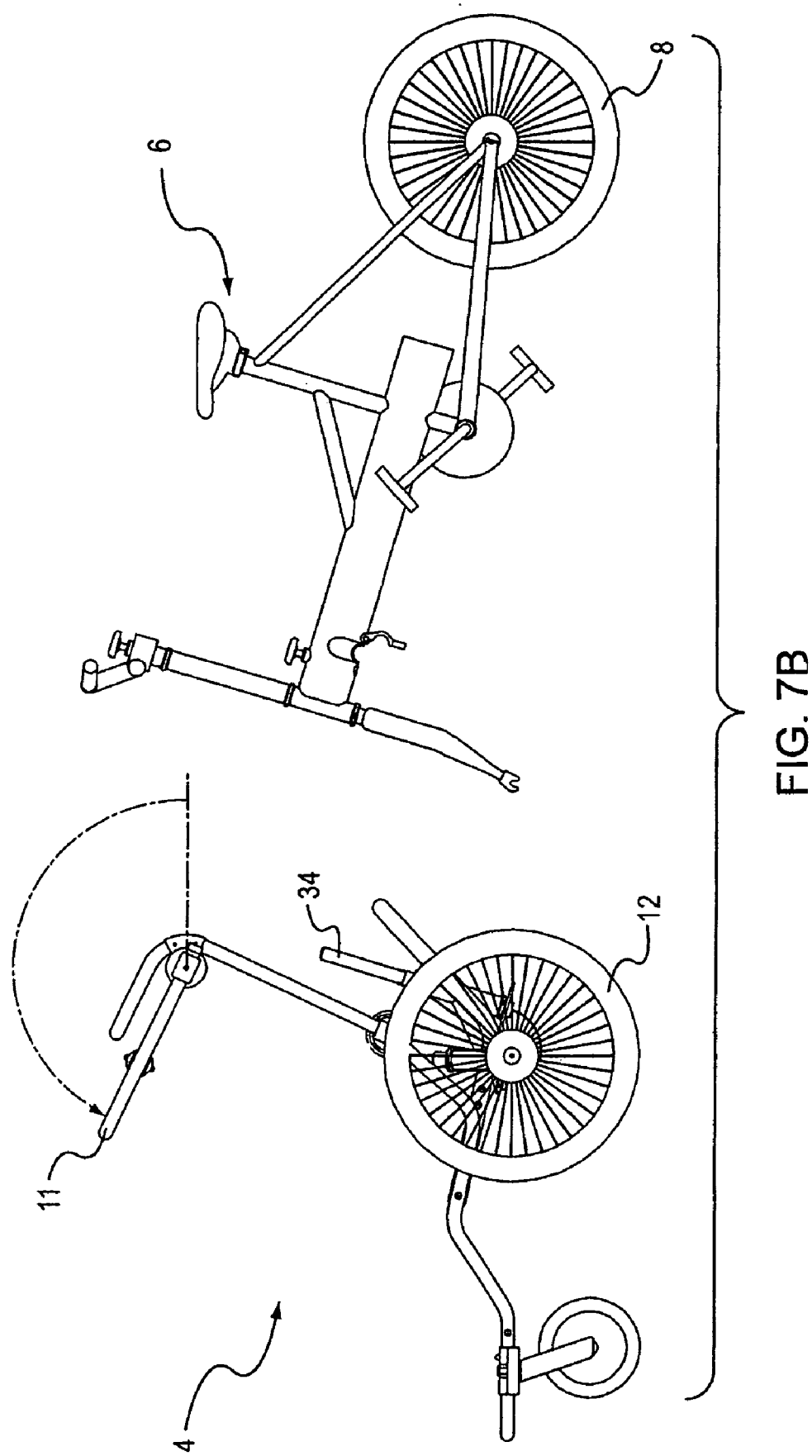
Figure 7C:
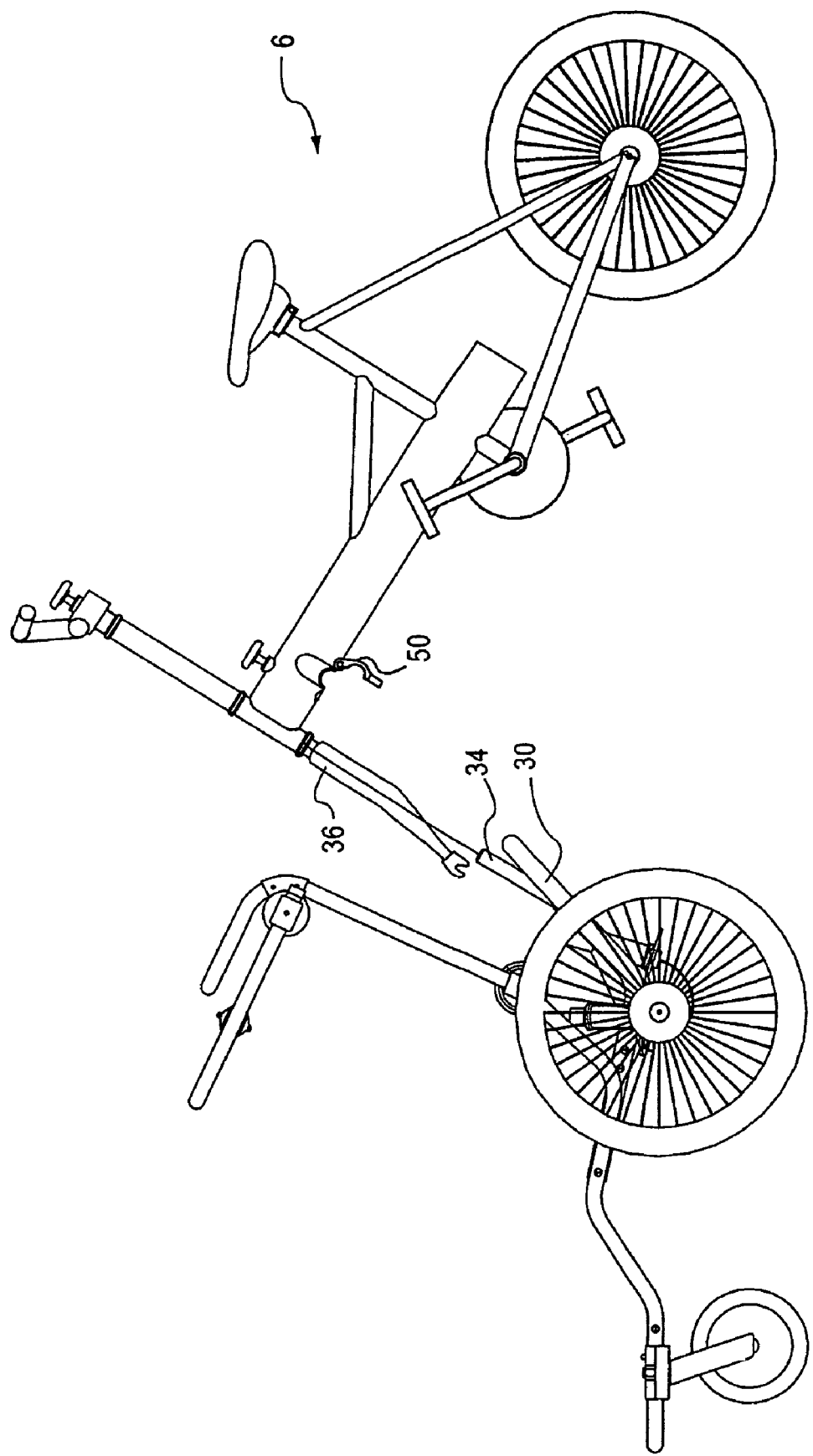
Figure 7D:
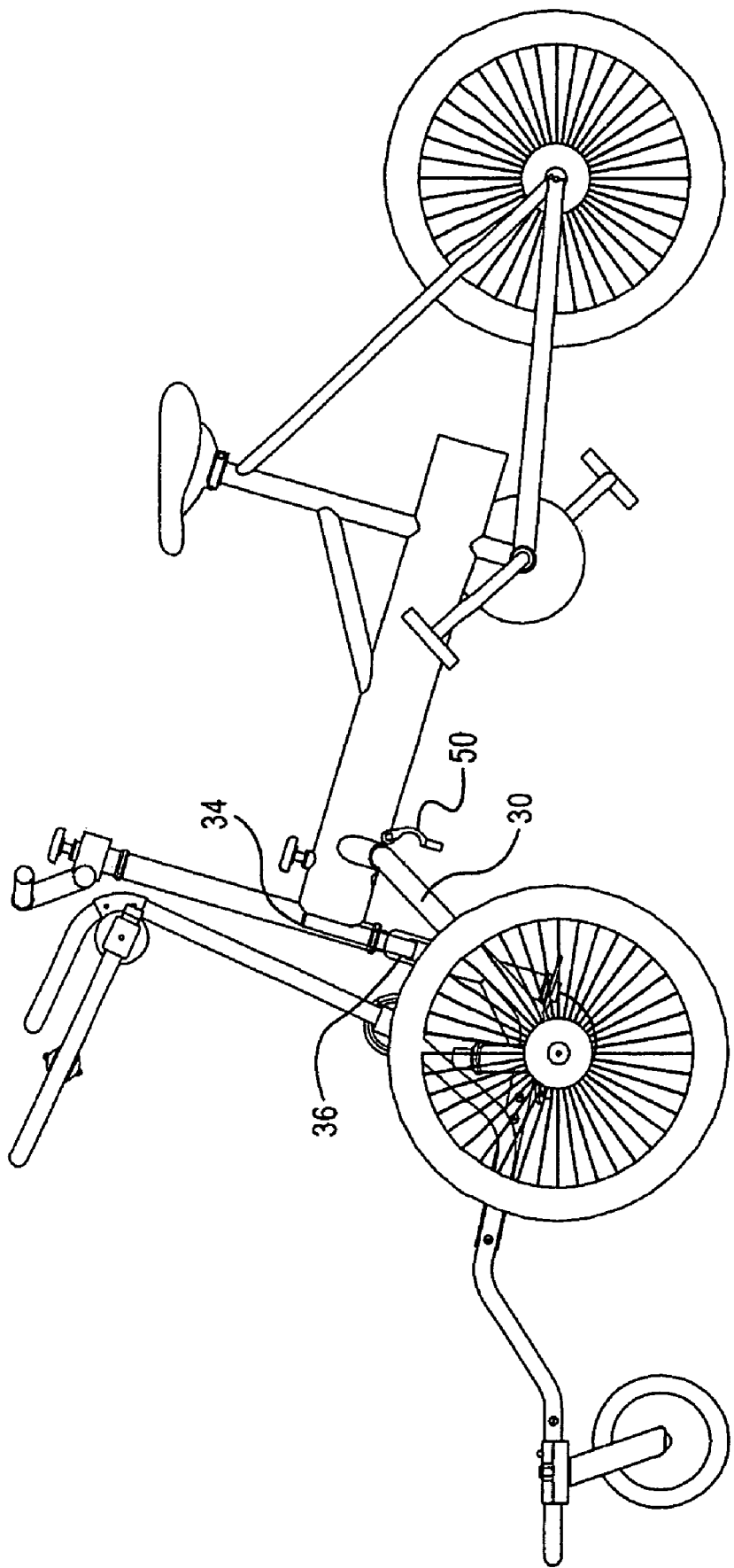
Figure 7E:
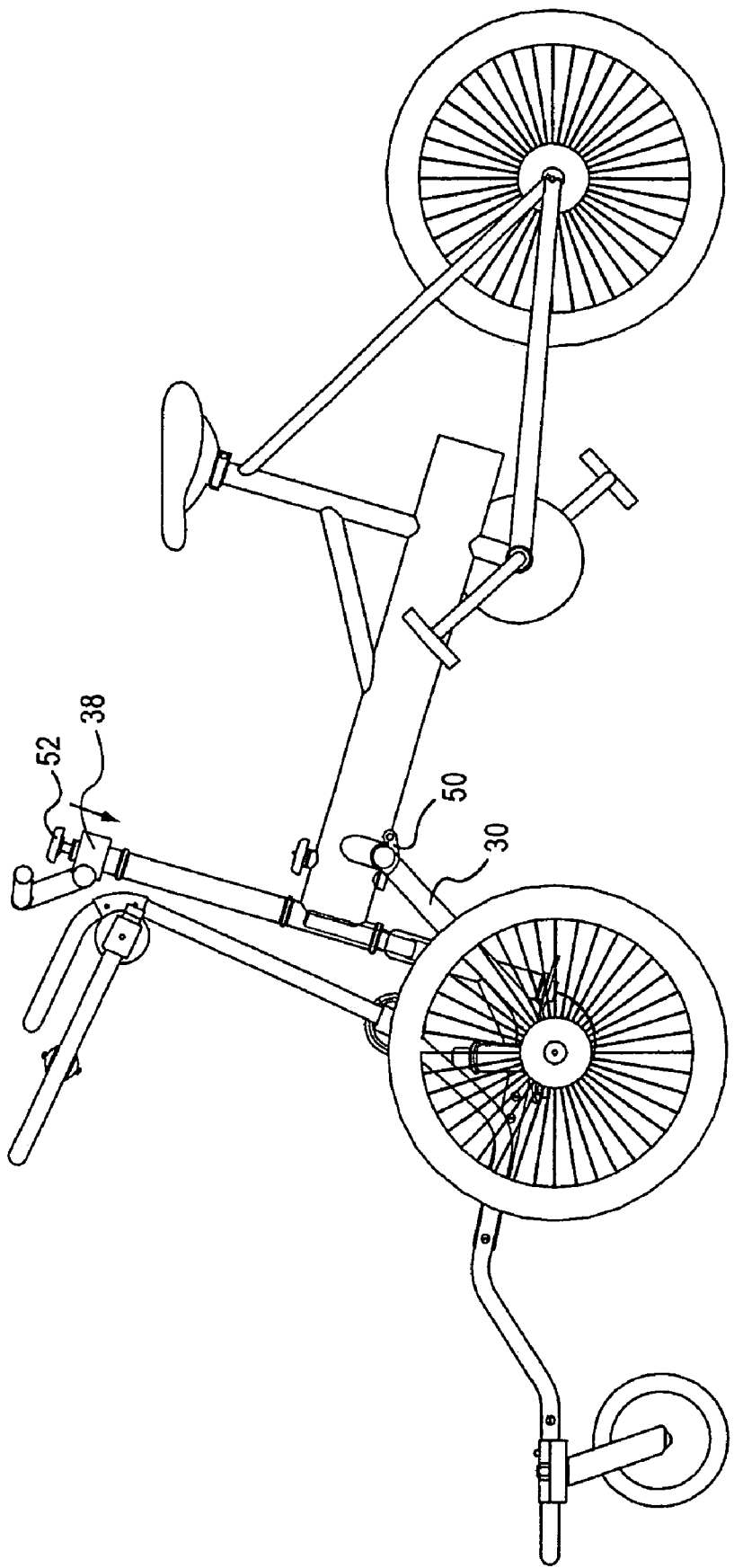

FIGS. 7A through 7E illustrate a process for converting from the separate stroller and cycle to the stroller-cycle 2 shown in FIG. 6. FIG. 7A illustrates the stroller forming the pushing section 4 and the cycle 5 forming the riding section 6. FIG. 7B illustrates the removal of the front wheel 7 from the cycle 5 and the rotation and locking of the stroller pushbar 11 from extending in a direction toward the rear of the stroller to extending in a direction toward the front of the stroller. FIG. 7C illustrates the alignment of the center of the cycle hollow fork-steerer tube 36 with the lower connection post 34 on the pushing section 4. FIG. 7D illustrates the sliding of the hollow fork-steerer tube 36 over the top of the lower connection post 34, or alternatively, the insertion of the lower connection post into the hollow fork-steerer tube 36. In addition, FIG. 7D illustrates the positioning of the hitch beam 30 of the pushing section 4 in the hitch clamp 50 of the riding section 6. FIG. 7E illustrates the tightening of the front connection knob 52 into the stem 38 for connecting the braking and steering assembly of the riding section 6 with the braking and steering assembly of the pushing section 4 and closing of the hitch clamp 50 around the hitch beam 30.

Figure 8A:
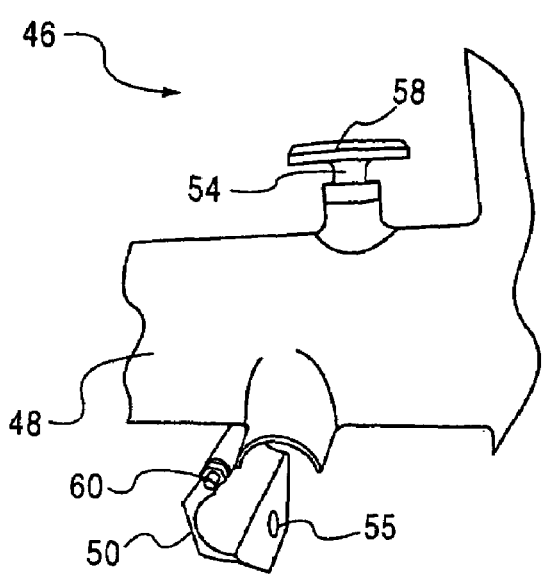
FIGS. 8A to 8D illustrate the hitch assembly.
Figure 8B:
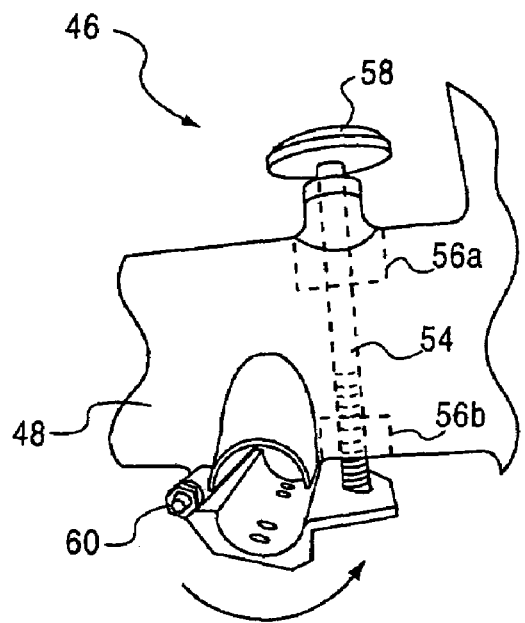
Figure 8C:
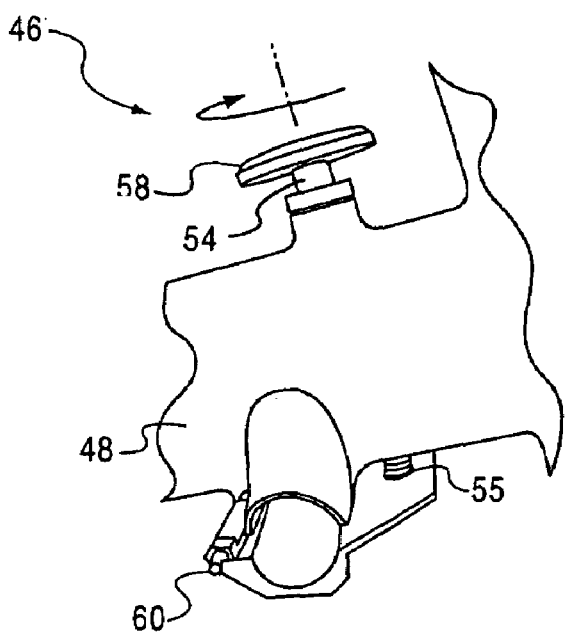
Figure 8D:
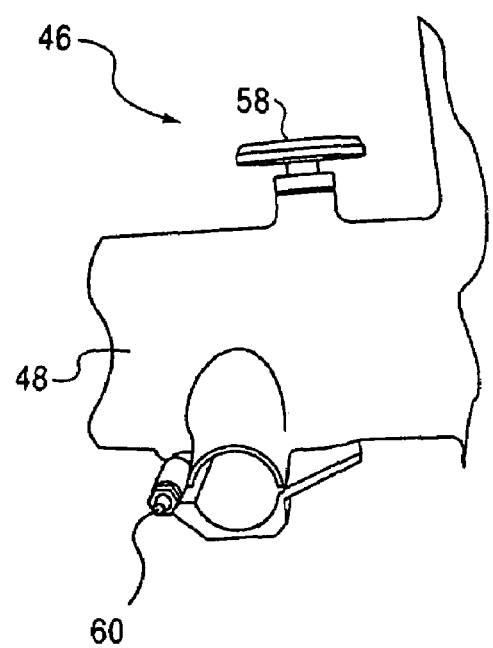

The hitch clamp 50 is controlled by a hitching assembly 46, as shown in FIGS. 8A through 8D. The hitching assembly 46 includes a threaded hitch knob rod 54 that is inserted substantially vertically into an aperture in the downtube 48 of the riding section 6. The hitch knob rod 54 is guided within the aperture by a knob top retainer 56a disposed at an entrance side and a knob bottom retainer 56b at an exit side of the aperture. The knob top retainer 56a and knob bottom retainer 56b have inner surfaces into which the hitch knob rod 54 is slidably inserted. The upper end of the hitch knob rod 54 is located on an upper side of the downtube and has a hitch knob 58 for rotating the hitch knob rod. The lower end of the hitch knob rod 54 has threads for threadedly connecting with a threaded aperture 55 in the attaching mechanism or hitch clamp 50 disposed on an underside of the downtube. FIG. 8B shows that the hitch knob rod 54 can be threadedly inserted into the hitch clamp 50 and that through the rotation of the hitch knob 58, the hitch knob rod 54 moves the hitch clamp 50 relative to the hitch beam 30 on the pushing section 4. Rotation of the hitch knob 58, as shown in FIG. 8C, closes and tightens the hitch clamp 50 to secure the hitch beam 30 of the front portion to the rear portion of the vehicle frame, shown in FIG. 7E. Other methods of securing the hitch clamp 50 around the hitch beam 30 include a push-button release mechanism, wherein the hitch knob 58 is pushed downward so that the hitch knob rod 54 attaches to and holds the hitch clamp 50 in place around the hitch beam 30. A hinge pin 60 allows the hitch clamp 50 to pivot in the open and closed positions.

FIGS. 9A-9D illustrate a pushbar 11 of the present invention. The pushbar 11 can be gripped by a user to control the direction and speed of the pushing section 4 when the pushing section is being used as a stroller alone. The pushbar 11 can be connected to a back frame 63, so that the pushbar 11 can pivot with respect to the back frame 63. The pushbar 11 can be covered with a shock absorbent or pliant material, such as foam, to provide a soft surface for the user's hands when the user is pushing the stroller.

Figure 9B:
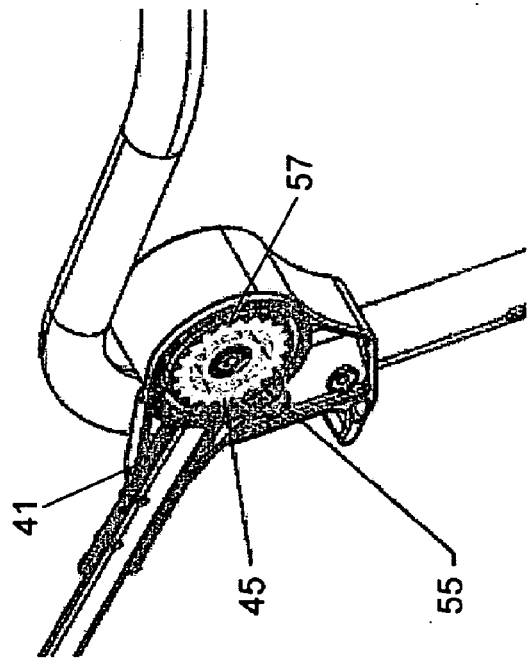
FIGS. 9A to 9F illustrate a pushbar mechanism.
Figure 9A:
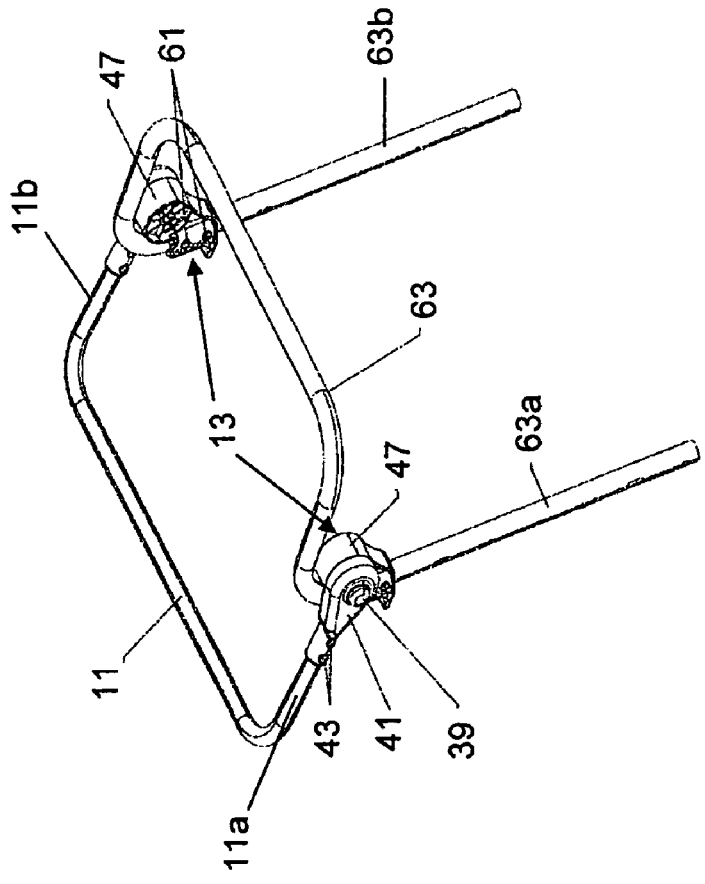
Figure 9C:
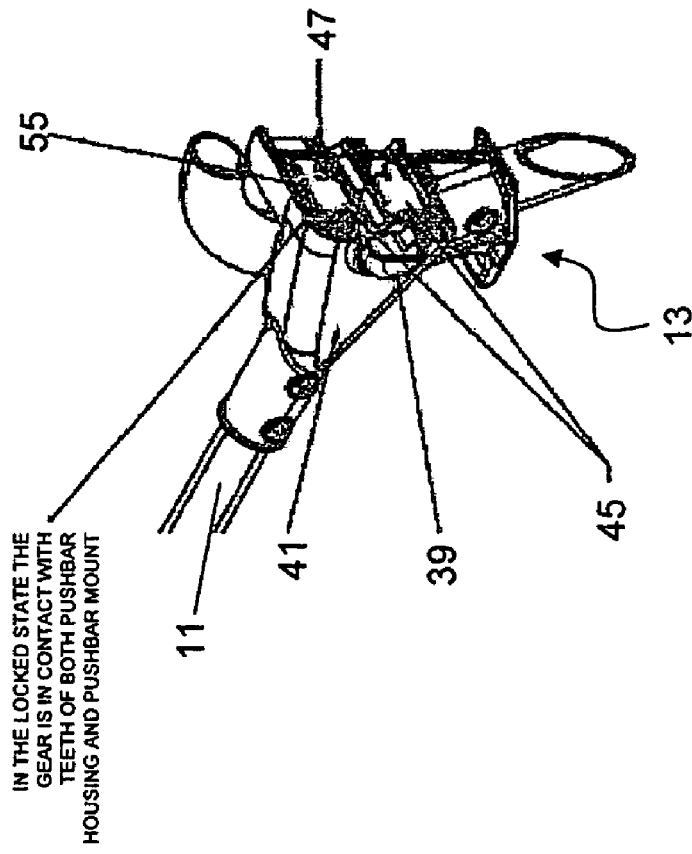

The pushbar 11 in FIG. 9A is illustrated as a U-shaped member, but the pushbar can have any shape that will allow or facilitate the functionality discussed herein. The parallel ends 11a, 11b of the pushbar 11 are inserted into pushbar housings 41 and rigidly joined by attaching members 43, which may be bolts or rivets, for example. As shown in FIG. 9B, which is an enlarged view of the pushbar housing 41, the pushbar housing 41 is formed with teeth 57 arranged radially on an inner surface of a rounded end opposite of the tubular end of the pushbar housing 41 that accepts the inserted pushbar 11. A pushbar gear 45 with teeth 55 that engage with the pushbar housing teeth 57 is slidably and concentrically arranged with the rounded end of the pushbar housing 41 and a pushbar mount 47. FIG. 9C shows an enlarged view of a pushbar mechanism 13 with the pushbar housing 41 removed. The pushbar mount 47 is formed with teeth 59 that are arranged concentrically with and permanently engage the teeth of gear 45. The pushbar mounts 47 rigidly attach to the arms 63a, 63b of the back frame 63 by rivets 61. Any means of connection may be used including bolts with washers and nuts, for example. A pushbar button 39 slides through an aperture in the pushbar housing 41 for pressing the pushbar gear 45 against a spring 37 in the direction of pushbar mount 47. The pushbar housing 41, pushbar mount 47, pushbar gear 45 and pushbar button 39 form a pushbar mechanism 13.

As shown in FIG. 9A, a pair of pushbar mechanisms 13 is mounted on the first and second arms 63a, 63b of the back frame 63 and adjusts the relative position of the pushbar 11 to a back frame 63 of a pushing section in the convertible stroller-cycle 2. The pushbar mechanisms 13 allow the pushbar 11 to pivot to multiple positions for better ergonomic comfort or placement in the storage position when connected to the riding section 6, including a direction facing a rear side of the pushing section 4 and a direction facing the front side of the pushing section 4, when the pushing section 4 is connected to the riding section 6.

Figure 9D:
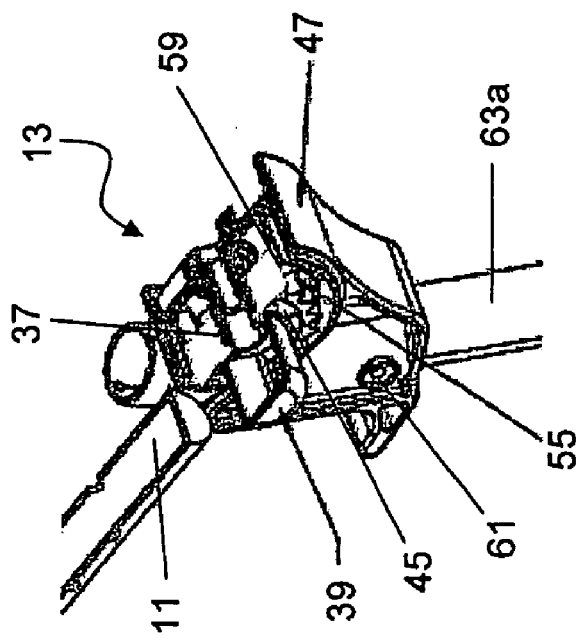
Figure 9F:
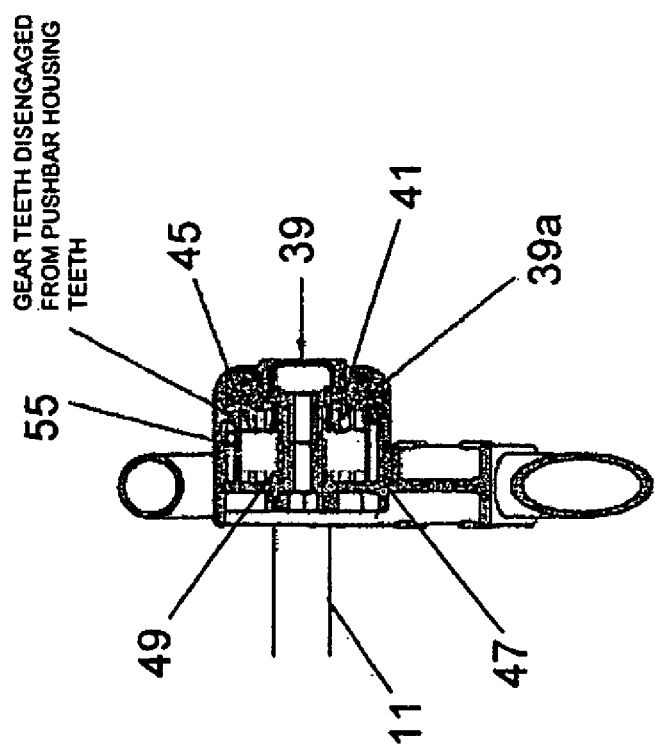
Figure 9E:
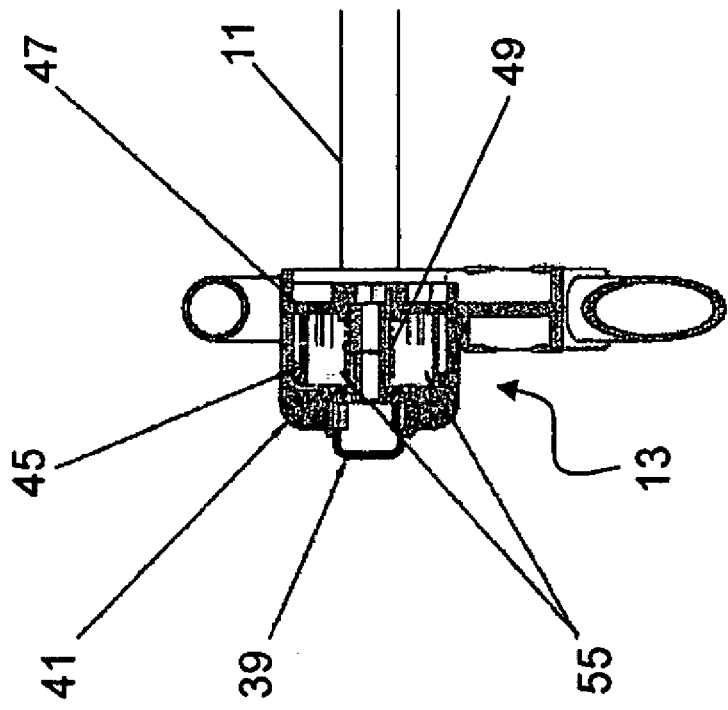

Enlarged FIGS. 9D and 9E detail the positioning of pushbar 11 using the pushbar mechanisms 13 described above in the locked position. When the pushbar 11 is in a locked state, the pushbar gear's teeth 55 are engaged with both the pushbar housing's teeth 57 and the pushbar mount's teeth 59. In the locked stated, a portion of the width of the gear teeth 55 is engaged with the pushbar housing teeth 57 while the remaining portion is engaged with the the pushbar mount's teeth 59. The mechanism 13 is released by pressing the pushbar button 39 inward toward the center of the vehicle. The pushbar button 39 presses against the pushbar gear 45 which slides further inward into the pushbar mount 47. The pushbar mount 47 is rigidly attached to the frame arms 63a, b and can not move. As the gear 45 is pushed further into the mount 47, the gear teeth 55 disengage from the pushbar housing teeth 57 in the pushbar housing 41. When the gear teeth 55 are no longer engaged with the pushbar housing teeth 57, the pushbar housing 41 is free to rotate about the pivot point. The pushbar 11 is rigidly attached to the pushbar housing 41 and thus is also free to rotate to a new position.

The pushbar mechanism 13 is provided on each side of the pushbar 11. As shown in FIG. 9F, the pushbar 11 may be released for rotation by pressing both pushbar buttons 39 inward. The user presses and holds the pushbar buttons 39 inward until the pushbar 11 has rotated to the desired position. Releasing the pushbar buttons 39 allows the spring 49 in the pushbar mount 47 to bias the gear 45 outward. The gear teeth 55 once again slidably engage the pushbar housing teeth 57 and lock the pushbar 11 in place in the new position. The gear teeth 55 always remain engaged with the pushbar mount teeth 59. As illustrated in FIG. 9F, the pushbar button 39 is free to slide horizontally in and out of the pushbar housing but is held captive in the pushbar housing 41 by the return surface 39a.

The materials for the pushbar mechanism can be metal or plastic, a combination of metal and plastic or a combination of other materials.

Figure 10A:
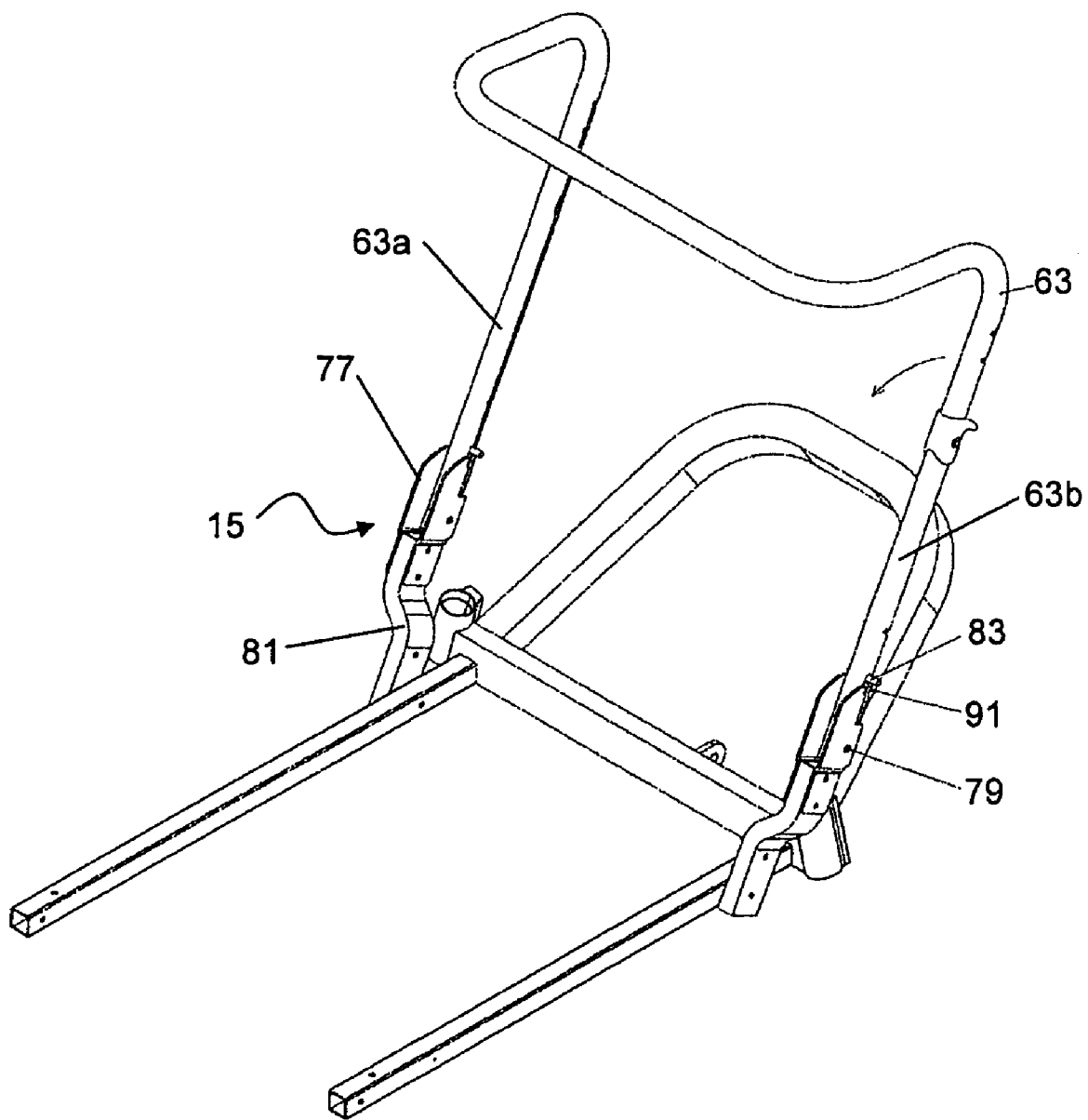
FIGS. 10A to 10E illustrate a folding mechanism for folding the pushing section.

FIGS. 10A-10D illustrate a folding mechanism 15 for folding the back frame 63 of the pushing section 4 forward into a storage position to minimize the size of the pushing section 4 and to conserve space and prevent wear and tear on the frame during moving or storage. As shown in FIG. 10A, the folding mechanism 15 includes a fold strut 81 rigidly attached to the lower frame of pushing section 4 and a fold bracket 77 rigidly attached to an upper portion of the fold strut 81. The fold strut 81 and fold bracket 77 can be attached by any suitable means including, but not limited to, bolts, rivets, or welds, for example. The free ends of back frame arms 63a and 63b fit into the fold brackets 77 and are pivotally connected to the brackets 77 at a pivot point 79. The back frame 63 may pivot freely in a forward and backward motion about pivot points 79, which could be pivot pins (not shown), for example. The back frame 63 is placed in a lock state when the frame arms 63a and 63b are in a rearward position parallel to and supported by a rear surface of the fold brackets 77. In the locked position, the folding mechanisms 15 are locked by horizontally situated fold pins 83 that engage vertical slots 91 in the fold brackets 77.

Figure 10B:
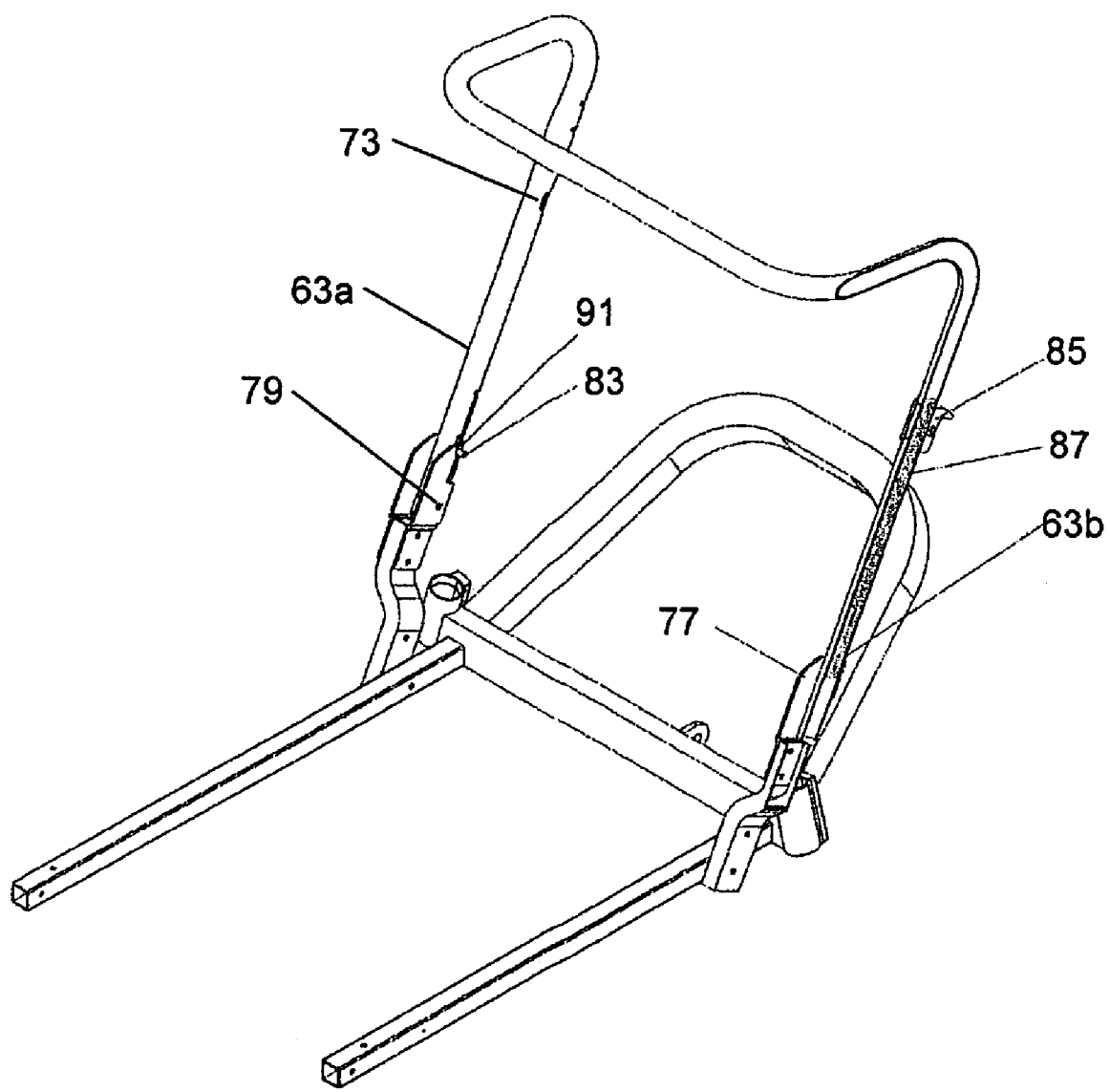

As shown in FIG. 10B, fold release levers 85 may be provided on one or both of the back frame arms 63a and 63b, which are hollow. The fold release levers 85 may be rigidly attached by bolt, rivet or other suitable means to fold release rods 87 that are concentrically situated internal to each arm 63a, 63b and extend longitudinally toward the pivot points 79. The fold release levers 85 are attached to the fold release rods 87 through slots 73 formed in the frame arms 63a, and 63b. The fold release levers 85 are free to slide longitudinally along the slots 73 of the arms 63a, 63b.

Figure 10C:
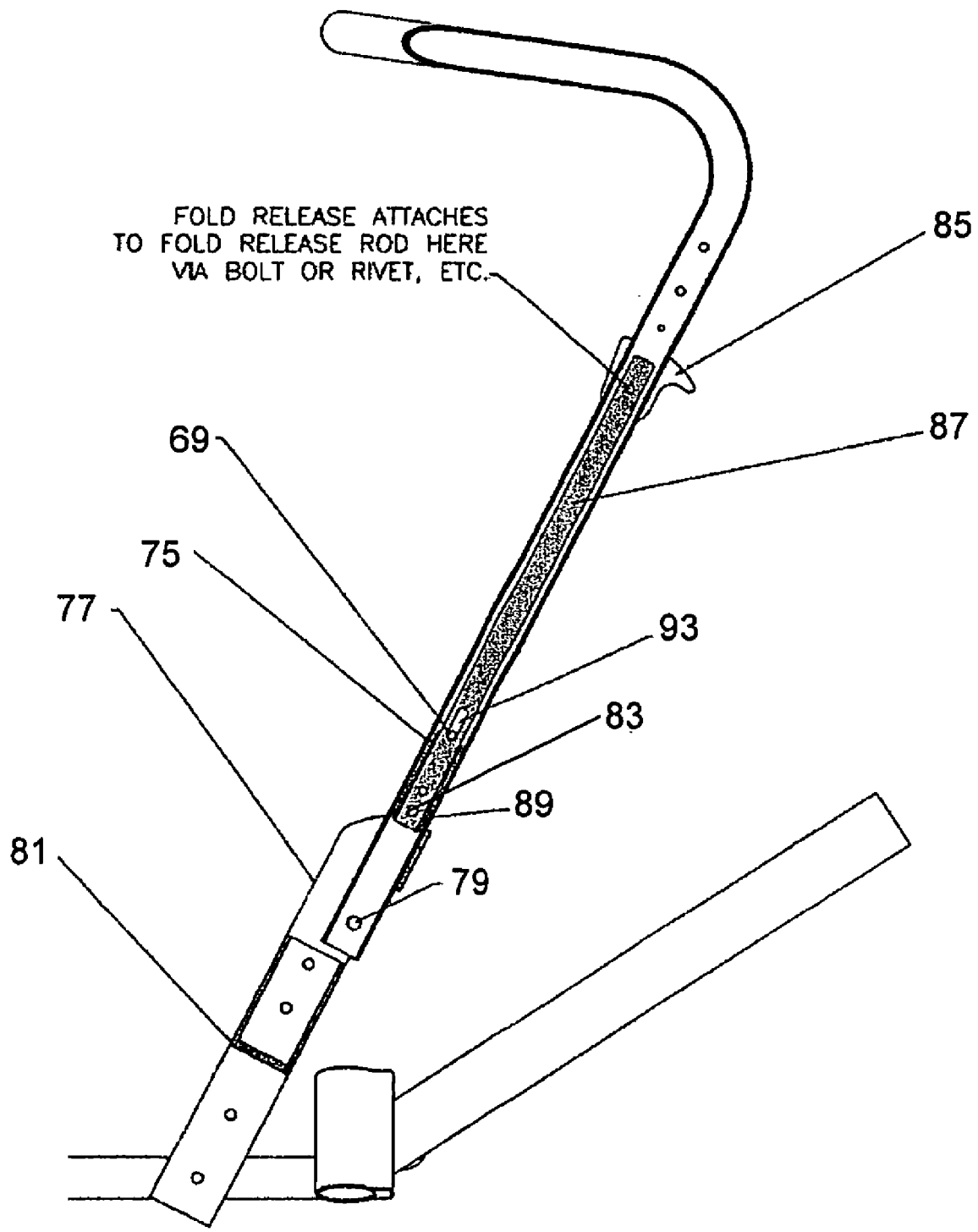
Figure 10D:
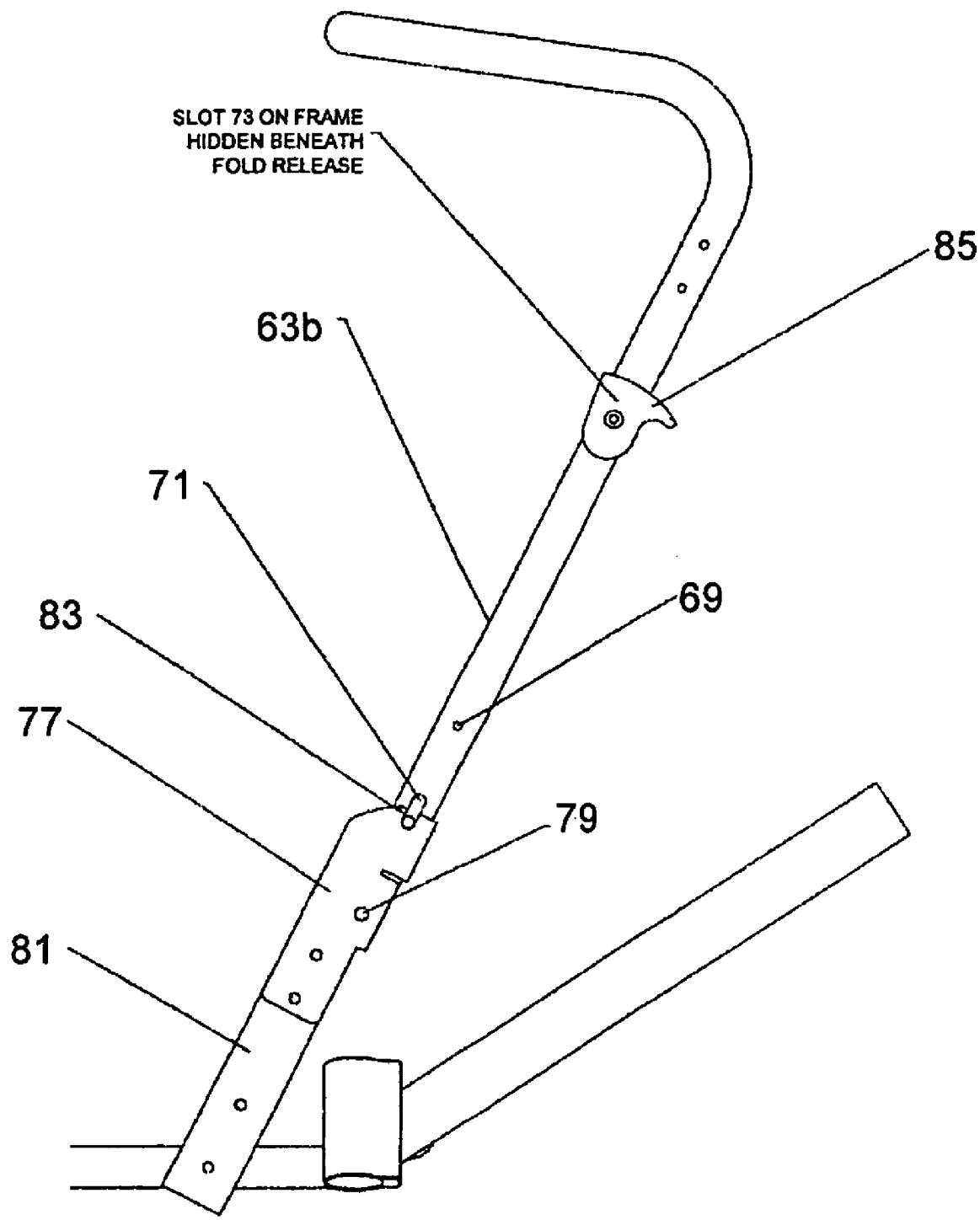

FIG. 10C shows an enlarged partial cross-sectional view of a folding mechanism 15. The fold release rod 87, internal to the back frame arm 63a, 63b, rigidly attaches at an upper end to the fold release lever 85 and at a lower end to a fold pin housing 89. The fold pin housing 89 holds the horizontally oriented fold pin 83 and is free to slide up and down inside the frame arm 63a, 63b. As shown in FIG. 10D, the fold pin 83 extends laterally through slots 71 provided on both sides of each frame arm 63a, 63b. The fold pin 83 is free to slide longitudinally within the slot 71 in conjunction with the sliding of the fold release lever 85 through slot 73.

FIG. 10C illustrates a biasing member, such as a fold spring 75, that urges or otherwise biases the fold release rods 87 in the direction of the pivot points 79. A horizontally situated fixed pin 69 is rigidly attached to back frame arms 63a, 63b at a point above the fold pin housing 89. Slots 93 in the fold release rod 87 allow the fold release rod 87 to slide past the transverse fixed pin 69 when the fold release lever 85 is pulled in an upward motion. As the fold release rod 87 is pulled upward by fold release lever 85, the spring 75 compresses against the fixed pin 69. The compressed spring 75 presses against the fold pin housing 89 creating the biasing force that urges the fold pin housing 89 and fold pin 83 back towards pivot point 79.

Figure 10E:
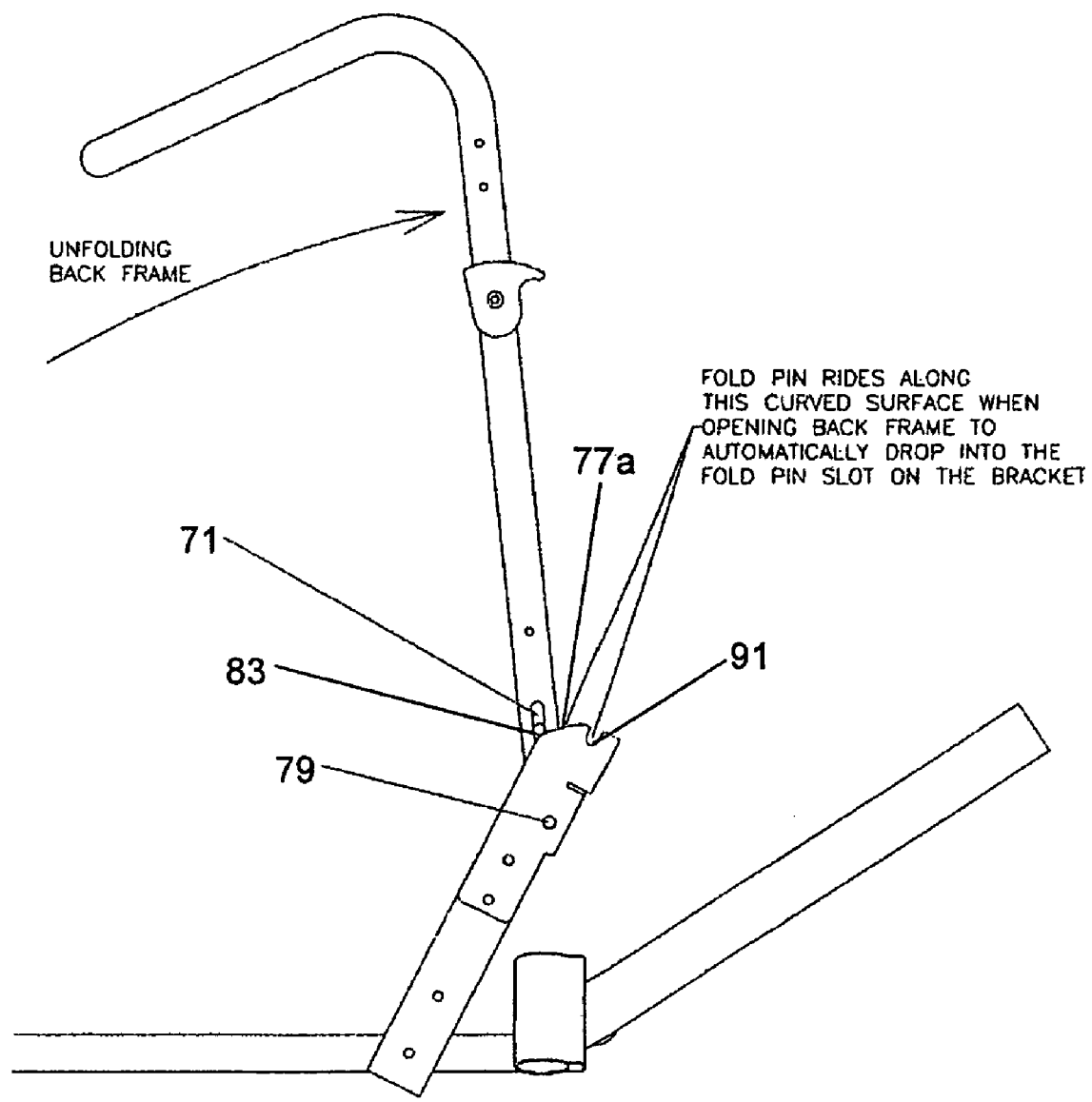

In operation, when the user pulls the fold release levers 85 in an upward direction, the fold pins 83 lift upward via the fold release rods 87 and fold pin housings 89. The fold pins 83 disengage from slots 91 in fold brackets 77, allowing the back frame 63 and frame arms 63a, 63b to rotate forward about the pivot points 79. The back frame 63 folds over forward to lie down in a horizontal position on top of the lower portion of the pushing section 4 frame. To unfold from the storage position, the user rotates the back frame 63 and frame arms 63a, 63b from the horizontal position upward to a vertical position. As shown in FIG. 10E, as the frame rotates into a vertical position, the fold pins 83 engage and ride along an upper curved peripheral surface 77a of the fold bracket 77. The curved surface 77a lifts the fold pins 83 upward into a released position similar to when the fold release levers 85 are pulled upward. When the back frame arms 63a, 63b align in parallel with the back surface of the bracket 77, the fold pins 83 are re-aligned with the bracket slot 91. The spring 75 pushes the fold pins 83 downward to automatically re-engage them into the slots 91 on the fold brackets 77. The back frame 63 is now locked in the open or unfolded position.

Figure 11:
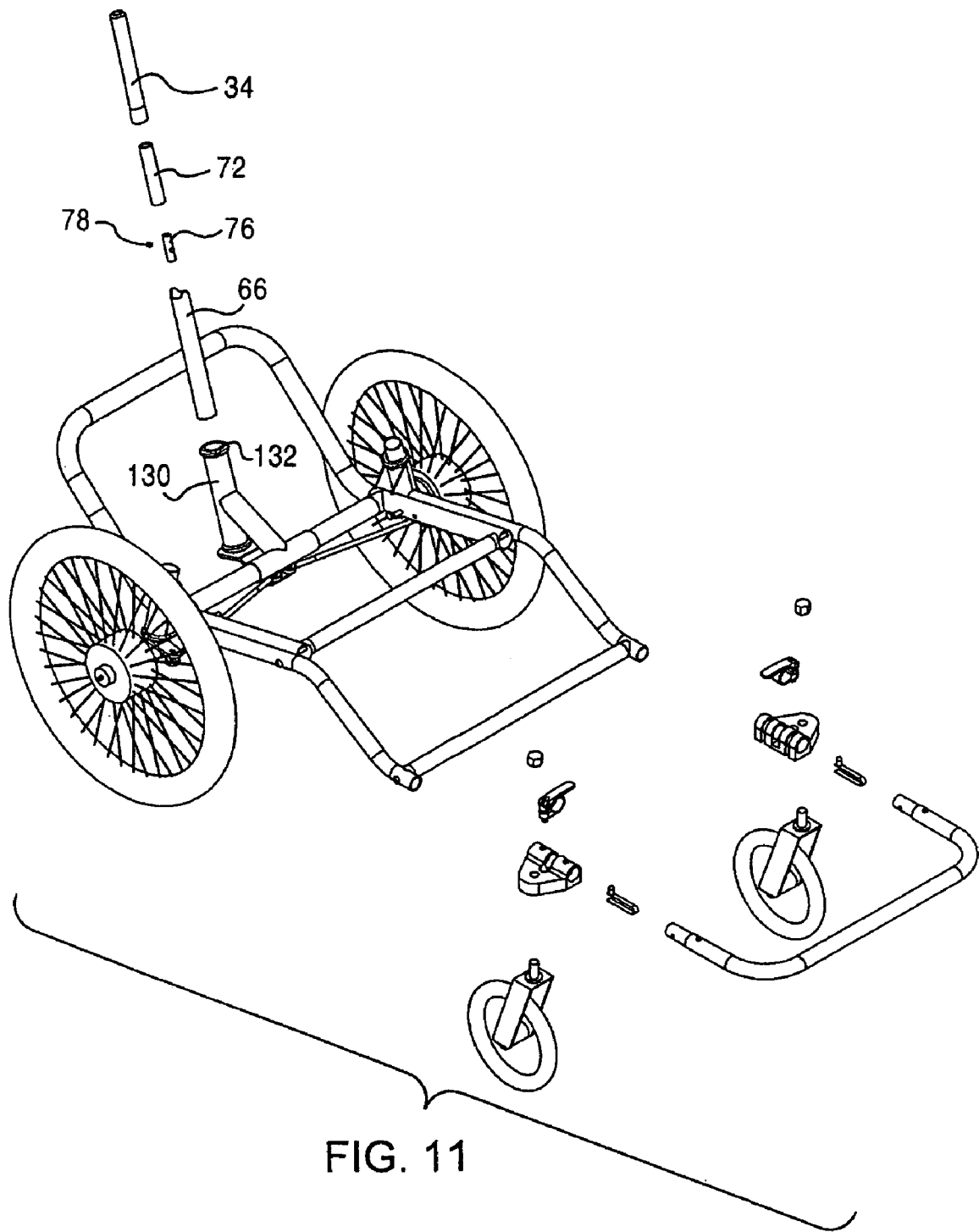
FIG. 11 illustrates and exploded view of the pushing section.

FIG. 11 illustrates an exploded view of the pushing section 4 showing the components of the braking and steering assembly thereof. The components include a cable slide sleeve 72, which is slidably inserted into the lower connection post 34. A cable slide 76 is slidably inserted into the cable slide sleeve 72. A braking cable 86 (FIG. 41A) that controls the braking of the wheels 12 of the pushing section 4 is fixed in one end of the cable slide 76. The lower connection post 34, cable slide sleeve 72 and cable slide 76 are concentrically and rotatably arranged within a pushing section steerer tube 66. The lower connection post 34 can transmit a braking force from the riding section 6 to the pushing section 4. The pushing section steerer tube 66 transmits the turning motion from the handlebars 40 to the pushing section 4. One end of the lower connection post 34 is disposed in the pushing section steerer tube 66 and the other end of the lower connection post 34 is disposed within a fork-steerer tube 36 of the riding section. The pushing section steerer tube 66 rotates within a cylindrical headset pivot 130 and is fixed to the headset pivot by a threaded headset 132 provided at opposite ends thereof.

Figure 12:
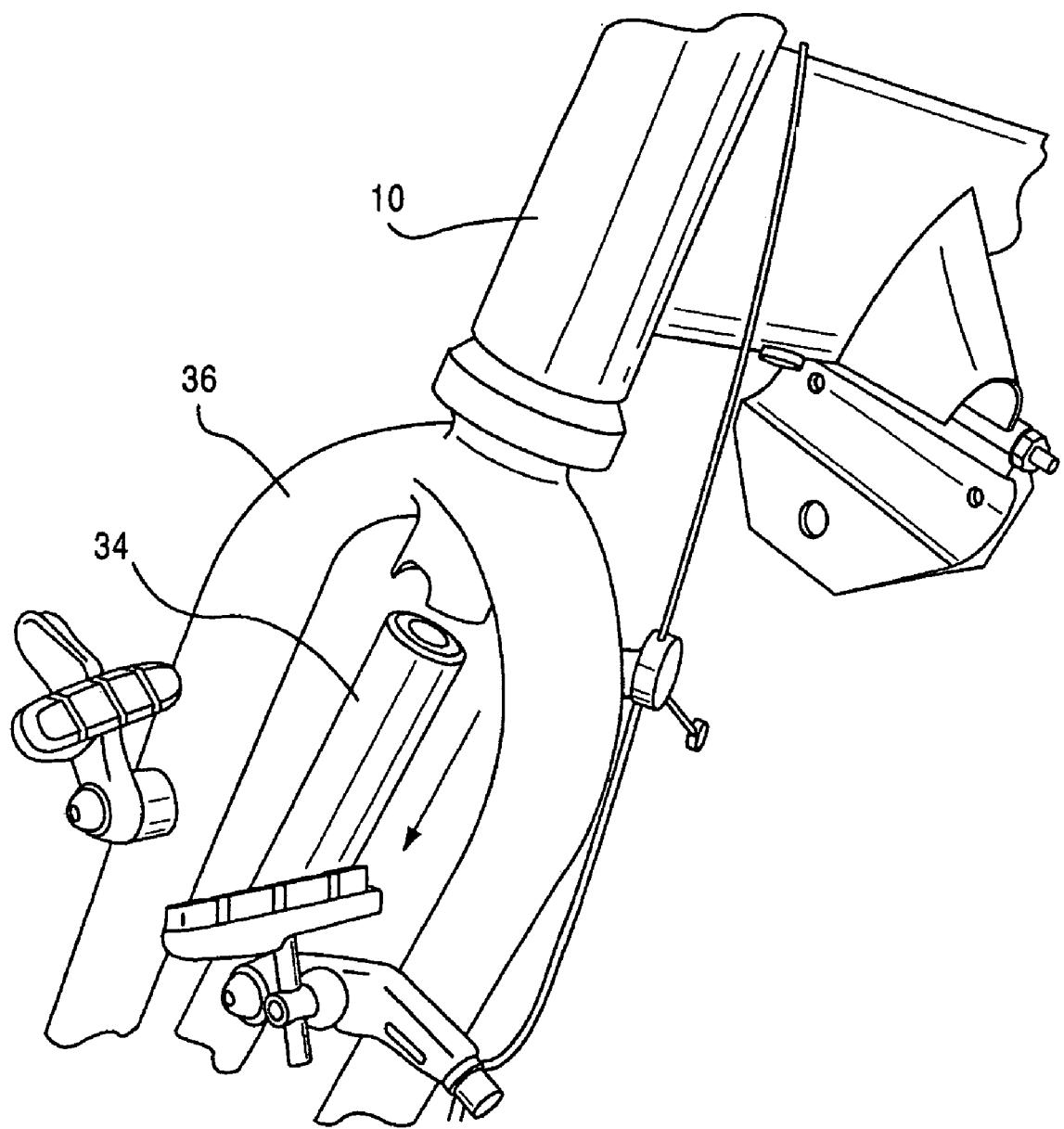
FIG. 12 illustrates alignment of the steering assemblies of the pushing and riding sections.
Figure 13:
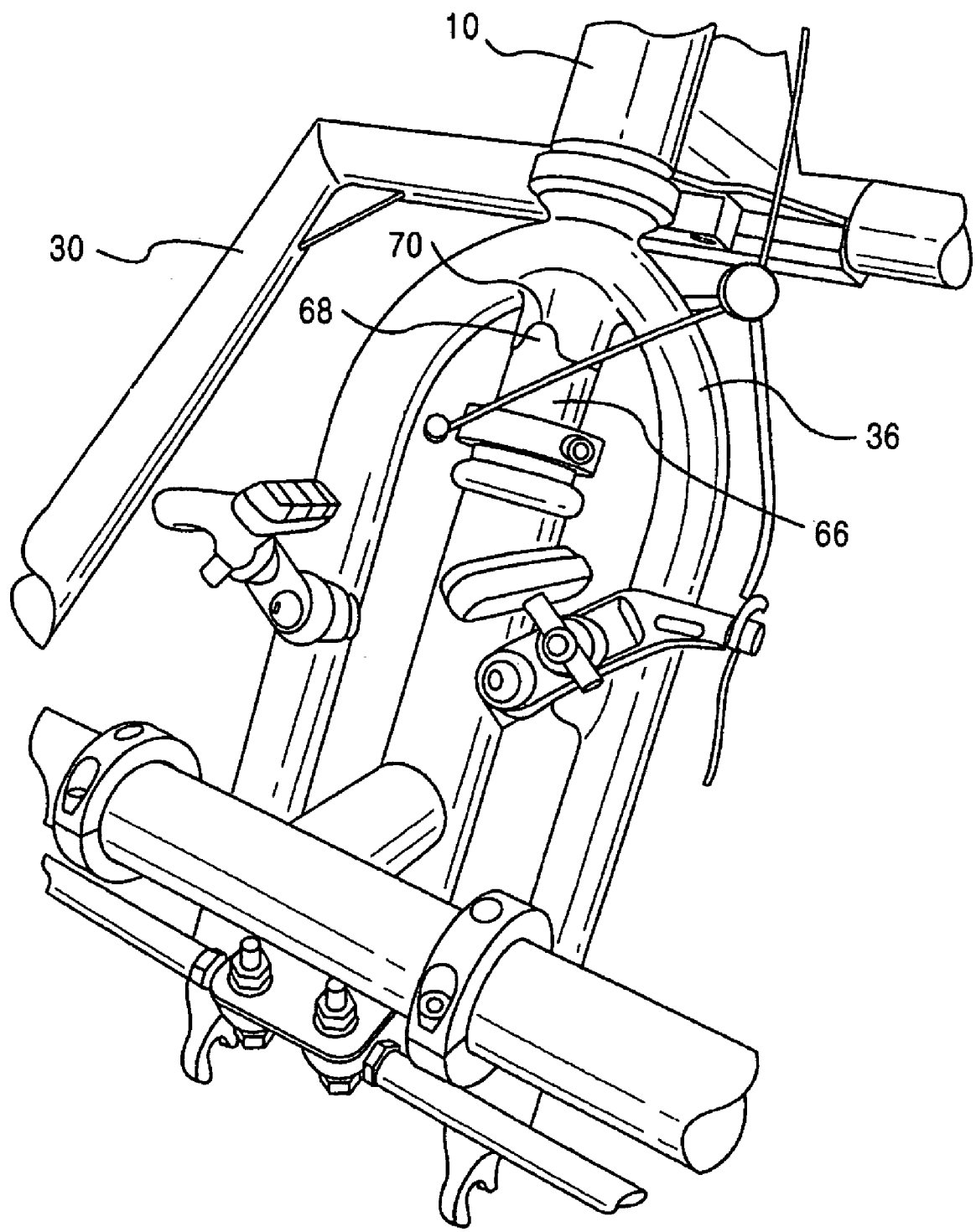
FIG. 13 illustrates the connection between the steering assemblies of the pushing and riding sections.

FIG. 12 illustrates the alignment and slidable insertion of the lower connection post 34 of the pushing section 4 into the hollow fork-steerer tube 36. The hollow fork-steerer tube 36 connects the steering of the pushing section 4 with the steering of the riding section 6. In the head tube 10, the upper connection post of the riding section is connected with the lower connection post 34 of the pushing section. FIG. 13 shows the lower end of the head tube 10 in which the lower connection post 34 is rotatably inserted within the pushing section steerer tube 66. The pushing section steerer tube 66 includes a tab 68 on an upper edge for engaging a notch 70 on the fork-steerer tube 36 of the head tube 10, so that the steerer tube 66 is able to move with the head tube 10.

The braking components of the pushing section 4 and the riding section 6 of the vehicle frame are combined in the head tube 10 of the riding section 6 so that the braking operation of the pushing section 4 is controlled by the braking lever 42 of the riding section 6.

Figure 14A:
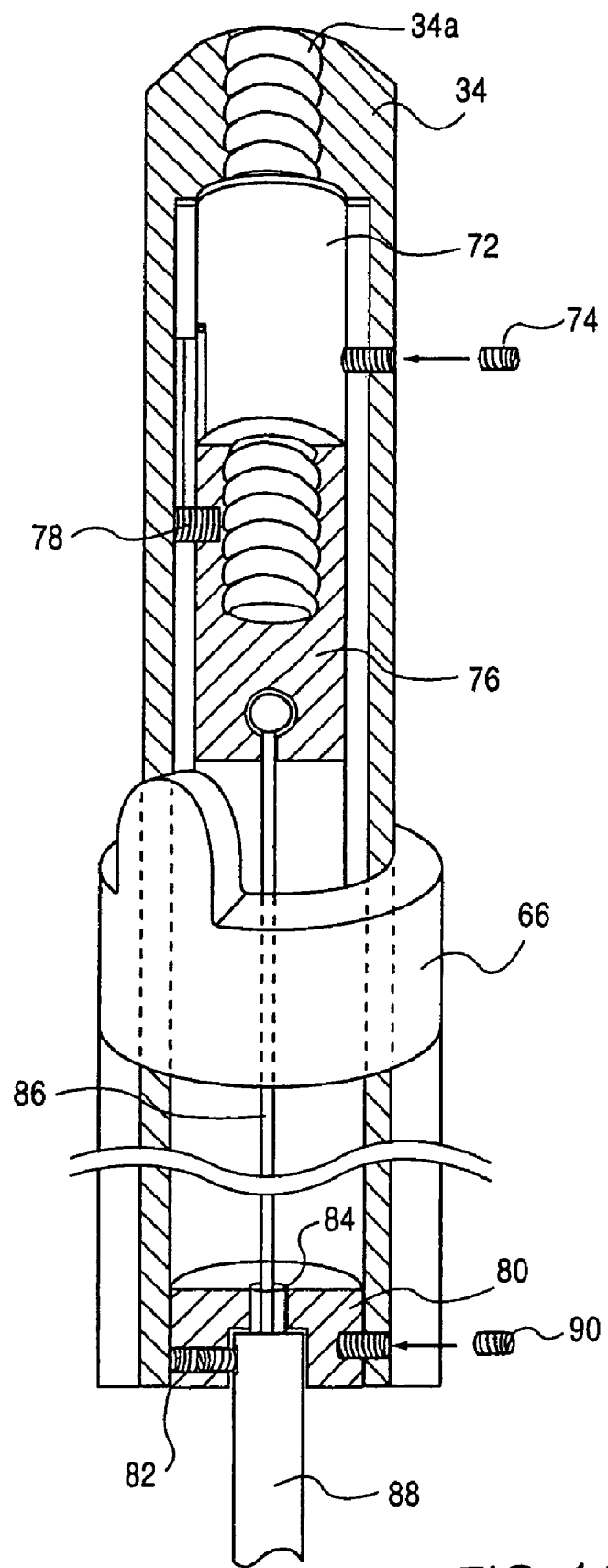
Figure 14B:
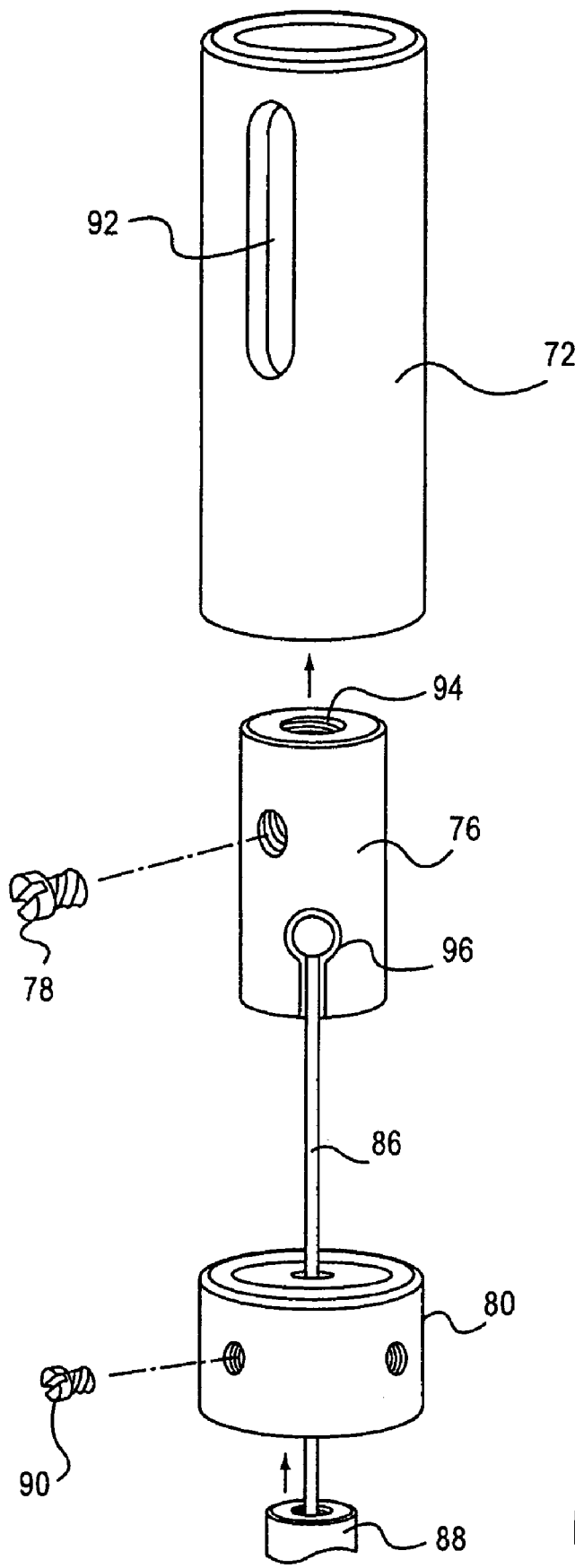

Referring to FIGS. 14A-17G, the braking and steering assembly in the stroller-cycle will now be described. As illustrated in FIGS. 14A and 14C, the braking and steering components of the pushing section are disposed within the lower connection post 34. The lower connection post 34 includes the cable slide sleeve 72 concentrically fixed therein by a fixing member 74. The fixing member 74 can be inserted into the cable slide sleeve 72 through an aperture formed in the lower connection post 34 to prevent the cable slide sleeve 72 from rotating with respect to the lower connection post 34. A cable slide 76 is slidably inserted into the cable slide sleeve 72. The cable slide 76 has a fixing member 78 inserted into a side thereof by threading or press-fitting to prevent the cable slide 76 from rotating with respect to the cable slide sleeve 72. A cable plug 80 is inserted into the bottom of the lower connection post 34 to close a circumferential opening 82 therein. The cable plug 80 has a longitudinal guide hole 84 for centering a second control cable 86, such as a front brake cable, from the pushing section 4 in the lower connection post 34 and securing an end of a cable housing 88 encasing the second front brake cable. Similar to the cable slide sleeve 72 and the cable slide 76, the cable plug 80 can have a fixing member 90 laterally inserted into a side thereof and through a side of the lower connection post 34 to prevent the cable plug 80 from rotating with respect to the lower connection post 34. A slot 92 is provided in the cable slide sleeve 72 to prevent the cable slide 76 from rotating concentrically in the cable slide sleeve 72.

The cable slide sleeve 72 has an inner surface for concentrically guiding the cable slide 76. The cable slide 76 also has a threaded opening 94 in an upper end and a notched opening 96 in a lower end. The threaded opening 94 in the upper end of the cable slide 76 receives a lower threaded end 106b of a cable rod 106 from the upper connection post 104, shown in FIG. 17A and discussed in further detail below. The notched opening 96 in the lower end of the cable slide 76 receives and retains a terminal end 98 of the second front brake cable 86 for controlling the braking of the front wheels 12 of the pushing section 4.

Figure 15A:
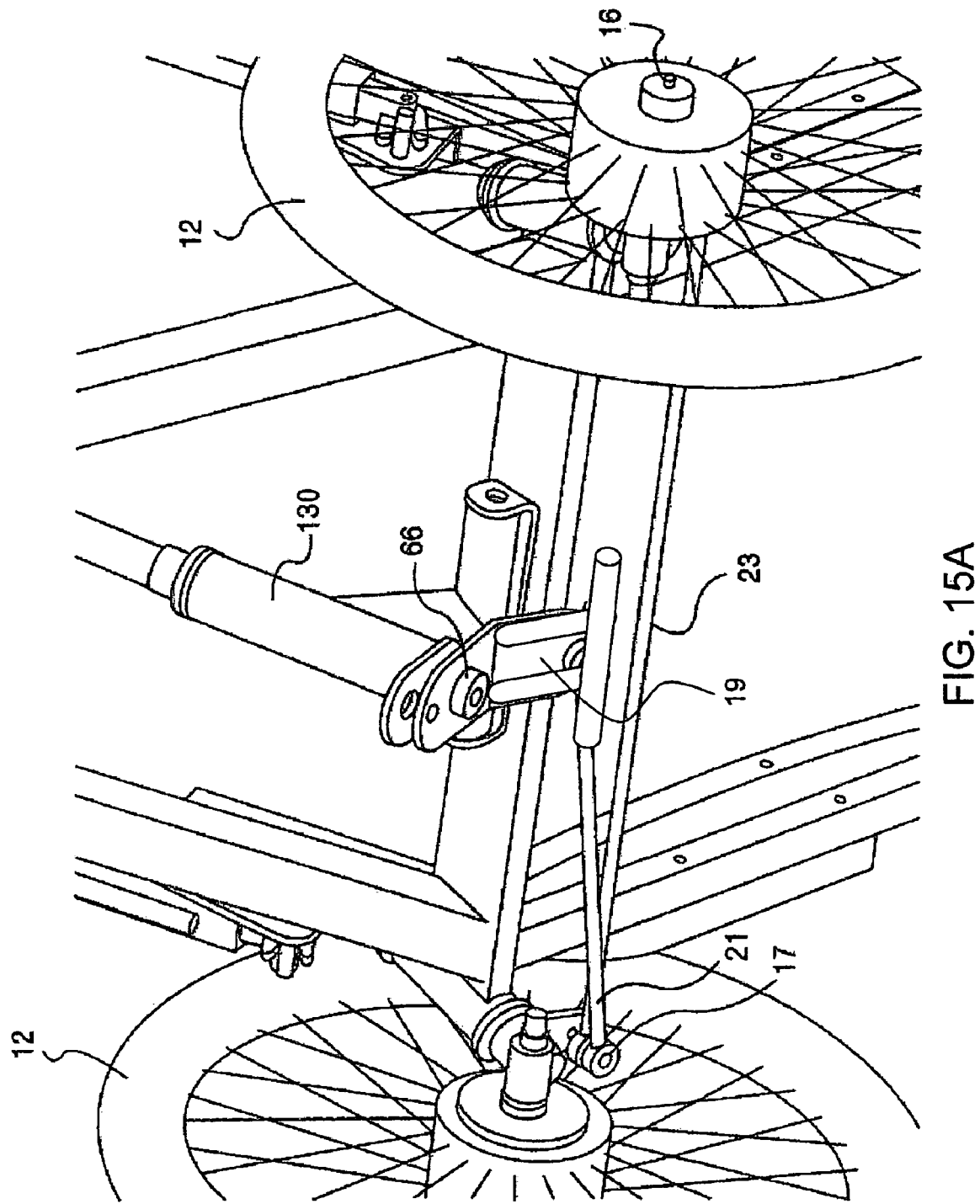
FIGS. 15A to 15D illustrate the steering mechanisms of the pushing section from below.
Figure 15B:
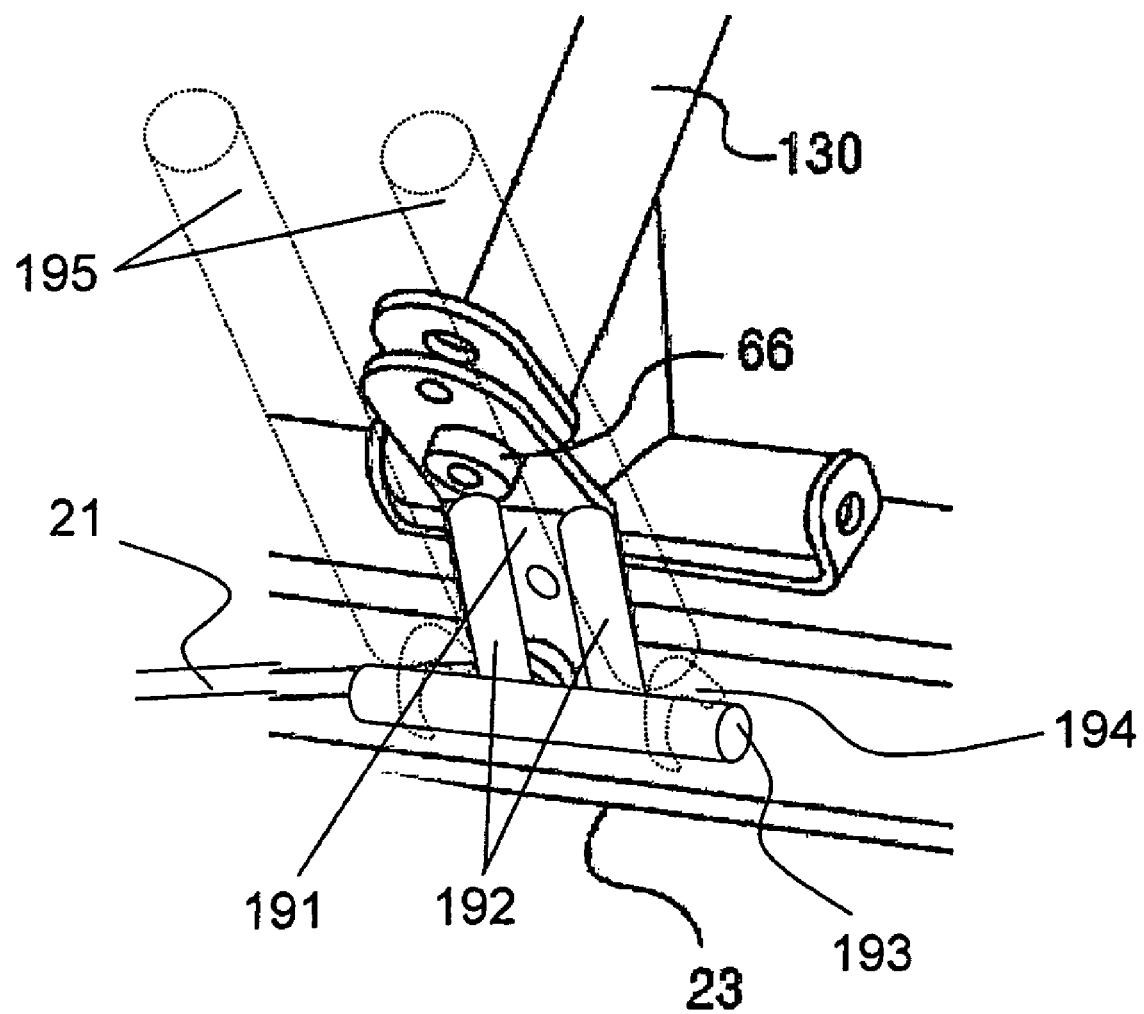
Figure 15C:
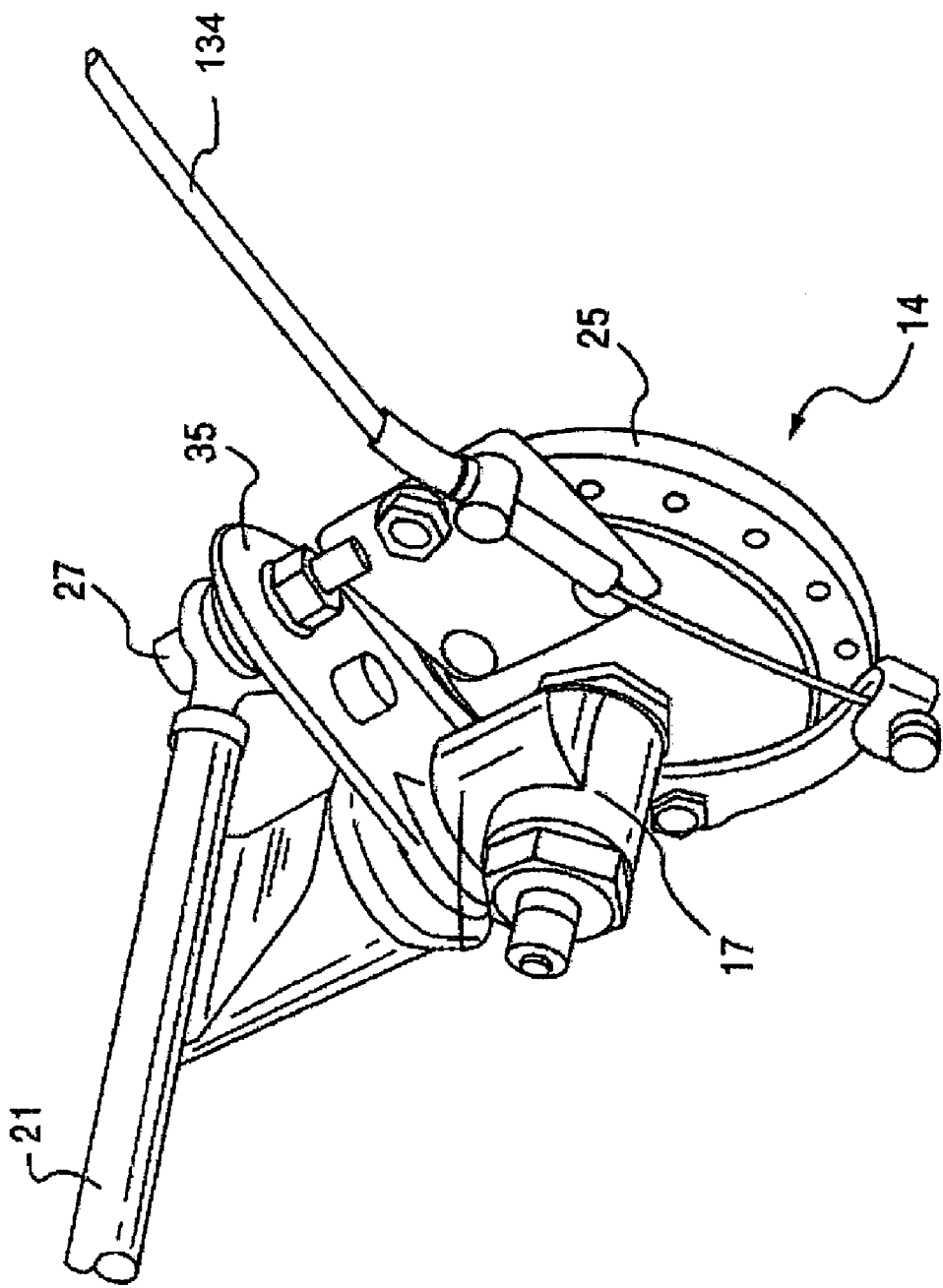

FIGS. 15A to 15C illustrate a brake 14 of the pushing section 4 and the steering operation of the pushing section 4 as controlled from the riding section 6. FIG. 15A illustrates the components of the steering section. The steering operation of the pushing section 4 is achieved by translating the rotational movement of the lower connection post 34, which is connected to the upper connection post in the riding section 6, into the linear movement of first tie rod 21 and second tie rod 23. The lower connection post 34 is disposed within the cylindrical headset pivot 130. The first tie rod 21 is bolted to the pushing section steerer tube 66 through a bridle-style pitman lever 19 mounted at the end of the steerer tube extending through the bottom of the cylindrical headset pivot 130. The pushing section steerer tube 66 is rigidly attached to the cylindrical headset pivot 130 by threaded headsets 132. The pushing section steerer tube 66 thus rotates with the rotation of the lower connection post 34, which is connected to the upper connection post 104 within the head tube 10.

FIG. 15B shows an enlarged view of the bridle-style pitman lever 19. The bridle-style pitman lever 19 includes an upper bent plate portion 191 which connects to steerer tube 66 through a rear aperture in the plate and to the first tie rod 21 through one of multiple apertures in a forward portion of the plate. Two vertical struts 192 extend downward from the plate portion 191 to support a crossbar 193. The plate portion 191, struts 192 and crossbar 193 are formed or welded together to form the bridle-style pitman lever 19. As shown in FIG. 15B, drop-outs 194 of the cycle fork 195 slide over the top of the ends of the bridle crossbar 193. As the cycle fork 195 turns, the fork arms grip the bridle crossbar 193 and turn the pitman lever 19 to which one end of the first tie rod 21 is connected. The other end of the first tie rod 21 is connected at the wheel steering pivot 17, as shown in FIG. 15A. The second tie rod 23 is also connected at one end to the wheel steering pivot 17 at the hub of one wheel 12 and connected at the other end to the hub of the other wheel 12. Bolts, or any other suitable connecting mechanism, extend through the end of the tie rods 21 and 23 and hold the tie rods to the steering bracket. As such, the tie rod 21 is connected through a wheel steering pivot 17 on the wheel 12 to transmit steering from the riding section 6 to the front wheels 12 of the pushing section 4. FIG. 15C shows the first tie rod 21 connected through a bolt 27, for example, to a plate 35. The plate 35 is connected to the wheel steering pivot 17. The sliding movement of the tie rod 21 causes the plate 35 to pivot on the bolt 27. The pivoting movement of the plate 35 on the wheel steering pivot 17 causes the wheel 12 to move in the direction of the tie rod 21. As a result, the wheel 12 of the pushing section 4 turns under the control of the riding section 6.

Figure 15D:
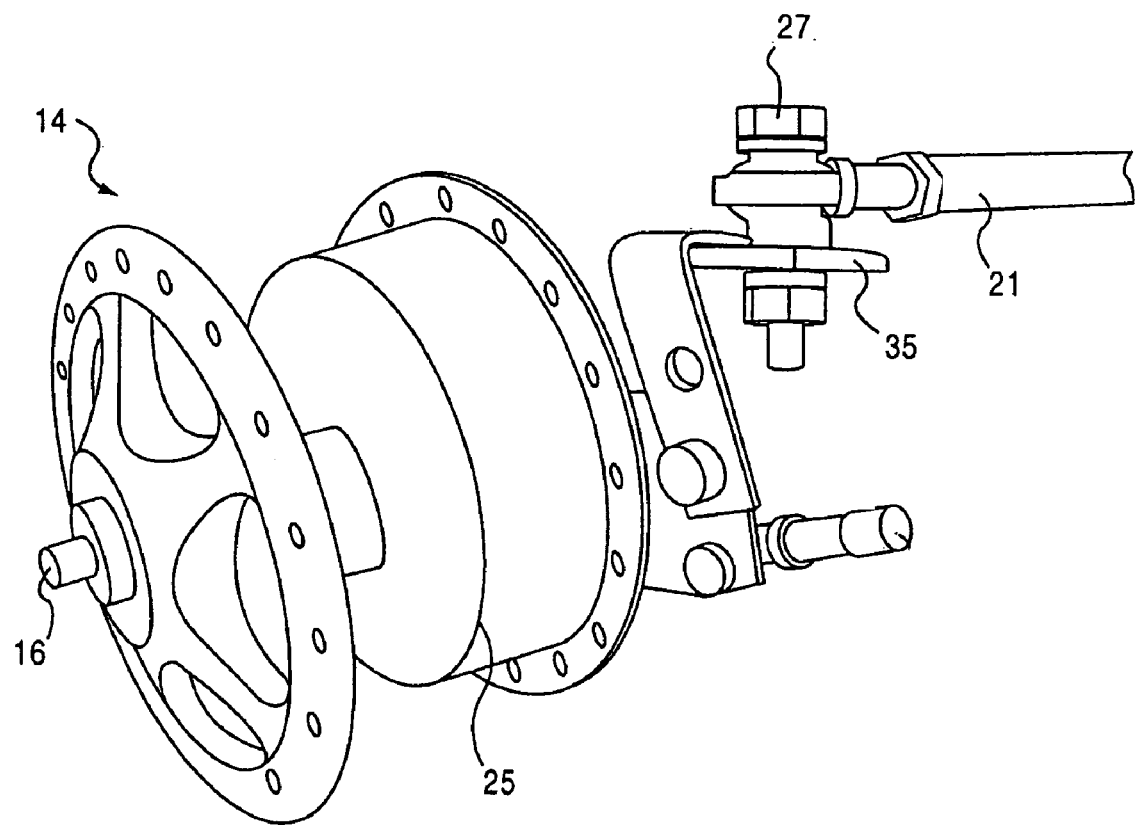

In FIGS. 15C and 15D, the parking braking assembly 14 of the pushing section 4 includes the brake hub 25, such as a drum brake, for example. A parking brake cable 134 of the pushing section 4, when controlled by the operator, maintains the pushing section 4 in a stationary position by applying a force to the brake hub 25. Also shown in FIG. 15D is a quick release mechanism 16 for quickly and easily removing the wheel 12.

Figure 16A:
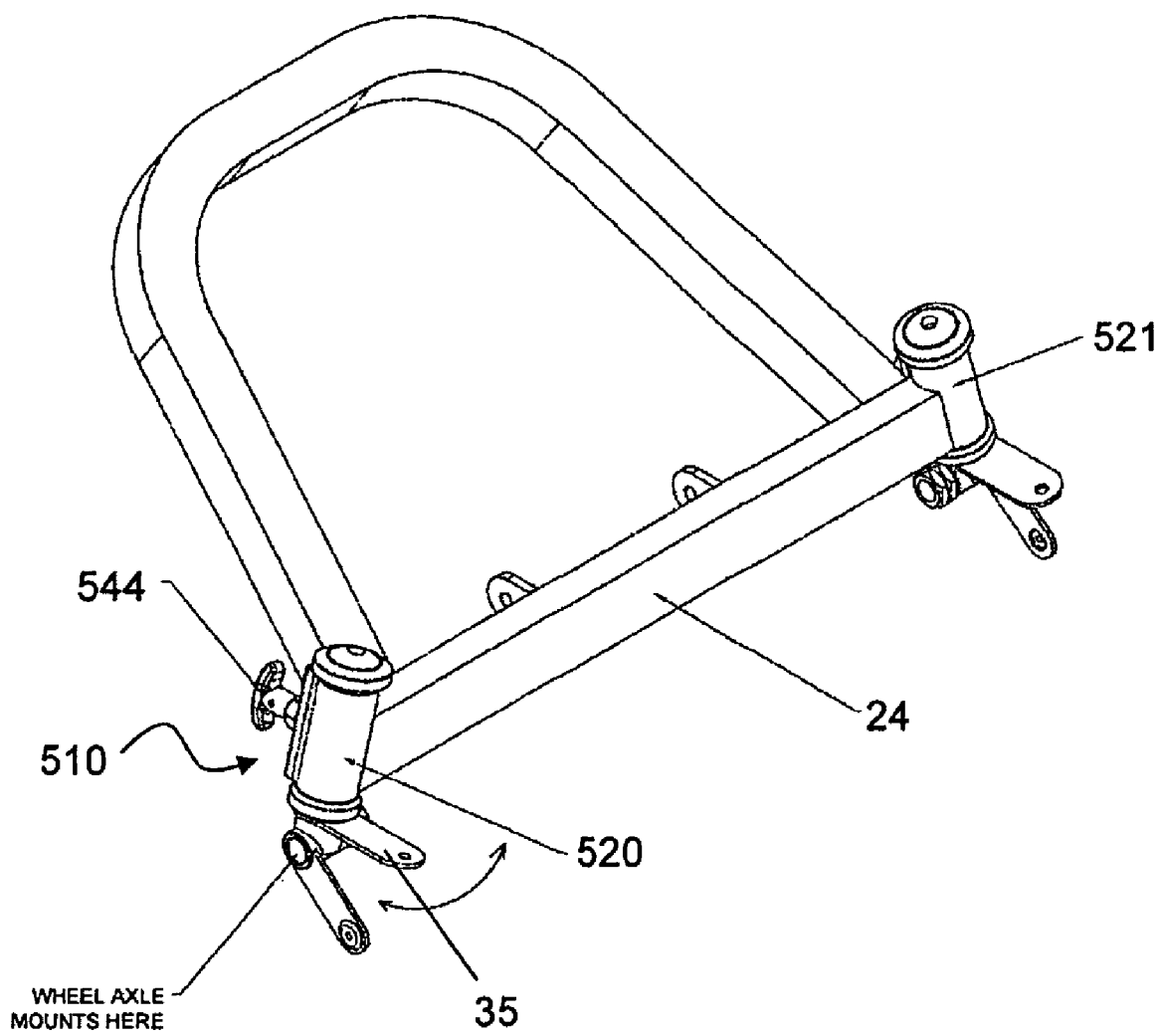
FIGS. 16A and 16B illustrate a steering lock mechanism.

FIG. 16A shows a steering lock mechanism 510 located in the right headset tube 520. The right and left headset tubes 520, 521 are rigidly fixed to the crossbeam 24 that forms part of the frame of pushing section 4. The steering lock mechanism 510 prevents accidental steering by locking the wheels 12 from turning left and right when the pushing section 4 is used as a stroller or jogger or in trailer mode.

Figure 16B:
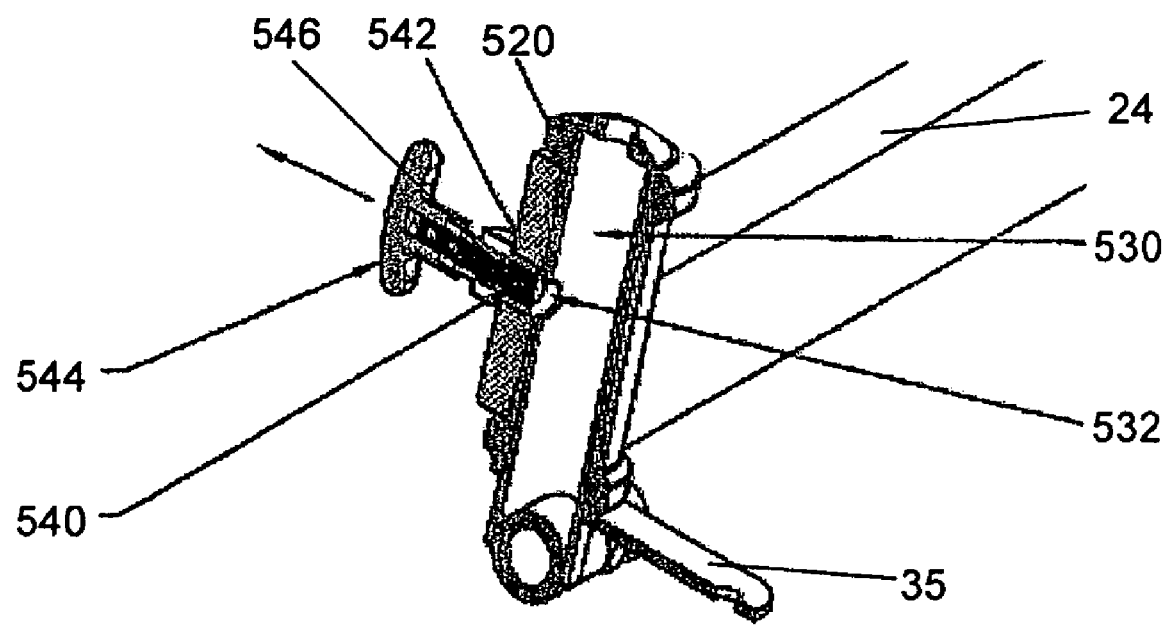

Plate 35 attached to wheel steering pivot 17 turns when the wheels 12 turn. The turning causes plate 35 to rotate as shown in FIG. 16A. Plate 35 is rigidly fixed to a right steering kingpin 530 that is housed in the right headset tube 520. As shown in FIG. 16B, the kingpin 530 is formed with a notch or hole 532 that engages a steering lock pin 540. The steering lock pin 540 is housed within the steering lock housing 542 and is rigidly connected to a steering lock knob 544. In the locked position, the steering lock pin 540 is inserted into the hole 532 to prevent the kingping 530 from rotating. To release the lock, the steering lock knob 544 is pulled outward and turned ninety (90) degrees, which pulls the steering lock pin 540 out of the hole 532 in the kingpin 530. Detents prevent the steering lock pin 540 from re-engaging the kingpin 530. As such, the wheels 12 are free to turn. To re-engage the steering lock, the steering lock knob 544 is pulled outward again and rotated back ninety (90) degrees to the original position. A spring 546, or any other suitable biasing mechanism, located within the steering lock housing 542 biases the steering lock pin 540 back into the hole 532 in kingpin 530 preventing rotation of the wheels 12.

Figure 17:
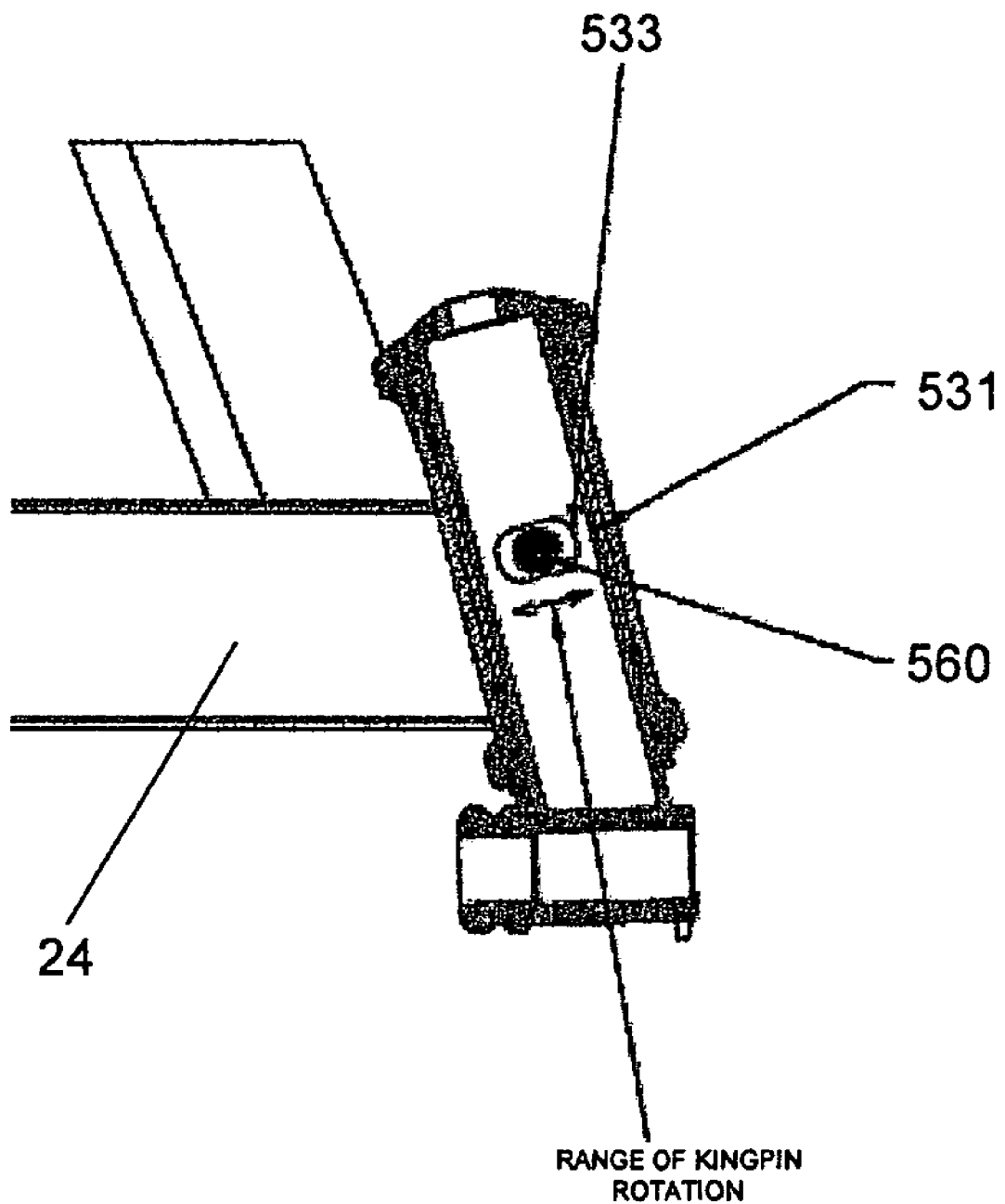
FIG. 17 illustrates a steering limit stop mechanism.

FIG. 17 shows a steering limit stop pin 560 mounted on the left headset tube 521 (FIG. 16A). Similar to the steering lock pin 540 on the right side, the stop pin 560 is a pin that protrudes inward to engage the left steering kingpin 531 that is housed in the left headset tube 521. The stop pin 560 is mounted in the headset tube 521 via a threaded connection, such as a bolt. The left steering kingpin 531 has a slot 533 that encompasses the stop pin 560. The stop pin 560 is permanently set and travels within the slot 533. When the left steering kingpin 531 rotates to a predetermined point in either direction, stop pin 560 abuts a boundary of the slot 533. The left steering kingpin 531 is thus prevented from any further rotation, which prevents the wheels 12 from turning any further than the range defined by the dimensions of the kingpin slot 533.

Figure 18:
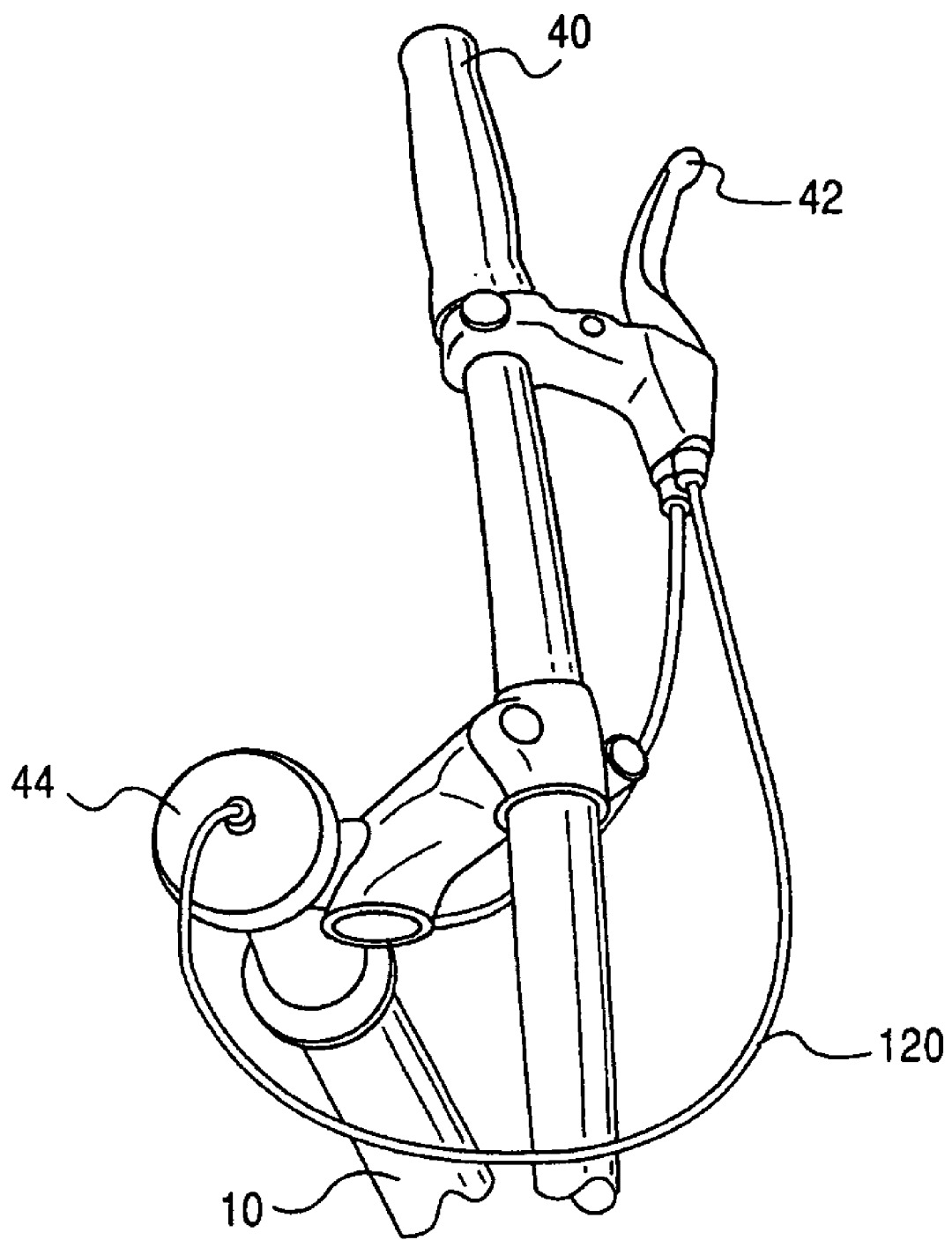
FIG. 18 illustrates a top perspective view of the front knob and stem.

FIG. 18 illustrates a top view of a front connection knob 44 receiving a first front brake cable 120.

As shown in FIG. 18, the braking and steering assembly in the stroller-cycle 2 includes a brake lever 42 in the riding section on, for example, the handlebar 40, to control the first front brake cable 120.

Figure 19A:
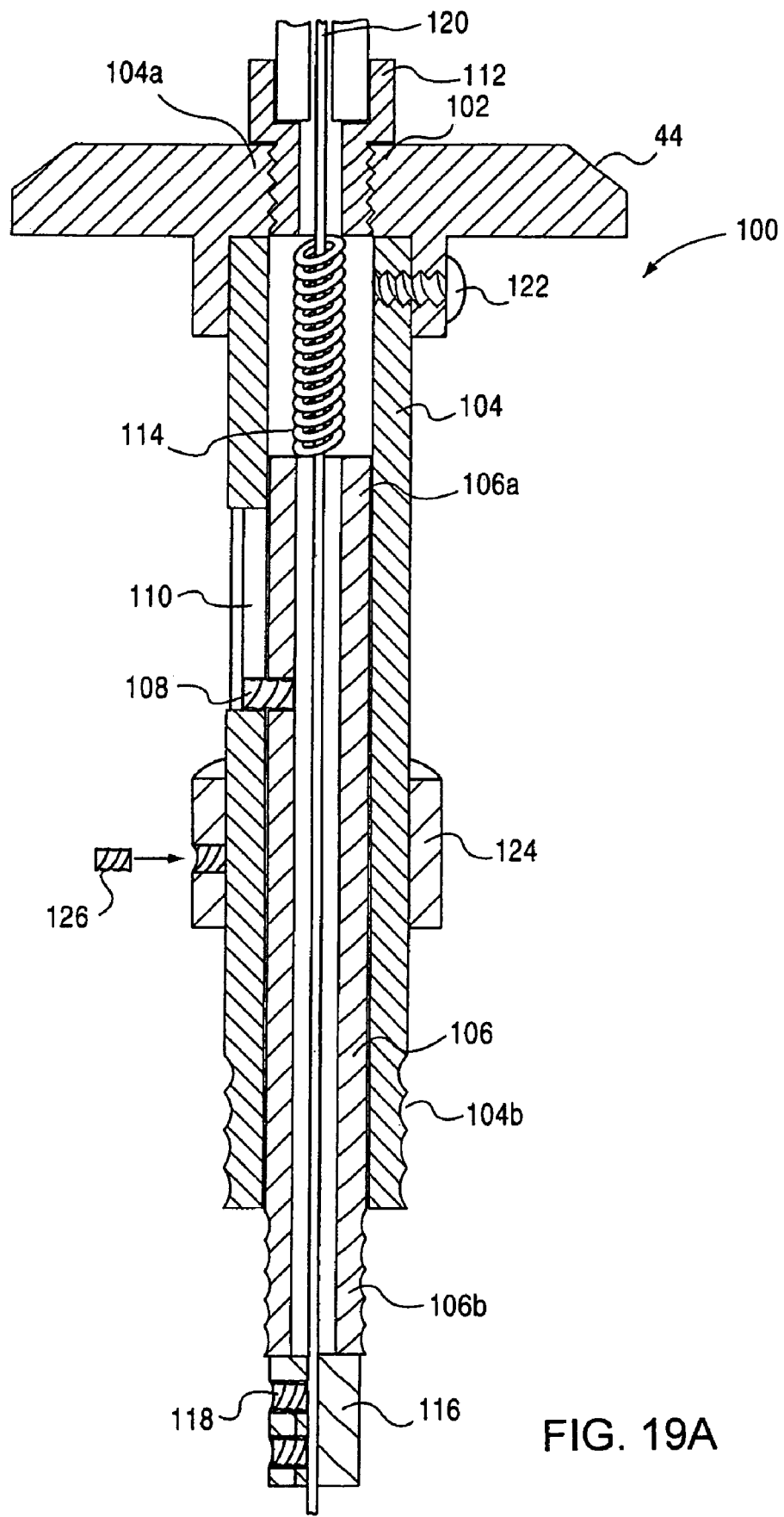
Figure 19D:
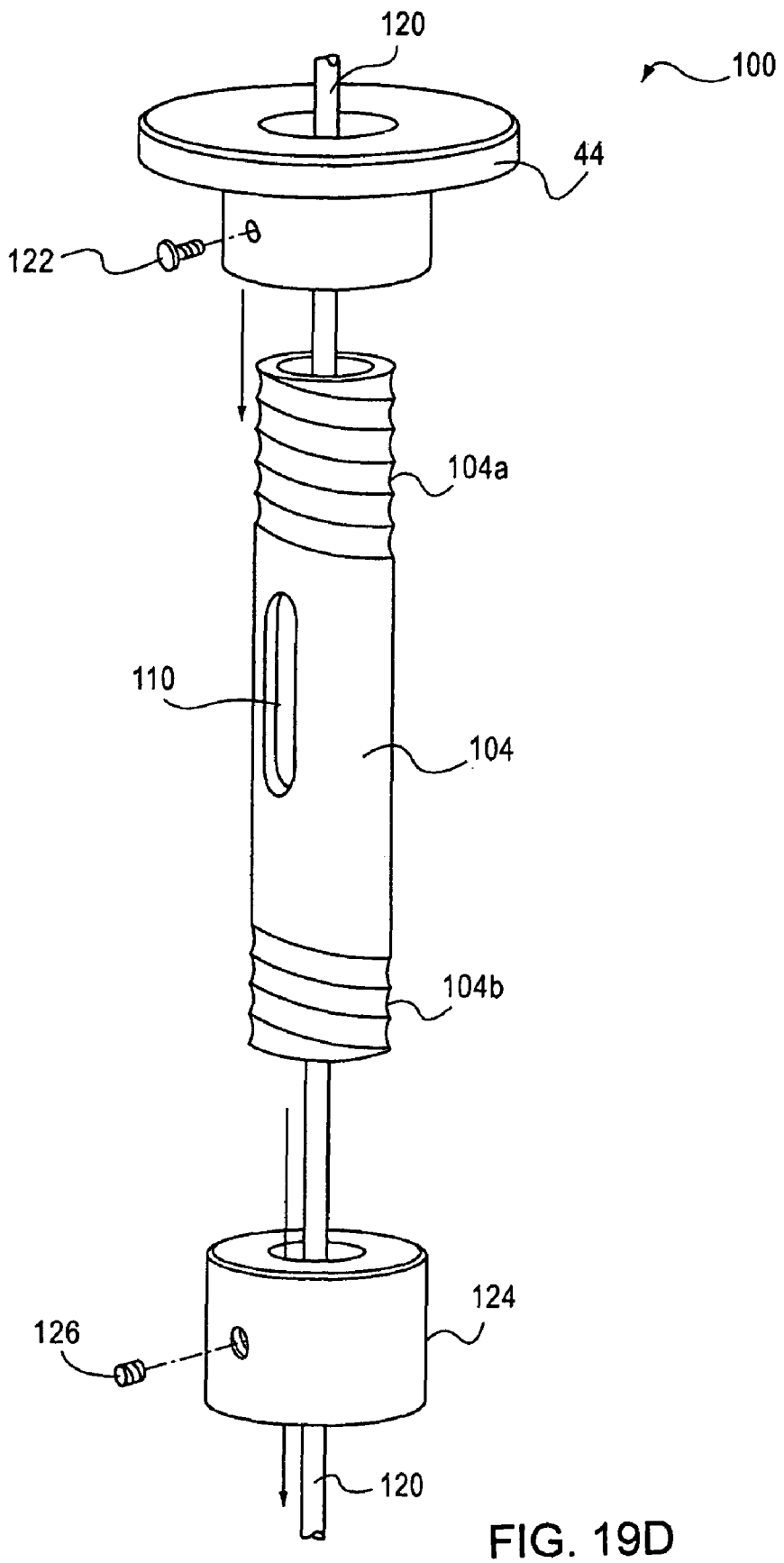
Figure 19E:
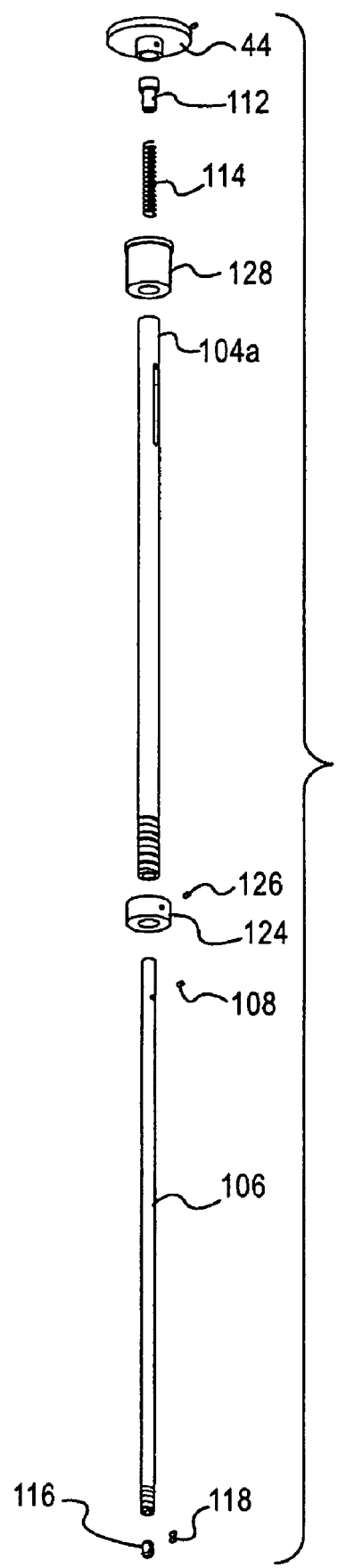

The braking and steering assembly components 100 disposed in the head tube 10 and stem 38 of the riding section 6 will now be described with reference to FIGS. 19A to 19G. The rotatable front connection knob 44 is disposed at the top of the stem of the riding section 6, as shown in FIG. 19A, and has a central aperture 102 in which an upper portion thereof is threaded and a lower portion is unthreaded. The upper connection post 104 has an upper end 104a that is inserted and fixed in the lower portion of the central aperture 102 of the front connection knob 44, as shown in FIG. 19A. The upper connection post 104 also has a lower threaded end 104b that is received in the top or upper threaded end 34a (FIG. 14A) of the lower connection post 34 so as to secure together the upper and lower connection posts 104 and 34, respectively. The axes of the upper and lower connection posts 104 and 34 are arranged to be coaxially aligned. As described above, the lower connection post 34 has a cable slide 76 therein that slides vertically within a fixed cable slide sleeve 72. The cable slide 76 has a threaded opening 94 at an upper end for receiving one end 106b of a cable rod 106 disposed within the upper connection post 104. The cable rod 106 has a first end 106a slidably disposed within the upper connection post 104 and the second end 106b of the cable rod is threadedly connected within the threaded aperture 94 of the cable slide 76 in the lower connection post 34. A cable rod fixing member 108 is inserted into the cable rod 106. A slot 110 defined in one side of the upper connection post 104 receives the cable rod fixing member 108 to prevent the cable rod 106 from rotating within the upper connection post 104. The cable rod fixing member 108 can be laterally inserted into the cable rod 106 by press-fitting, threading or other suitable fixing method.

A cable adjuster 112 is also disposed within the upper portion of the central aperture 102 of the rotatable front connection knob 44, and is threadedly connected to an inner surface thereof. A coil spring 114 is arranged between the cable rod 106 and the cable adjuster 112. The coil spring 114 is in a compressed state and continually applies a downward pressure on the cable rod 106 so that the cable rod is disposed in the correct position for being threaded into the cable slide 76 when the pushing section 4 and riding section 6 are joined.

A cable stop 116 is disposed at an end of the cable rod 106 for clamping a terminal end of the first front brake cable 120. Clamping in the cable stop 116 is achieved by cable stop fixing members 118.

The upper connection post 104 guides therethrough the first front brake cable 120 that extends from the brake lever 42 through the cable adjuster 112, the coil spring 114 and the cable rod 106 and terminates at the cable stop 116. Fixing members 118 hold the first front brake cable 120 firmly in the cable stop 116. The lower connection post 34 guides therethrough the second front brake cable 86. The second front brake cable 86 extends from the front wheels 12 of the vehicle and terminates in the cable slide 76. The second front brake cable 86 also passes through a splicing assembly and will be described below.

The front connection knob 44 rotates in clockwise and counterclockwise directions. In one of the rotation directions, the front connection knob 44 connects the upper connection post 104 in the riding section 6 with the lower connection post 34 in the pushing section 4 so that braking and steering in the riding section controls the braking and steering in the pushing section. In the opposite rotation direction, the front connection knob 44 disconnects the upper connection post 104 from the lower connection post 34. A front rotation knob fixing member 122 is inserted into a side portion of the front connection knob 44 and through the upper connection post 104 to secure the front connection knob 44 and the upper connection post 104 together and prevent the upper connection post from rotating relative to the front connection knob 44.

A spacer 124, as shown in FIGS. 19A and 19D to 19F, disposed between an outer surface of the upper connection post 104 and the inner surface of the head tube 10 centers the upper connection post 104 within the head tube 10. A spacer fixing member 126 holds the spacer 124 on the upper connection post.

Figure 20A:
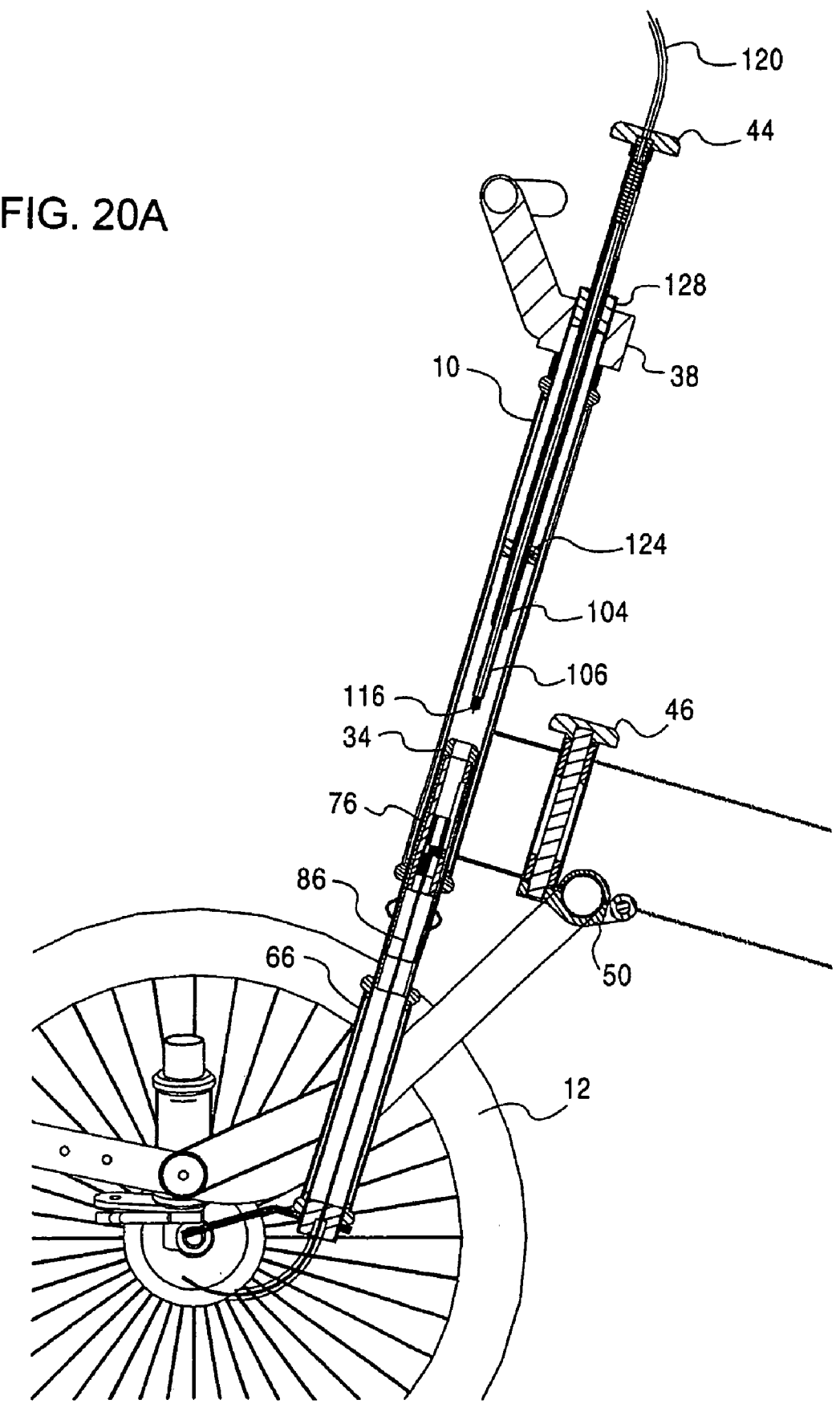
FIGS. 20A to 20C illustrate the braking and steering assemblies of the pushing and riding sections.
Figure 20B:
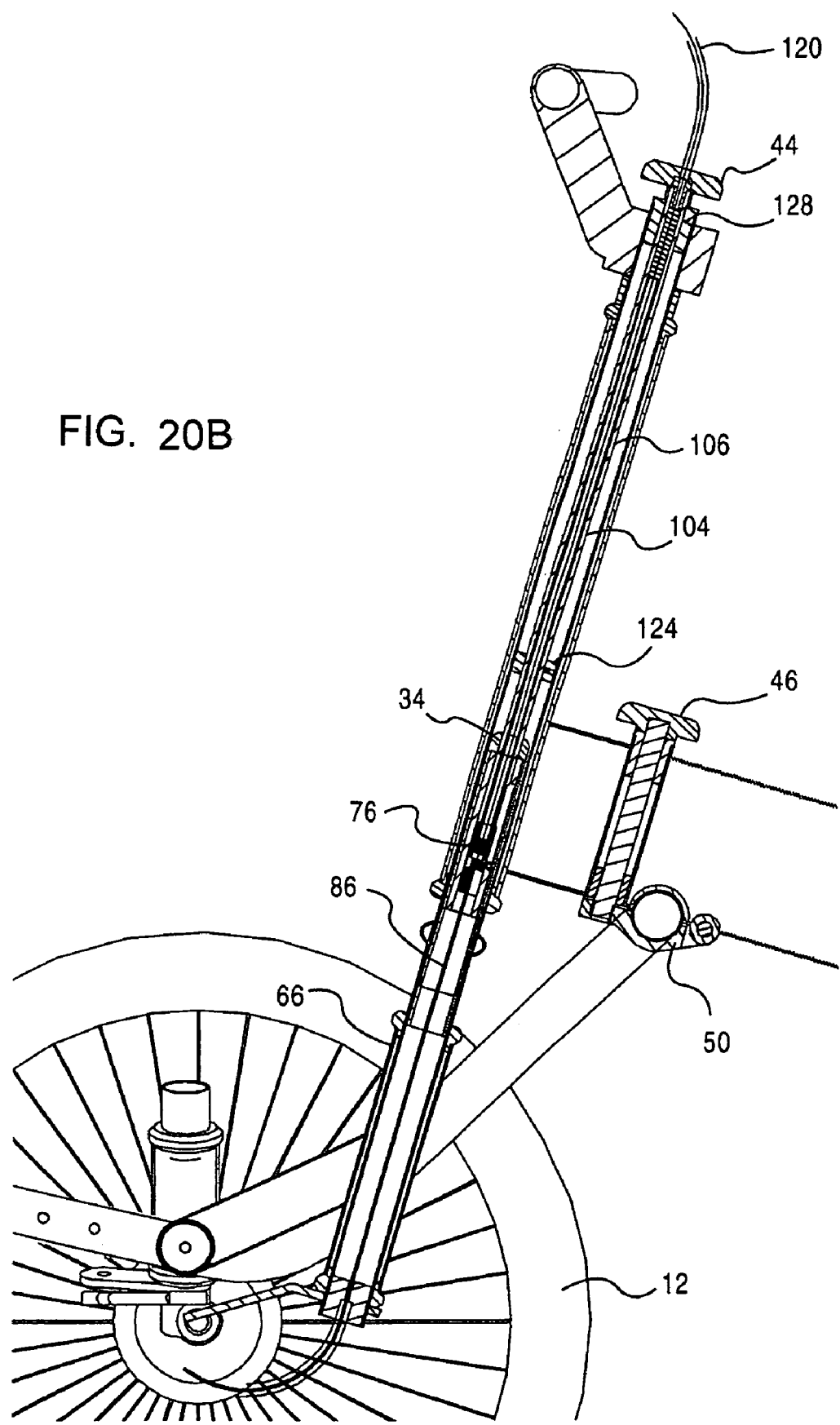
Figure 20C:
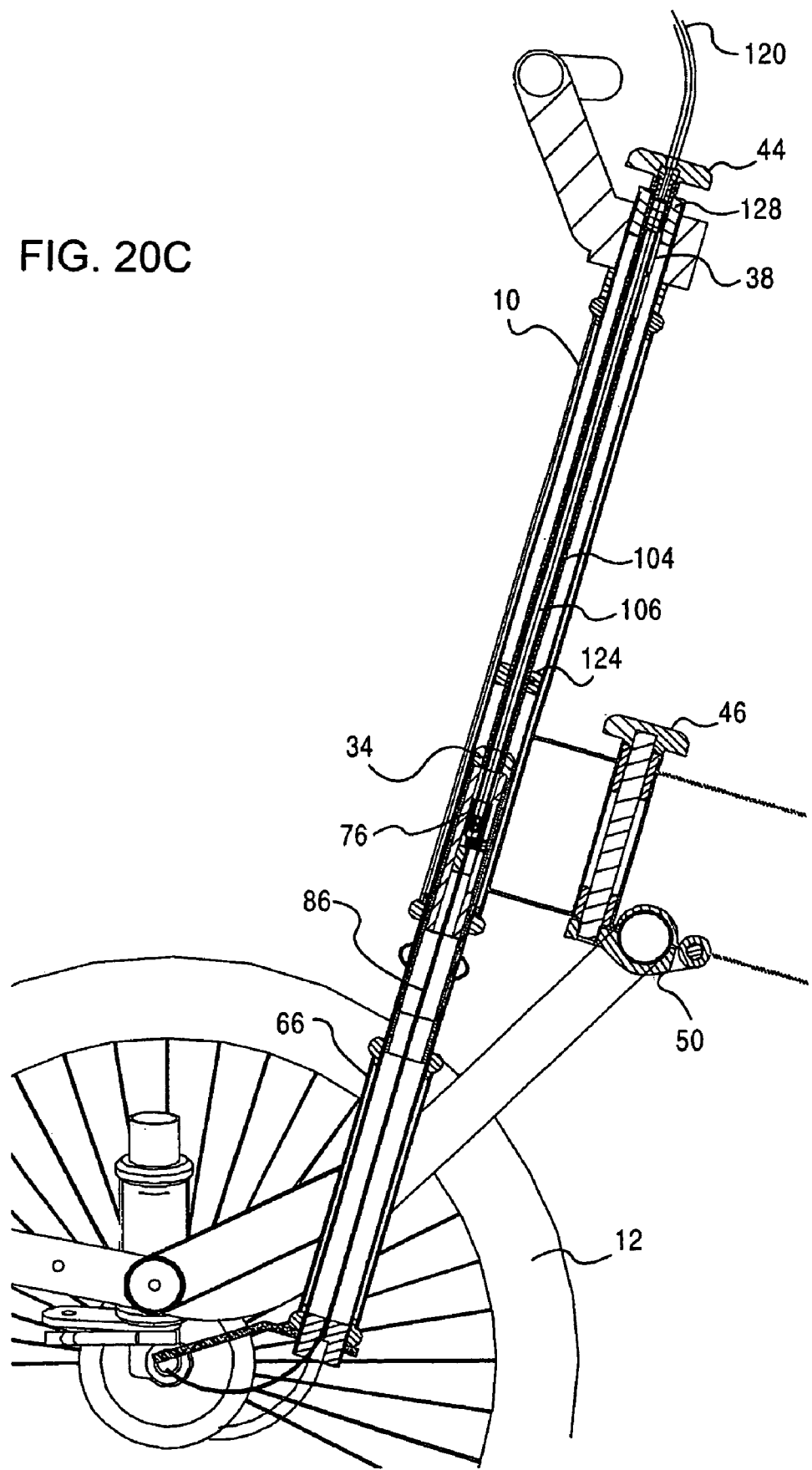

FIGS. 20A to 20C illustrate the braking and steering assemblies of the pushing and riding sections.

The disconnected state of the braking and steering assembly is shown in FIG. 20A. As shown in FIG. 20A, before connection of the upper and lower connection posts 104 and 34, the cable rod 106 in the upper connection post 104 hovers over the threaded opening of the lower connection post 34. The front connection knob 44 is shown in an extended state from a retainer 128 in the stem 38. The retainer 128 retains the front connection knob 44 and the braking and steering components of the riding section in the head tube 10. The downward movement of the front connection knob 44 causes the cable rod 106 to enter the lower connection post 34 and then be threaded within the cable slide 76.

The connected and operating states of the braking and steering assembly are shown in FIGS. 20B and 20C, respectively. In the connected state, when the braking lever is not pulled, as shown in FIG. 20B, the cable rod 106 is in a neutral state and the cable slide 76 is at a lower portion of the lower connection post 34. FIG. 20C illustrates an operating state wherein the brakes of the front wheels 12 of the pushing section are controlled from the riding section 6 as follows. When the brake lever 42 on the riding section is squeezed, the cable rod 106 threaded into the cable slide 76 moves upwardly toward the front connection knob 44. The threaded end of the cable rod 106, which is threadedly engaged in the upper end of the cable slide 76, draws the cable slide 76 in the lower connection post 34 upwardly in a direction toward the front connection knob 44. As a result, the terminal end of the second front brake cable 86 is drawn upwardly, which generates a corresponding braking action on the front wheels 12.

The cable splicing assembly 136 for transmitting a braking force from the front brake of the riding section 6 and the parking brake of the pushing section 4 to the front wheels of the pushing section will now be described. The cable splicing assembly 136 transmits the braking force of the front brake of the riding section 6 and the steering of the riding section 6 to one of the front wheels 12 of the pushing section 4. The cable splicing assembly 136 also transmits the braking force from the parking brake of the pushing section 4 to the other front wheel 12 of the pushing section 4. The braking forces are transmitted by cables controlled by the front brake lever on the handlebars 40, 40 of the riding section 6 and from the parking brake of the pushing section 4.

Figure 21:
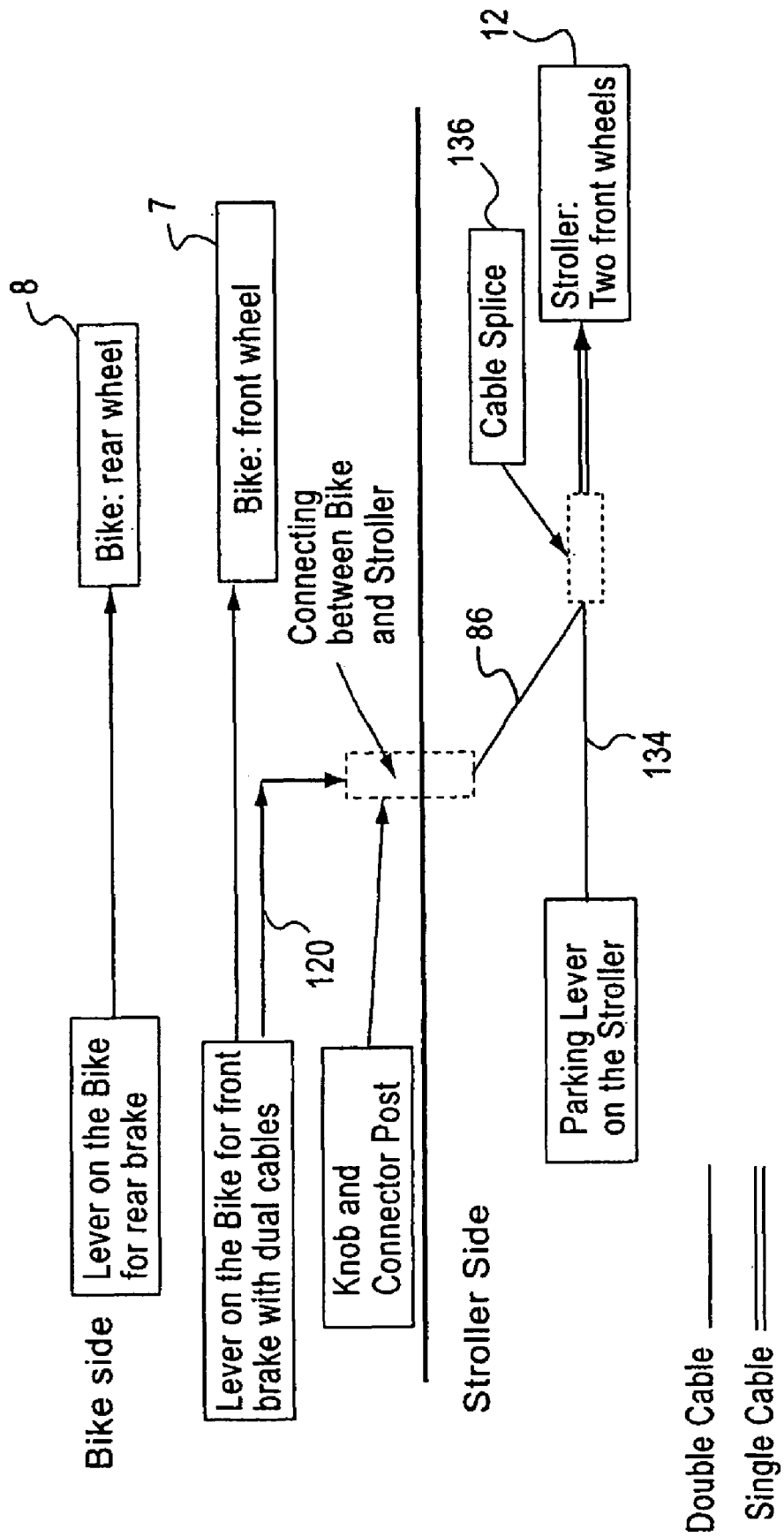
FIG. 21 illustrates a schematic diagram of the cable splicing assembly.

As shown in FIGS. 21 to 22B, the cable splicing assembly 136 guides therethrough a pair of control cables or brake cables. One of the brake cables is the first front or parking brake cable 134 provided from the pushing section 4 of the vehicle to one of the left and right wheels of the pushing section, as shown in FIG. 21. The other brake cable is the second front brake cable 86 provided from the braking and steering assembly in the head tube 10 of the riding section to the other of the right and left wheels of the pushing section, as shown in FIG. 23A. The pair of brake cables 86, 134 from the pushing and riding sections can extend completely through the cable splicing assembly 136 to the wheels 12 of the pushing section. Alternatively, the brake cables can comprise two pairs of control or brake cables in which one brake cable from the pushing section and one brake cable from the riding section of the vehicle enter the cable splicing assembly 136 from opposite sides to terminate in the piston, and a pair of brake cables controlling the brakes at the left and right wheels of the pushing section begin in the opposite end of the piston and terminate at the left and right wheels.

The second front brake cable 86 from the riding section 6 and the parking brake cable 134 from the pushing section 4 enter into the cable splicing assembly 136 through a housing cap 138, as shown in FIGS. 22A and 22B. As described above and shown in FIGS. 22A and 22B, the front brake cable of the riding section 6 is the second front brake cable 86 that extends from the cable slide 76 of the lower connection post 34 to the splicing assembly 136. The housing cap 138 has a pair of apertures 140 in one end sized to securely fit and hold therein cable housings 144 encasing the pair of brake cables 86, 134. The cable housings 144 encase the brake cables 86, 134 up to an inner surface 142 of the housing cap 138, at which point a narrower aperture 146 receives the brake cables 86, 134, which extend through the remaining portion of housing cap 138. The brake cables 86, 134 can be exposed and uncovered throughout the cable splicing assembly 136. Alternatively, the cable housings 144 can encase the pair of brake cables along their entire length. The housing cap 138 includes a threaded bore 149 centrally located on the surface facing internally to the cable splicing assembly 136. The threaded bore 149 receives a threaded end of center slide rod 147 and is formed to a partial axial depth of a longitudinal end surface of housing cap 138 so that the end of slide rod 147 does not protrude external to housing cap 138. The center slide rod 147 extends concentrically along the longitudinal center axis of cable splicing assembly 136. As mentioned above, one threaded end of center slide rod 147 threads into bore 149 in housing cap 138. The opposite end of center slide rod 147 is also threaded and receives end cap 148. End cap 148 has a centrally located threaded bore 150 through the entire axial length of a longitudinal end surface. The center slide rod 147 extends through the center cavity 154 of brake splice housing canister 152. End cap 148 is screwed onto the end of slide rod 147 until the entire assembly fits tightly together. A nut 160, or washer and nut combination, for example, may be screwed onto the threaded of end of slide rod 147 extending beyond end cap 148 and tightened to collectively clamp and hold together the housing cap 138, brake splice housing canister 152, and end cap 148.

A piston 156 is situated within cavity 154, as shown in FIG. 22A. The center slide rod 147 extends through an opening 164 in the piston 156 so that the piston 156 may slide axially along the longitudinal length of slide rod 147 within cavity 154 between the housing cap 138 and end cap 148. To further ease resistance of the piston 156 sliding within the cavity 154, the piston 156 may be shaped to reduce the amount of surface area that contacts an inner surface of the splice housing canister 152. For instance, the piston 156 may have a polygon shape in which only the points of the polygon contact the inner surface of the splice housing canister 152. Individually and by combination, the slide rod 147 and the reduction in surface area contact allow the piston 156 to slide more freely and reduce the possibility of jamming.

The brake cables 86, 134 enter the piston 156 through separate apertures 162 for guiding the pair of brake cables through a longitudinal length. The piston 156 slides along a center slide rod 147 in response to movement in the pair of brake cables 86, 134. For example, when the cycle operator squeezes the front brake lever 42 on the cycle handlebars 40 as shown in FIG. 18, the brake cables from the front brake (i.e., the first front brake cable 120 and the second front brake cable 86) are pulled in a direction toward the brake lever 42 which moves the brake cables, thereby allowing the piston 156 to slide in the cable splicing assembly 136. The piston 156 includes at least one aperture 166 in an outer peripheral surface for receiving fixing members, such as, for example, a threaded set screw 168 that clamps the brake cables to the piston 156.

The pair of apertures 158 allows the brake cables to exit the splicing assembly through the end cap 148 and connect to the brakes at each front wheel. Similar to the housing cap 138 at the opposite end, the end cap pair of apertures 158 are sized at a distal end to securely fit and hold therein cable housings 144 encasing the pair of brake cables 86, 134.

The pair of brake cables 86, 134 performs a braking action on the front wheels 12 of the pushing section 4 of the vehicle. In the cable splicing assembly 136, one of the pair of brake cables is a second front brake cable 86 that extends from a front brake of the riding section 6 of the vehicle to one front wheel of the pushing section 4 of the vehicle and another of the pair of brake cables 134 is a parking brake cable that extends from a parking brake of the pushing section of the vehicle to another front wheel of the pushing section of the vehicle.

The splicing assembly can be mounted to the pushing section 4, such as on the frame of the pushing section 4, by fastening by any suitable means, including but not limited to, an adhesive, threaded screws and a hook and loop fastener, or a bracket. The splice housing canister 152, piston 156, housing cap 138 and end cap 148 can be formed from materials such as metal and plastic.

Figure 23B:
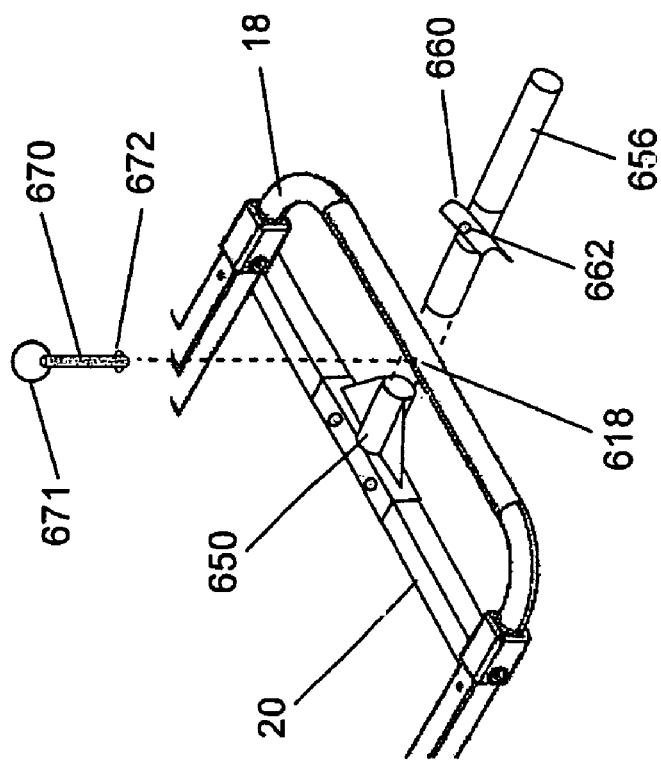
FIGS. 23A and 23B illustrate an accessory mounting assembly for attachment of an accessory to the pushing section of the vehicle.
Figure 23A:
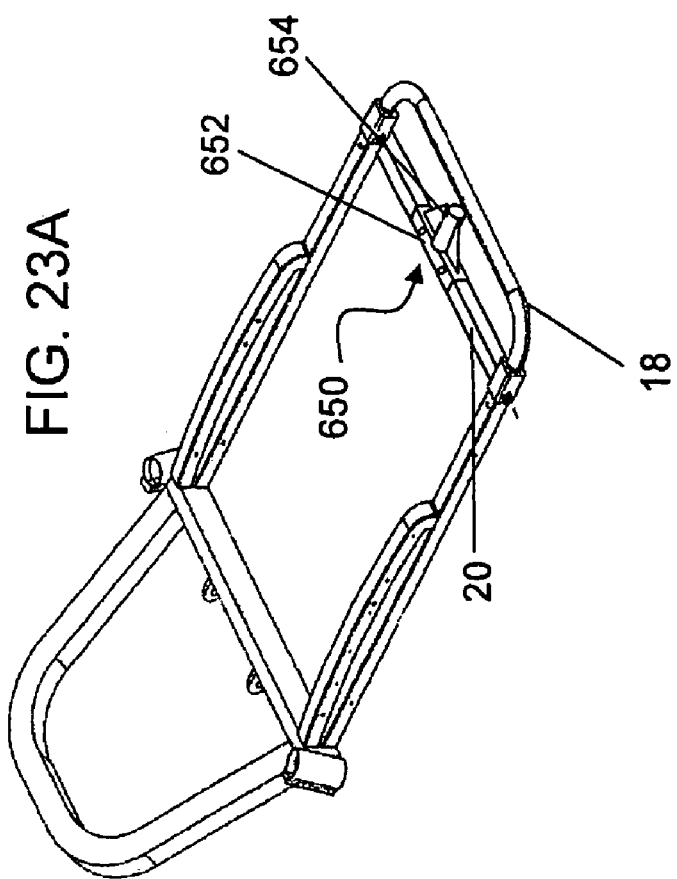

FIGS. 23A and 23B illustrate an accessory mounting assembly for attachment of an accessory, such as but not limited to, a trailer or jogging arm, to the pushing section 4 of the vehicle 2. As shown in FIG. 23A, an accessory arm housing mount 650 may be attached to the foot support bar 20. The accessory arm housing mount 650 includes a bracket portion 652 that rigidly attaches to the support bar 20 by bolts, rivets, or any other suitable means of attachment, and a tubular housing portion 654 with a diameter slightly larger than that of the accessory arm 656, as shown in FIG. 23B. To attach an accessory, such as a trailer or jogging arm, the free end of the accessory arm 656 is directed under the bumper 18 and slid into the accessory arm housing mount 650. The accessory arm 650 is fully inserted so that a plastic arm clip 660 on the accessory arm 656 aligns horizontally with the bumper 18. The plastic arm clip 660 is permanently affixed to the accessory arm 656 and clips onto the bumper 18 so that a throughhole 618 in the bumper 18 aligns with a through-hole 662 in the arm clip 660 and accessory arm 656. A pin 670 may then be inserted through the top of bumper 18, arm clip 660 and accessory arm 656 to prevent the accessory arm 656 from detaching from the pushing section 4. The pin 670 may include a retaining ring 671 and small detents 672 to prevent displacement of the pin in a vertical direction while enabling a user to easily remove the pin 670 and detach an accessory by simply pulling up on the retaining ring 671. The retaining pin 670 may also be a retaining clip and may further include a cotter pin as is well known in the art. The individual parts of the accessory mounting assembly may be made of any suitable material, including plastic or metal.

Figure 24:
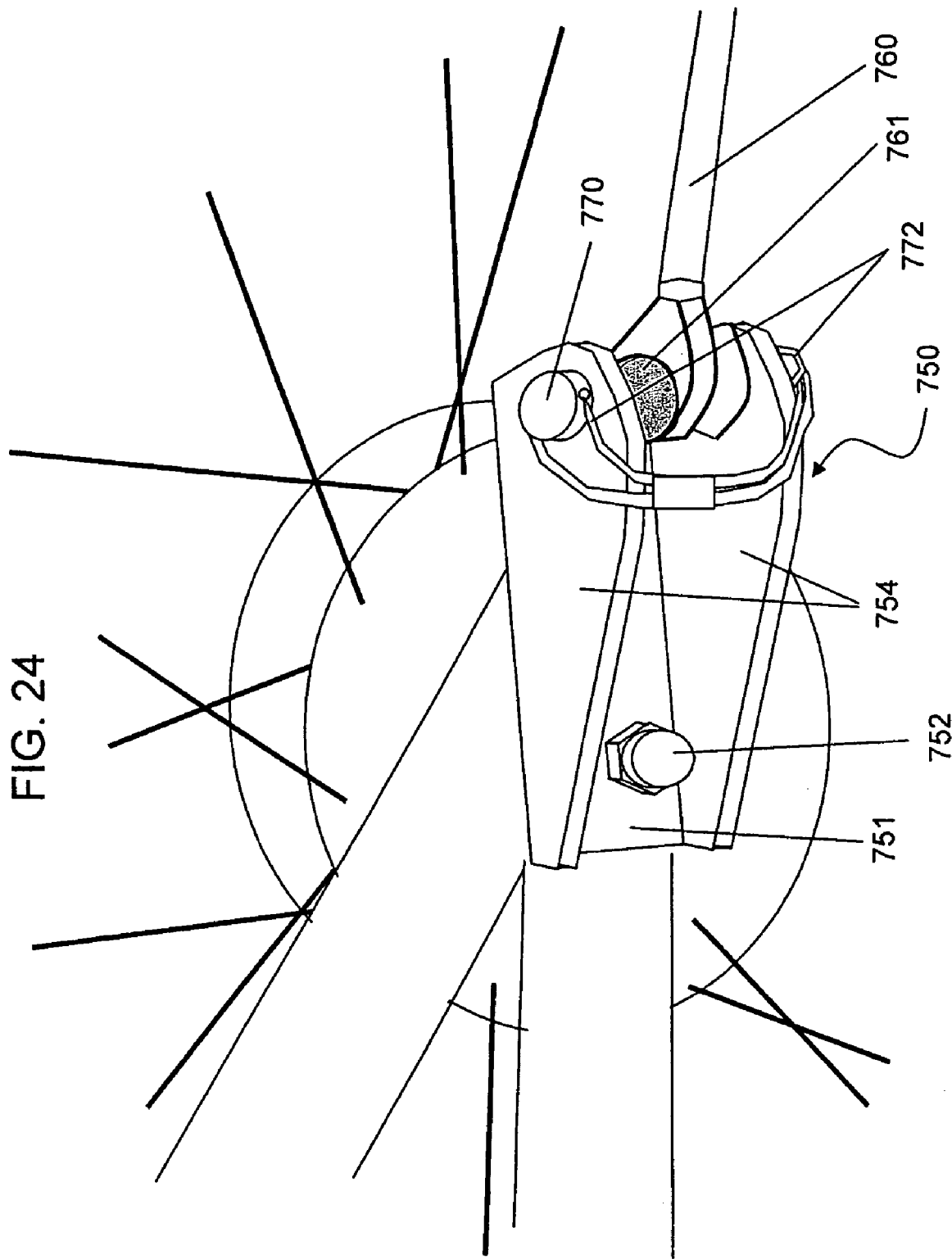
FIG. 24 shows an enlarged view of a trailer arm mounting bracket to be mounted on the rear wheel axle section for pulling a trailer or any similar accessory.

FIG. 24 shows a trailer arm mounting bracket 750 that may be mounted on the rear wheel 8 axle of the riding section 6 for pulling a trailer or any similar accessory. The bracket 750 has a forward aperture in a main plate portion 751 for mounting the bracket 750 onto the bicycle rear wheel axle (not shown). A free threaded end of the axle extends through the riding section frame and the bracket 750. A bicycle wheel axle nut 752 is tightened onto the threaded end of the axle to securely hold the bracket 750 against the frame of the riding section 6. The bracket 750 has two horizontal plate portions 754 that extend orthogonally and in parallel from the main plate member 751. The horizontal plate portions 754 are symmetric in dimension and each plate portion 754 has an aperture for mounting a trailer arm 760. A ball joint 761 is mounted to the free end of the trailer arm 760. The ball joint 761 is mounted between the horizontal plate portions 754 of the bracket 750 by inserting a retaining pin 770 through the apertures in the brackets and through an aperture in the ball joint 761. The ball joint 761 allows the trailer arm to swivel freely in an up and down direction as well as in a left and right direction. A retaining clip 772 may hold the pin 770 in place and prevent unintentional removal of the pin 770 during the course of operation.

In the present invention, the fixing members include, but are not limited to, pins, posts, screws or bolts or other fixing means. The fixing member 74 can be laterally inserted into the side of the cable slide, cable slide sleeve and elements disclosed above, by methods including, but not limited to, threading, press-fitting, and anchoring.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with the language in the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The scope of protection is limited solely by the claims that now follow. That scope is intended to be as broad as reasonably consistent with the language that is used in the claims and to encompass all structural and functional equivalents.

What is claimed is:

1. A vehicle for pushing and riding, the vehicle comprising:
a frame having a front portion and a rear portion, the front portion defining a pushing section and having a lower connection post containing therein braking components for the front portion and the rear portion defining a riding section and having an upper connection post containing therein braking components for the rear portion, wherein the upper and lower connection posts engage each other to connect the braking components for the rear portion with the braking components for the front portion, such that operation of the braking components for the rear portion results in operation of the braking components for the front portion.

2. The vehicle for pushing and riding according to claim 1 wherein the upper and lower connection posts engage each other within a head tube, the vehicle further comprising a lever assembly connected to the head tube and a crossbar that supports a front fork component of the rear portion, wherein the lever assembly comprises a plate with at least one aperture defined therein, and wherein a tie rod is connected to and extends from the at least one aperture to a wheel operationally connected to the frame.

3. The vehicle for pushing and riding according to claim 1, further comprising a caster pivot mechanism, the caster pivot mechanism comprising:

a caster mount cap attached to the front portion of the frame;
a caster mount housing pivotally connected to the caster mount cap about a caster locking sleeve, the caster locking sleeve comprising ribs that slidably engage grooves defined in the caster mount housing and grooves defined in the caster mount cap; and
a caster wheel assembly affixed to the caster mount housing.

4. The vehicle for pushing and riding according to claim 3, wherein the caster pivot mechanism further comprises a pushbutton operationally connected to the caster locking sleeve, the pushbutton releasing the ribs from the grooves defined in the caster mount housing when depressed, thereby permitting the caster mount housing to pivot around the locking sleeve.

5. The vehicle for pushing and riding according to claim 4, wherein the caster pivot mechanism further comprises a biasing mechanism that exerts a pressure on the pushbutton when the pushbutton is depressed, and when the pushbutton is released the biasing mechanism forces the ribs to re-engage the grooves defined in the caster mount housing when the caster mount housing rotates to a storage position.

6. The vehicle for pushing and riding according to claim 1, the riding section further having a braking control operationally connected to the braking components for the rear portion, the pushing section having a wheel with a brake, the brake being operationally connected to the braking components for the front portion, wherein actuation of the braking control generates a braking action between the brake and the wheel.

7. The vehicle for pushing and riding according to claim 6 wherein the braking control is a brake lever.

* * * * *